US012096211B2

(12) United States Patent
Kim et al.

(10) Patent No.: US 12,096,211 B2
(45) Date of Patent: *Sep. 17, 2024

(54) METHOD FOR PERFORMING V2X COMMUNICATION IN WIRELESS COMMUNICATION SYSTEM AND DEVICE FOR SAME

(71) Applicant: LG ELECTRONICS INC., Seoul (KR)

(72) Inventors: Taehun Kim, Seoul (KR); Laeyoung Kim, Seoul (KR); Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 441 days.

This patent is subject to a terminal disclaimer.

(21) Appl. No.: 17/231,982

(22) Filed: Apr. 15, 2021

(65) Prior Publication Data

US 2021/0235267 A1    Jul. 29, 2021

Related U.S. Application Data

(63) Continuation of application No. 16/472,833, filed as application No. PCT/KR2017/015457 on Dec. 26, 2017, now Pat. No. 11,039,310.

(Continued)

(51) Int. Cl.
  *H04W 12/06* (2021.01)
  *H04W 4/40* (2018.01)
  (Continued)

(52) U.S. Cl.
  CPC ............ *H04W 12/06* (2013.01); *H04W 4/40* (2018.02); *H04W 4/90* (2018.02); *H04W 8/04* (2013.01);
  (Continued)

(58) Field of Classification Search
  CPC ....... H04W 76/50; H04W 76/11; H04W 4/40; H04W 72/56; H04W 72/02
  See application file for complete search history.

(56) References Cited

U.S. PATENT DOCUMENTS

| 11,039,310 B2* | 6/2021 | Kim .................... H04W 4/90 |
| 2010/0317315 A1 | 12/2010 | Burbidge et al. |

(Continued)

FOREIGN PATENT DOCUMENTS

| CN | 105594294 | 5/2016 |
| CN | 105940755 | 9/2016 |

(Continued)

OTHER PUBLICATIONS

English translation of WO 2010/130739, 10 pages, 2023 (Year: 2023).*

(Continued)

*Primary Examiner* — Won Tae C Kim
(74) *Attorney, Agent, or Firm* — LEE, HONG, DEGERMAN, KANG & WAIMEY

(57) ABSTRACT

A method for performing vehicle-to-everything (V2X) communication in a wireless communication system and a device for same are disclosed. Particularly, a method for a user equipment (UE) performing V2X communication with a PC5 interface in a wireless communication system includes: receiving from an upper layer a request for transmitting a V2X message; requesting radio resources, for V2X communication with a PC5 interface, to a base station or selecting radio resources for V2X communication with the PC5 interface; and performing transmission of V2X communication with the PC5 interface, wherein, if a UE has emergency packet data network (PDN) connection, an indication, indicating that transmission with the emergency PDN connection is a higher priority than the V2X commu- (Continued)

nication with the PC5 interface, can be transmitted from the upper layer.

13 Claims, 20 Drawing Sheets

Related U.S. Application Data

(60) Provisional application No. 62/438,470, filed on Dec. 23, 2016, provisional application No. 62/442,491, filed on Jan. 5, 2017, provisional application No. 62/442,983, filed on Jan. 6, 2017, provisional application No. 62/453,532, filed on Feb. 2, 2017.

(51) Int. Cl.

| | | |
|---|---|---|
| *H04W 4/90* | (2018.01) | |
| *H04W 8/04* | (2009.01) | |
| *H04W 8/08* | (2009.01) | |
| *H04W 36/00* | (2009.01) | |
| *H04W 60/00* | (2009.01) | |
| *H04W 72/02* | (2009.01) | |
| *H04W 72/56* | (2023.01) | |
| *H04W 76/11* | (2018.01) | |
| *H04W 76/27* | (2018.01) | |
| *H04W 76/50* | (2018.01) | |
| *H04W 84/04* | (2009.01) | |
| *H04W 92/18* | (2009.01) | |

(52) U.S. Cl.
CPC ......... *H04W 8/08* (2013.01); *H04W 36/0022* (2013.01); *H04W 60/00* (2013.01); *H04W 72/02* (2013.01); *H04W 72/56* (2023.01); *H04W 76/11* (2018.02); *H04W 76/27* (2018.02); *H04W 76/50* (2018.02); *H04W 84/042* (2013.01); *H04W 92/18* (2013.01)

(56) References Cited

U.S. PATENT DOCUMENTS

| | | | |
|---|---|---|---|
| 2012/0269099 A1* | 10/2012 | Chin ................... | H04W 76/12 370/259 |
| 2012/0289185 A1 | 11/2012 | Leung et al. | |
| 2013/0288645 A1 | 10/2013 | Zheng | |
| 2014/0016614 A1 | 1/2014 | Velev et al. | |
| 2014/0213264 A1 | 7/2014 | Park et al. | |
| 2015/0341794 A1 | 11/2015 | Vanderveen et al. | |
| 2015/0351136 A1* | 12/2015 | Kaura ................... | H04W 4/90 370/329 |
| 2016/0044727 A1 | 2/2016 | Zisimopoulos et al. | |
| 2016/0353307 A1 | 12/2016 | Jung et al. | |
| 2016/0381491 A1 | 12/2016 | Watfa et al. | |
| 2017/0150490 A1 | 5/2017 | Chen et al. | |
| 2017/0245292 A1* | 8/2017 | Agiwal ................ | H04W 72/23 |
| 2017/0280378 A1 | 9/2017 | Atarius et al. | |
| 2018/0035276 A1 | 2/2018 | Kang et al. | |
| 2018/0049088 A1 | 2/2018 | Shiga et al. | |
| 2018/0124707 A1 | 5/2018 | Lee et al. | |
| 2018/0132208 A1 | 5/2018 | Pan et al. | |
| 2018/0167790 A1 | 6/2018 | Cavalcanti et al. | |
| 2018/0206089 A1 | 7/2018 | Cavalcanti et al. | |
| 2018/0295655 A1 | 10/2018 | Cavalcanti et al. | |
| 2018/0359749 A1 | 12/2018 | Liu et al. | |
| 2019/0021135 A1 | 1/2019 | Jin et al. | |
| 2019/0045507 A1 | 2/2019 | Sorrentino et al. | |
| 2019/0116586 A1 | 4/2019 | Mallick et al. | |
| 2019/0124489 A1 | 4/2019 | Ahmad et al. | |
| 2019/0132717 A1 | 5/2019 | Xu et al. | |
| 2019/0174344 A1 | 6/2019 | Karella et al. | |
| 2019/0182639 A1 | 6/2019 | Mallick et al. | |
| 2019/0268732 A1* | 8/2019 | Lu ........................ | H04W 4/12 |
| 2019/0335532 A1 | 10/2019 | Kim et al. | |
| 2019/0364402 A1 | 11/2019 | Lee | |
| 2020/0045724 A1* | 2/2020 | Lu ........................ | H04W 72/21 |
| 2020/0178048 A1* | 6/2020 | Kim ................... | H04W 12/062 |

FOREIGN PATENT DOCUMENTS

| | | | | |
|---|---|---|---|---|
| CN | 106105358 | | 11/2016 | |
| CN | 106233668 | | 12/2016 | |
| EP | 2854470 | | 4/2015 | |
| KR | 101545802 | | 8/2015 | |
| WO | WO-2010130739 | A1 * | 11/2010 | ........... G08B 25/016 |
| WO | 2016148399 | | 9/2016 | |
| WO | 2016163762 | | 10/2016 | |
| WO | 2016/182293 | | 11/2016 | |

OTHER PUBLICATIONS

CT1, "Presentation of 24.386 for information", CP-160705, 3GPP TSG CT Meeting #74, Dec. 2016, 25 page.
Qualcomm Incorporated, "QoS and priority handling for PC5 based V2X communication", S2-162534, SA WG2 Meeting #115, May 2016, 5 pages.
Qualcomm Incorporated et al., "Pseudo-CR on V2X communication over PC5 in "non-operator managed" radio resources, and V2X communication over PC5 in conjunction with emergency call", C1-170644, 3GPP TSG-CT WG1 Meeting #102, Feb. 2017, 7 pages.
LG Electronics, "V2X communication over PC5 is used for UEs in limited service state," 3GPP TSG-CT WG1 Meeting #101, C1-165100, Reno, NV (USA), Nov. 14-18, 2016, 7 pages.
LG Electronics, "Pseudo-CR on mapping between PPPP to PDB (packet delay budget) for V2X communication over PC5," 3GPP TSG-CT WG1 Meeting #101, C1-165104, Reno, NV (USA), Nov. 14-18, 2016, 4 pages.
U.S. Appl. No. 16/472,833, Office Action dated Jun. 1, 2020, 9 pages.
U.S. Appl. No. 16/463,772, Notice of Allowance dated Dec. 3, 2020, 11 pages.
The State Intellectual Property Office of the People's Republic of China Application Serial No. 201780084331.X, Office Action dated Oct. 18, 2021, 9 pages.
Huawei et al., "Summary of [93bis#24][LTEV2V] Tx PC5 and Uu path switch for V2V," R2-163815, 3GPP TSG-RAN WG2 Meeting #94, May 2016, 23 pages.
LG Electronics, "Solution for Key Issue#4 and Key Issue#7 for PC5 based V2X message transmission," S2-161527, 3GPP TSG-SA2 Meeting #114, Apr. 2016, 4 pages.
Huawei et al., "QoS architecture for PC5 based V2X messages," S2-161648, SA WG2 Meeting #114, Apr. 2016, 4 pages.
PCT International Application No. PCT/KR2017/015457, International Search Report dated Apr. 9, 2018, 3 pages.
Huawei, "Support of QoS for PC5-based V2X transport," 3GPP TSG-RAN WG2 Meeting #95-bis, R2-166302, Oct. 2016, 4 pages.
Huawei, "Discussion on Prioritization between UL TX and V2X SL TX," 3GPP TSG-RAN WG2 Meeting #96, R2-167929, Nov. 2016, 4 pages.
Huawei, "Further discussions for PC5/Uu path selection for V2X," 3GPP TSG-RAN WG2 Meeting #96, R2-167937, Nov. 2016, 5 pages.

\* cited by examiner (a) Control plane protocol stack (b) User plane protocol stack

METHOD FOR PERFORMING V2X COMMUNICATION IN WIRELESS COMMUNICATION SYSTEM AND DEVICE FOR SAME

CROSS-REFERENCE TO RELATED APPLICATIONS

This application is a continuation of U.S. patent application Ser. No. 16/472,833, filed on Jun. 21, 2019, which is the National Stage filing under 35 U.S.C. 371 of International Application No. PCT/KR2017/015457, filed on Dec. 26, 2017, which claims the benefit of U.S. Provisional Application No. 62/438,470, filed on Dec. 23, 2016, 62/442,491, filed on Jan. 5, 2017, 62/442,983, filed on Jan. 6, 2017, and 62/453,532, filed on Feb. 2, 2017, the contents of which are all hereby incorporated by reference herein in their entireties.

BACKGROUND OF THE INVENTION

Field of the Invention

The present invention relates to a wireless communication system, and more particularly, to a method for performing/supporting vehicle-to-everything (V2X) communication and an apparatus for supporting the same.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

The present invention provides a method for performing V2X communication over PC5 (a UE-to-UE radio interface/reference point) by a UE.

The present invention also provides a method for performing V2X communication over PC5 by a UE which is in a limited service state.

The present invention also provides a method for processing both transmission over Uu (i.e., a radio interface/reference point between UE and eNB) and transmission over PC5.

The technical objects of the present invention are not limited to the aforementioned technical objects, and other technical objects, which are not mentioned above, will be apparently appreciated by a person having ordinary skill in the art from the following description.

In an aspect of the present invention, a method for performing, by a user equipment (UE), vehicle-to-everything (V2X) communication over a PC5 interface in a wireless communication system includes: receiving a request for transmitting a V2X message from an upper layer: requesting a radio resource for V2X communication to a base station via the PC5 interface or selecting the radio resource for the V2X communication via the PC5 interface; and performing transmission of the V2X communication via the PC5 interface, in which when the UE has an emergency packet data network (PDN) connection, an indication that transmission through the emergency PDN connection takes priority over the V2X communication via the PC5 interface may be forwarded from the upper layer.

In another aspect of the present invention, a user equipment (UE) for performing vehicle-to-everything (V2X) communication over a PC5 interface in a wireless communication system includes: a communication module transmitting and receiving a wired/wireless signal: and a processor controlling the communication module, in which the processor is configured to receive a request for transmitting a V2X message from an upper layer, request a radio resource for V2X communication to a base station via the PC5 interface or select the radio resource for the V2X communication via the PC5 interface, and perform transmission of the V2X communication via the PC5 interface, and when the UE has an emergency packet data network (PDN) connection, an indication that transmission through the emergency PDN connection takes priority over the V2X communication via the PC5 interface is forwarded from the upper layer.

Preferably, the method may further include when the indication is received, preferentially processing the transmission through the emergency PDN connection over the transmission over the V2X communication via the PC5 interface.

Preferably, the indication may be forwarded separately from a non-access stratum (NAS) message for establishing the emergency PDN connection.

Preferably, the indication may be forwarded together with the non-access stratum (NAS) message for establishing the emergency PDN connection.

Preferably, the request for transmitting the V2X message may include a V2X message, a V2X service identifier of a V2X service for the V2X message, a data type in the V2X message, and a V2X message priority.

Preferably, when the UE is serviced by an Evolved Universal Terrestrial Radio Access Network (E-UTRAN), the UE intends to use the radio resource provided by a cell of the E-UTRAN, and a Public Land Mobile Network (PLMN) in which the UE is registered belongs to a PLMN list authorized to use the V2X communication via the PC5, the radio resource for the V2X communication via the PC5 interface may be requested to the base station.

Preferably, when the UE is not serviced by the E-UTRAN and the UE is authorized to use the V2X communication via the PC5, the radio resource for the V2X communication via the PC5 interface may be selected.

Preferably, when the UE is in an EPS Mobility Management (EMM)-IDLE mode and in a limited service state, the radio resource for the V2X communication via the PC5 interface may be selected.

Preferably, an identifier of a bearer corresponding to the emergency PDN connection may be forwarded together with the indication.

Preferably, only when the UE is in an EPS Mobility Management-CONNECTED (EMM) mode, the indication may be forwarded.

According to an embodiment of the present invention, even when a UE is, particularly, in a limited service state, the UE may perform V2X communication. As a result, it is possible to cope with a load safety situation or a public safety related situation.

Further, according to an embodiment of the present invention, when no error occurs even in the case where transmission over Uu and transmission of V2X communication over PC5 overlap with each other, it is possible to effectively treat overlapping together.

Advantages which can be obtained in the present invention are not limited to the aforementioned effects and other unmentioned advantages will be clearly understood by those skilled in the art from the following description.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DESCRIPTION OF EXEMPLARY EMBODIMENTS

Figure 1:
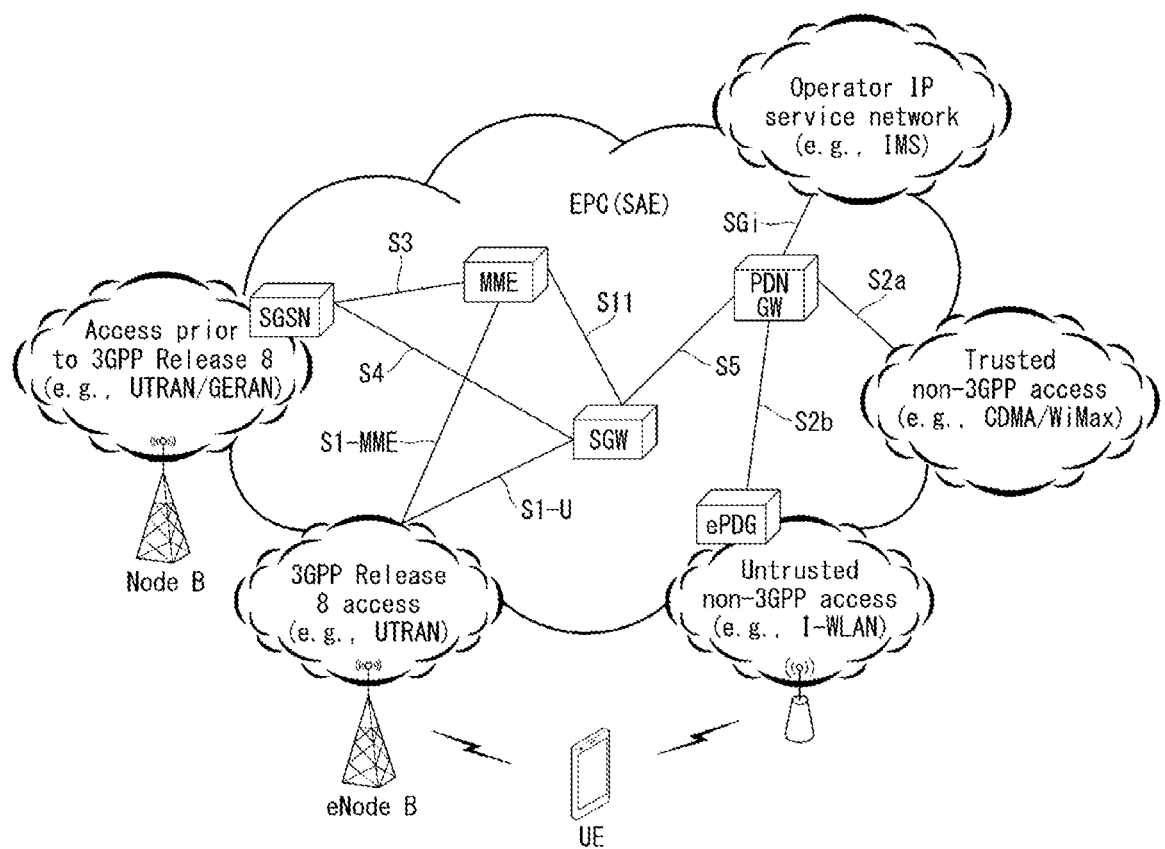
FIG. 1 is a diagram schematically exemplifying an evolved packet system (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile: and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Also, all of the terms disclosed in this document may be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It may be installed inside or outside a mobile communication network. It may provide an interface through which an MTC user may access the server. Also, an MTC server may provide MTC-related services to other servers (in the form of Services Capability Server (SCS)) or the MTC server itself may be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier includes a domain identifier and a local identifier as described below.

Domain identifier: an identifier used for identifying a domain in the control region of a mobile communication network service provider. A service provider may use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
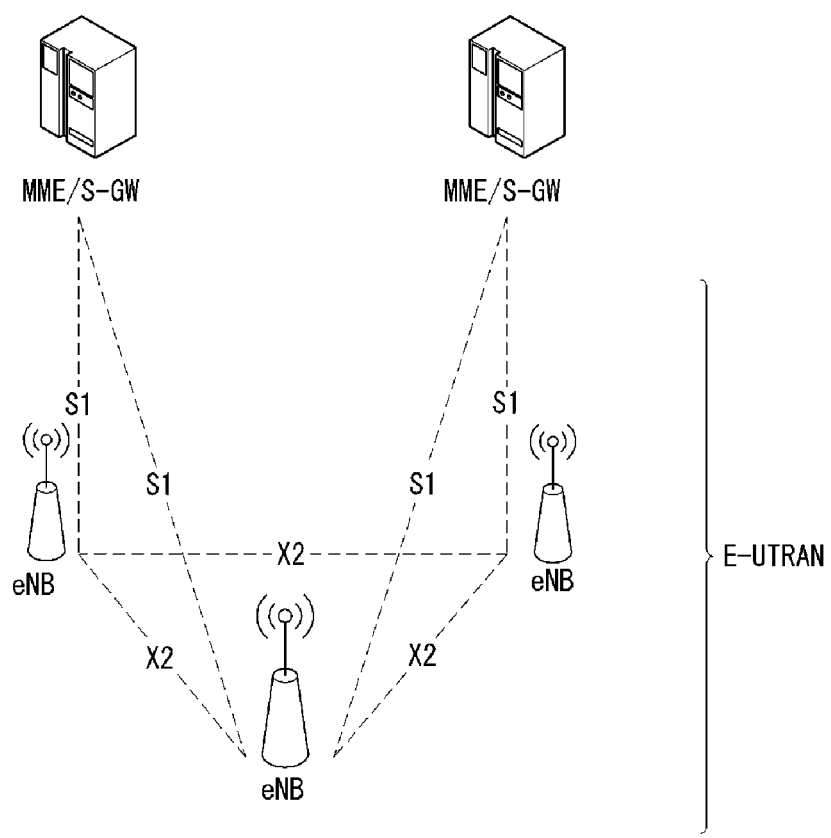
FIG. 2 illustrates an example of evolved universal terrestrial radio access network structure to which the present invention can be applied.

FIG. 2 illustrates one example of an Evolved Universal Terrestrial Radio Access Network (E-UTRAN) to which the present invention may be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VOIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
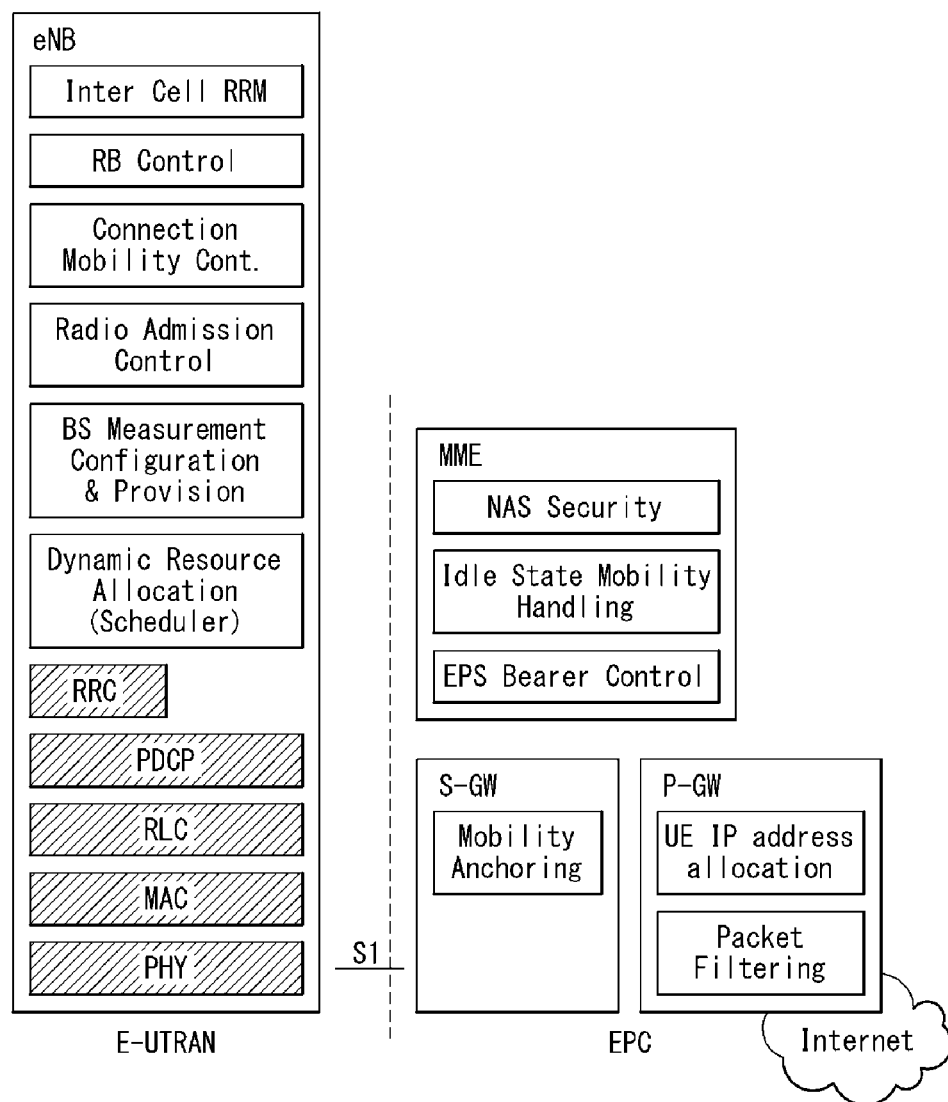
FIG. 3 exemplifies a structure of E-UTRAN and EPC in a wireless communication system to which the present invention can be applied.

FIG. 3 exemplifies a structure of E-UTRAN and EPC in a wireless communication system to which the present invention may be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

Figure 4:
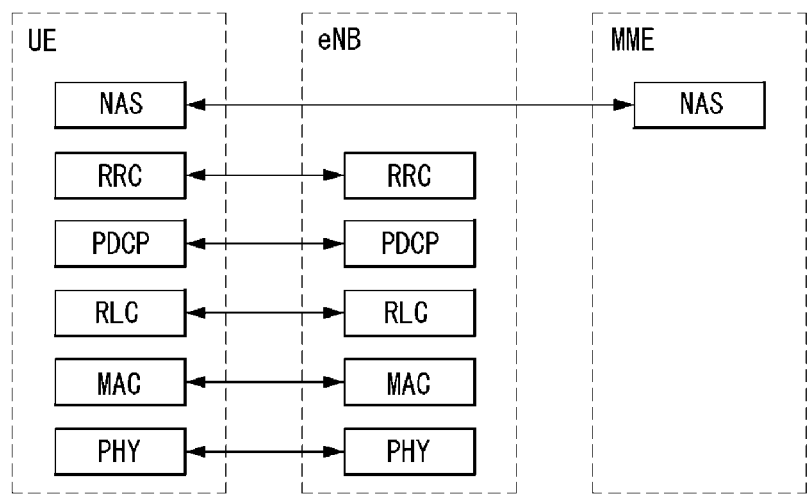
FIG. 4 illustrates a structure of a radio interface protocol between a UE and E-UTRAN in a wireless communication system to which the present invention can be applied.
Figure 4:
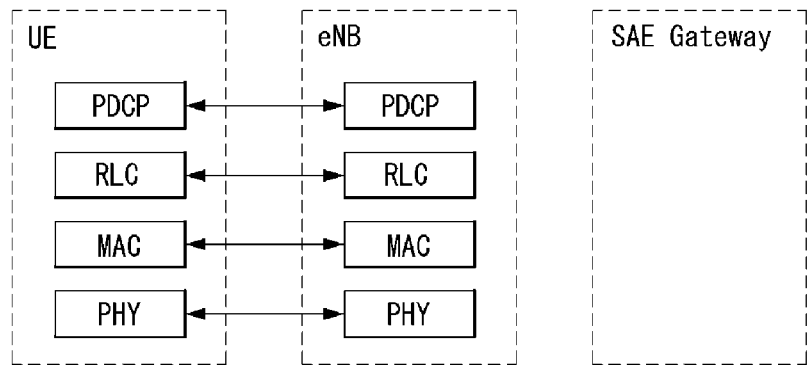

FIG. 4 illustrates a radio interface protocol structure between a UE and an E-UTRAN in a wireless communication system to which the present invention may be applied.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH): and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel: and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QOS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
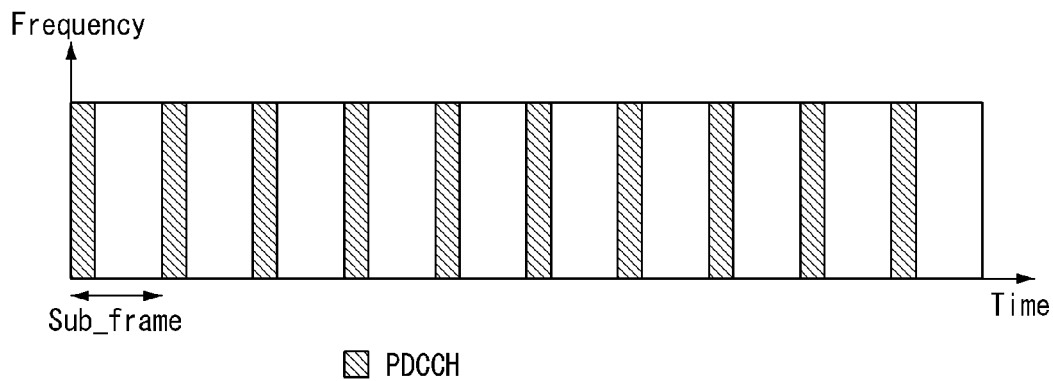
FIG. 5 is a diagram schematically showing a structure of a physical channel in a wireless communication system to which the present invention may be applied.

FIG. 5 is a diagram schematically exemplifying a structure of physical channel in a wireless communication system to which the present invention may be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

Figure 6:
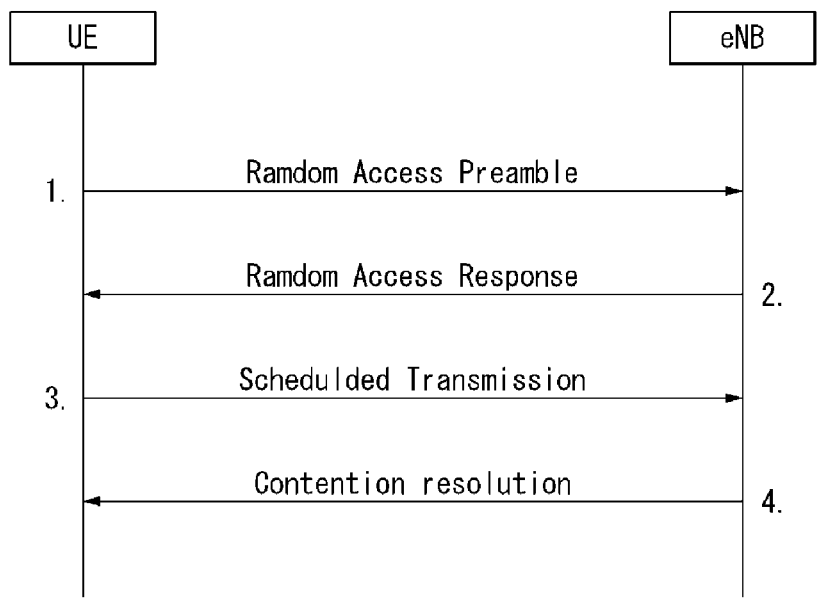
FIG. 6 is a diagram for describing a contention based random access procedure in a wireless communication system to which the present invention may be applied.

FIG. 6 is a diagram for describing the contention-based random access procedure in the wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC- RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Figure 11:
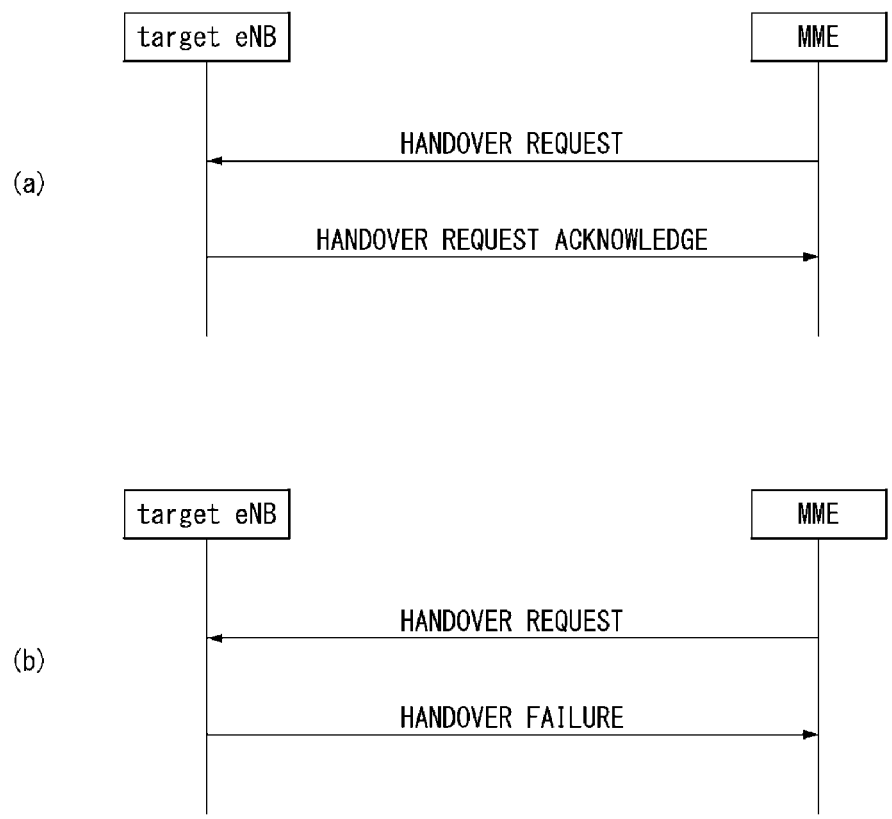
FIG. 11 illustrates a handover resource allocation procedure in a wireless communication system to which the present invention may be applied.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in this specification are described below.

Dedicated bearer: an EPS bearer associated with an uplink packet filter(s) within a UE and a downlink packet filter(s) within a P-GW. In this case, only a specific packet is matched with the filter(s).

Default bearer: an EPS bearer established even new PDN connection. Context of a default bearer is maintained during the lifetime of a PDN connection.

EPS mobility management (EMM)-EMM-NULL state: an EPS service within a UE is deactivated. Any EPS mobility management function is not performed.

EMM-DEREGISTERED state: in the EMM-DEREGISTERED state, EMM context is not established and an MME is not notified of a UE location. Accordingly, the UE is unreachable by the MME. In order to establish EMM context, the UE needs to start an Attach or combined Attach procedure.

EMM-REGISTERED state: In the EMM-REGISTERED state, EMM context within a UE has been established and default EPS bearer context has been activated. When a UE is in the EMM-IDLE mode, an MME is notified of a UE location with accuracy of a list of TAs including a specific number of a TA. The UE may initiate the transmission and reception of user data and signaling information and may respond to paging. Furthermore, a TAU or combined TAU procedure is performed.

EMM-CONNECTED mode: when an NAS signaling connection is set up between a UE and a network, the UE is the EMM-CONNECTED mode. The term "EMM-CONNECTED" may be referred to as a term "ECM-CONNECTED state."

EMM-IDLE mode: when an NAS signaling connection is not present between a UE and a network (i.e., an EMM-IDLE mode without suspend indication) or RRC connection suspend is indicated by a lower layer (i.e., an EMM-IDLE mode with suspend indication), the UE is in the EMM-IDLE mode. The term "EMM-IDLE" may be referred to as a term "ECM-IDLE state."

EMM context: when an Attach procedure is successfully completed, EMM context is established between a UE and an MME.

Control plane CIoT EPS optimization: signaling optimization that enables the efficient transport of user data (IP, non-IP or SMS) through a control plane via an MME. This may optionally include the header compression of IP data.

User plane CIoT EPS optimization: signaling optimization that enables the efficient transport of user data (IP or non-IP) through a user plane.

EPS service(s): a service(s) provided by a PS domain.

NAS signaling connection: a peer-to-peer S1 mode connection between a UE and an MME. An NAS signaling connection has a concatenation of an RRC connection via an LTE-Uu interface and an S1AP connection via an S1 interface.

UE using EPS services with control plane CIoT EPS optimization: UE attached for EPS services with control plane CIoT EPS optimization approved by a network Non-access stratum (NAS): a functional layer for exchanging an UMTS, signaling between a UE and a core network in an EPS protocol stack, and a traffic message. This has a main function of supporting the mobility of a UE and supporting a session management procedure of establishing and maintaining an IP connection between a UE and a PDN GW.

Access stratum (AS): this means a protocol layer under the NAS layer on the interface protocol between an E-UTRAN (eNB) and a UE or between an E-UTRAN (eNB) and an MME. For example, in the control plane protocol stack, the RRC layer, PDCP layer, RLC layer, MAC layer and PHY layer may be collectively referred to as an AS layer or any one of the layers may be referred to as an AS layer. Or, in the user plane protocol stack, the PDCP layer, RLC layer, MAC layer and PHY layer may be collectively referred to as an AS layer or any one of the layers may be referred to as an AS layer.

S1 mode: a mode applied to a system having functional separation according to the use of an S1 interface between a radio access network and a core network. The S1 mode includes a WB-S1 mode and an NB-S1 mode.

NB-S1 mode: this mode is applied by a UE when a serving radio access network of the UE provides access to a network service (via E-UTRA) based on a narrow band (NB)-Internet of things (IOT).

WB-S1 mode: this mode is applied when a system operates in the S1 mode, but is not the NB-S1 mode.

Limited Service State

In 3GPP TS 23.122, a limited service state (i.e., a no suitable cell) is defined. According to this part, the following UE operation may be confirmed.

The UE in the limited service state does not perform location registration (LR) except for attach for an emergency bearer service.

In cases of a), c) and f) of the limited service states described below, the UE may perform Vehicle-to-Everything (V2X) communication over a PC5 interface.

There is a situation in which a mobile station (MS) may not receive a normal service from a PLMN as described below.

a) Finding a suitable cell of the selected PLMN is unsuccessful;

b) There is no subscriber identity module (SIM) in an MS;

c) When an LR is received, "PLMN not allowed" is responded;

d) When an LR is received, an "illegal MS" or "illegal mobile equipment (ME)" is responded (hereinafter, any SIM in the ME is regarded as "invalid");

e) When an LR is received, an "IMSI unknown in HLR" is responded (hereinafter, any SIM in the ME is also regarded as "invalid" with respect to a non-GPRS service);

f) When LR of GPRS MS attached only to a GPRS service is received, "GPRS services not allowed" is replied (a cell selection state of GPRS MS attached to GPRS and non-GPRS depends on a result of location update) or when EPS attach, tracking area update (TAU) or service request is performed, "EPS services not allowed" is responded: or g) A power saving mode (PSM) is activated.

In the case of a) to f) described above, the MS attempts to camp on an acceptable cell regardless of a PLMN identifier to make an emergency call, if necessary. However, an MS that operates in an NB-S1 mode does not attempt to make the emergency call. When the MS is in the limited service state with a valid SIM, the MS searches for an available and allowable PLMN. Except for the MS other than the eCall only mode, until valid SIM exists and a suitable cell may be discovered or passive network reselection is performed, an LR request is not made. In the case of an MS which is in the eCall only mode, it is excepted that the EPS attach for the emergency bearer service is performed and the LR request is not made. When the GPRS attach or EPS attach for the emergency bearer service is performed, the PLMN of a current serving cell is regarded as a PLMN selected during a duration in which the MS is attached for the emergency bearer service. In the limited service state, the presence of the MS does not need to be known on which cell of the PLMN the MS camps.

The emergency call may also be made under other conditions. When the limited service state is caused by a), c), or f), Proximity-based services (Prose) direct communication and Prose direct discovery for public safety may be initiated if necessary. When the limited service state is caused by a), c), or f), the V2X communication over PC5 may be initiated if necessary.

V2X Communication and Limited Service State

An operation (i.e., V2X communication) in which the UE transmits a V2X message is defined in 3GPP TS 24.386. In this case, the operation of the UE is assumed to be the same as described in ProSe related standard 3GPP TS 24.334 and refers to 3GPP TS 24.334.

An upper layer may request the UE to transmit the V2X message of a V2X service identified by a V2X service identifier by using the V2X communication over PC5.

A request from the upper layer includes the following:
a) V2X message;
b) V2X service identifier of the V2X service for the V2X message;
c) Data type (Internet protocol (IP) in V2X message or non-IP);
d) When the V2X message includes non-IP data, an indication for setting a non-IP type field of a non-IP type PDU to a value corresponding to a V2X message family: and
e) V2X message priority When the UE receives the request from the upper layer to transmit the V2X message of the V2X service identified by the V2X service identifier by using the V2X communication over PC5, the UE performs the following procedure:
a) When the following condition is satisfied:
1) The UE is served by E-UTRAN;
2) The UE intends to use a radio resource (i.e., carrier frequency) provided by an E-UTRAN cell;
3) When the UE is served by the E-UTRAN, a registered PLMN belongs to a PLMN list authorized to use the V2X communication over PC5;
4) The V2X service identifier of the V2X service is included in the PLMN list authorized for the V2X communication over PC5 or the UE is configured as a default destination Layer-2 identifier (ID) for the V2X communication over PC5:
In this case, the UE operates as follows:
1) Requesting the radio resource for the V2 communication over PC5; and
2) performing transmission of the V2X communication over PC5
b) On the contrary, when the following conditions are satisfied:
1) The UE:
A) is "not served by E-UTRAN": or
B) is in the EMM-IDLE mode and the limited service state, a case where the UE is in the limited service state corresponds to any one of the followings cases;
i) a case where the UE may not find the suitable cell in the selected PLMN;
ii) a case where the UE receives an ATTACH REJECT message, a TRACKING AREA UPDATE REJECT message, or a SERVICE REJECT message including EMM cause #11 "PLMN not allowed" or the UE receives a LOCATION UPDATING REJECT message, a GPRS ATTACH REJECT message, or a ROUTING AREA UPDATE REJECT message including EMM cause #11 "PLMN not allowed": or
iii) a case where the UE receives the ATTACH REJECT message or TRACKING AREA UPDATE REJECT message or SERVICE REJECT message including EMM cause #7 "EPS services not allowed" or a case where the UE receives the LOCATION UPDATING REJECT message or GPRS ATTACH REJECT message or ROUTING AREA UPDATE REJECT message or SERVICE REJECT message including EMM cause #7 "EPS services not allowed";
2) When the UE is not served by the E-UTRAN, the UE is authorized to use the V2X communication over PC5: and
3) The V2X service identifier of the V2X service is included in a list of the V2X services authorized for the V2X communication over PC5 or the UE is configured as a default destination Layer-2 identifier (ID) for the V2X communication over PC5:

In this case, the UE operates as follows:
1) selecting the radio resource for the V2 communication over PC5; and
2) performing the transmission of the V2X communication over PC5:
Otherwise, the UE does not perform the V2X communication over PC5.

V2X Communication and PC5 Resource Management/Allocation

According to 3GPP TS 23.285, when the attach, the service request, or the TAU procedure is performed, the MME transfers a UE context to the eNB as an S1-AP Initial UE Context Setup Request message, the eNB stores the information and uses the stored information for managing a PC5 resource of the UE.

1) E-UTRAN attach procedure

An E-UTRAN attach procedure for a V2X-enabled UE is performed as defined in 3GPP TS 23.401 with the following additions:
The UE encapsulates the V2X capability indication as a part of the "UE network capability" in the Attach Request message. The MME stores the information for the V2X operation. A V2X capability indicates whether the UE may support the V2X communication over PC5 reference point.
When the UE indicates the V2X capability, the UE is authorized for the V2X communication via the PC5 reference point based on subscription data. In addition, the MME encapsulates an indication "V2X services authorized" indicating that the UE is authorized to use the V2X communication over PC5 reference point in the S1-AP Initial Context Setup Request.
The MME acquires Aggregate Maximum Bit Rate (UE-PC5-AMBR) from HSS as a part of the subscriber data and encapsulates the UE-PC5-AMBR in the S1-AP Initial Context Setup Request and transmits the UE-PC5-AMBR to the eNB. The eNB uses the UE-PC5-AMBR for resource management of PC5 transmission of the UE for the V2X service in a network scheduled mode.

2) Service Request Procedures

The Service Request procedures for the UE are performed as defined in 3GPP TS 23.401 with the following additions:
When the UE is V2X-enabled and authorized to use the V2X communication over PC5 reference point based on the subscriber data, the MME includes the indication "V2X services authorized" indicating that the UE is authorized to use the V2X communication over PC5 reference point in the S1-AP Initial Context Setup Request.
The MME encapsulates the UE-PC5-AMBR in the S1-AP Initial Context Setup Request and transmits the UE-PC5-AMBR to the eNB. The eNB stores the UE-PC5-AMBR as a part of the UE context and uses the UE-PC5-AMBR for resource management of PC5 transmission of the UE for the V2X service in the network scheduled mode.

3) S1 Handover Procedures

An intra-E-UTRAN S1-based handover for UE or an inter-RAT handover procedure to E-UTRAN is performed as defined in 3GPP TS 23.401, and the following is added:
When the UE is V2X-enabled and the UE is authorized to use the V2X communication over PC5 reference point based on the subscriber data, a target MME transmits to the target eNB the "V2X services authorized" indication and the UE-PC5-AMBR as follows:

In the case of the intra MME handover, the "V2X services authorized" indication and the UE-PC5-AMBR are included in an S1-AP Handover Request message. When the "V2X services authorized" indication or the UE-PC5-AMBR or both are changed after the handover procedure, an updated "V2X services authorized" indication or the updated PC5-AMBR or both are included in the S1-AP UE Context Modification Request message and transmitted to a target eNB.

In the case of inter MME handover or inter-RAT handover to the E-UTRAN, after the handover procedure, the "V2X services authorized" indication and the UE-PC5-AMBR are included in the S1-AP UE Context Modification Request message and transmitted to the target eNB.

4) X2 Handover Procedures

In the case of X2-based handover, the "V2X services authorized" indication and UE-PC5-AMBR are transmitted to the target eNB as follows:

When a source eNB is V2X-enabled and the "V2X services authorized" indication is included in the UE context, the source eNB encapsulates the "V2X services authorized" indication and the UE-PC5-AMBR in an X2-AP handover request message and transmits the "V2X services authorized" indication and the UE-PC5-AMBR to the target eNB.

When the UE is V2X-enabled and the UE is authorized to use the V2X communication via the PC5 reference point based on the subscription data, the MME encapsulates the "V2X services authorized" indication and the UE-PC5-AMBR in a Path Switch Request Acknowledge message and transmits the "V2X services authorized" indication and the UE-PC5-AMBR to the target eNB. When the "V2X services authorized" indication or the UE-PC5-AMBR or both are changed after the handover procedure, an updated "V2X services authorized" indication or the updated PC5-AMBR or both are included in the S1-AP UE Context Modification Request message and transmitted to a target eNB.

The "V2X services authorized" indication transmitted to the target eNB indicates that the UE is authorized to use the V2X communication over PC5.

The UE-PC5-AMBR is transmitted to the target eNB for the resource management of the PC5 transmission of the UE in the V2X communication.

5) Tracking Area Update (TAU) Procedure

The TAU procedure for the UE is performed as defined in 3GPP TS 23.401 and the following is added:

The UE encapsulates the V2X capability indication as a part of the "UE network capability" in the Tracking Area Update Request message. The MME stores the information for the V2X operation.

When the MME may determine to re-establish radio and S1 bearers for all activated EPS bearer contexts due to an "active" flag or pending downlink data or signaling included in the Tracking Area Update Request message, the UE is V2X-enabled, and the UE is authorized to use the V2X communication over PC5 reference point based on the subscriber data, the MME encapsulates the "V2X services authorized" indication and the UE-PC5-AMBR in the S1-AP Initial Context Setup Request message.

6) Insert Subscriber Data Procedure

The Insert Subscriber Data procedure for the UE is performed as defined in 3GPP TS 23.401 and the following is added:

When the "V2X services authorized" indication or the UE-PC5-AMBR or both need to be changed due to the changed subscription data and the S1 bearer is established, the MME notifies an updated "V2X services authorized" indication or the updated PC5-AMBR or both to a target eNB via the S1-AP UE Context Modification Request message.

7) Delete Subscriber Data Procedure

The Delete Subscriber Data procedure for the UE is performed as defined in 3GPP TS 29.272 with the same additions described as 6) above.

V2X Communication and PC5 Resource Management/Allocation

As described above, in the case where 'the UE is served by E-UTRAN', the radio resource of the V2X communication via the PC5 is described with reference to section 10.2.2 of 3GPP TS 24.334.

According to contents to be described below, when the UE is served by the E-UTRAN (e.g., in coverage of the E-UTRAN) and intends to use a V2X (ProSe) radio resource provided by the E-UTRAN (e.g., eNB), the UE requests to a lower layer (i.e., AS layer) parameters required for transmission/reception of the V2X communication (ProSe direct communication).

Specifically, when the eNB provides a corresponding radio resource pool (i.e., in the case of mode 4), the UE may perform the V2X communication by using the radio resource of the corresponding pool in the EMM-IDLE state.

When V2X related information is transmitted to broadcast information, but a resource pool for transmission is not broadcasted (i.e., only when the V2X message transmission is performed through a dedicated resource for the UE by establishing the RRC connection) (i.e., mode 3), the UE needs to request the radio resource to the eNB. Further, in this case, when the UE is in the EMM-IDLE, the UE needs to be switched to EMM-CONNECTED in order to request the radio resource to the eNB. To this end, the service request procedure or the TAU request needs to be performed. Contents thereof are defined in section 10.2.2 of 3GPP TS 24.334 as described below.

When the UE is served by the E-UTRAN and the UE intends to use the ProSe radio resource (i.e., carrier frequency) provided by an E-UTRAN cell, the UE requests the parameters to the lower layer in order to transmit or receive the ProSe direct communication. Only when the lower layer indicates that the ProSe direct communication is supported by the network, the UE performs direct communication. When the UE in the EMM-IDLE mode needs to request the resource for the ProSe direct communication, the UE needs to perform the service request procedure or the TAU procedure. When the radio resource for transmitting or receiving the ProSe direct communication is provided by the eNB, the UE starts the ProSe direct communication.

V2X Communication and PC5 Resource Management/Allocation (Sidelink UE Information)

In 3GPP TS 36.331, contents regarding sidelink UE information transmitted by the UE are described. The sidelink UE information is mainly used to announce an interest (i.e., desiring the V2X communication) in sidelink communication of the UE to be allocated with the PC 5 radio resource from the eNB.

Figure 7:
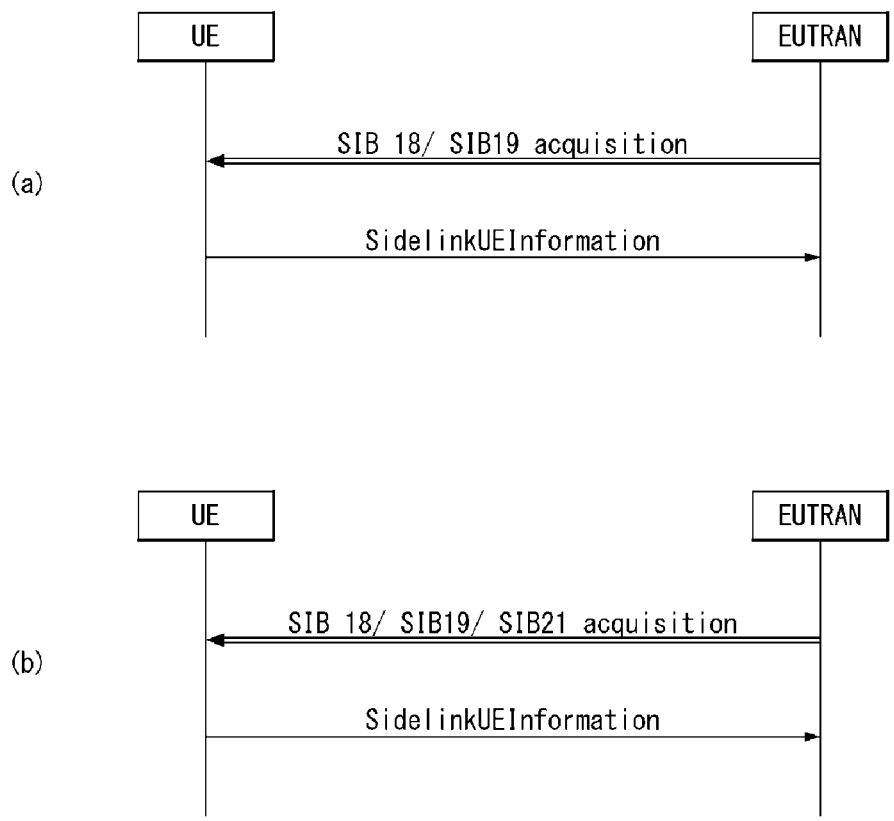
FIG. 7 is a diagram illustrating a sidelink UE information procedure in a wireless communication system to which the present invention may be applied.

FIG. 7 is a diagram illustrating a sidelink UE information procedure in a wireless communication system to which the present invention may be applied.

The purpose of the Sidelink UE information procedure is to allow the UE to request the allocation or release of transmission resources for sidelink communication or discovery reception, V2X sidelink communication reception, or sidelink communication or discovery announcement, or to announce to the E-UTRAN that the UE is interested in reporting sidelink discovery-related parameters from the system information of the inter-frequency/PLMN cell or is no longer interested.

When the interest is changed at the time of establishing a successful connection, a UE which is in RRC_CONNECTED, which is capable of performing sidelink communication, V2X sidelink communication, or sidelink discovery may initiate a procedure for indicating that there is an interest in receiving the sidelink communication, V2X sidelink communication, or sidelink discovery, when a primary cell (PCell) is changed, which broadcasts system information block (SIB) type 18 ('SystemInformationBlockType18'), SystemInformationBlockType19, or SystemInformationBlockType21 including a sidelink V2X common configuration ('sl-V2X-ConfigCommon') parameter.

The UE capable of performing the sidelink communication, V2X sidelink communication, or sidelink discovery may initiate a procedure for requesting allocation of dedicated resources for related sidelink communication transmission, discovery announcement, or V2X sidelink communication transmission or requesting a sidelink discovery gap for transmitting or receiving the sidelink discovery. In addition, a UE capable of reporting an inter-frequency/PLMN sidelink discovery parameter may initiate a procedure for reporting parameters related to the sidelink discovery from system information of an inter-frequency/PLMN cell.

When the procedure is initiated, the UE:
1> when SystemInformationBlockType18 is broadcasted by the PCell:
2> ensures to have a valid version of SystemInformationBlockType18 for the PCell;
2> when the sidelink communication is configured to be received by the upper layer:
3> when the UE last enters an RRC_CONNECTED state and then, the UE does not transmit sidelink UE information (SidelinkUEInformation) message: or
3> when the UE is connected to PCell which does not broadcast SystemInformationBlockType18 from a last time when the UE transmits the SidelinkUEInformation message: or
3> when last transmission of SidelinkUEInformation does not include a common reception interest frequency ('commRxInterestedFreq') parameter or when a frequency configured by the upper layer is changed to receive the sidelink communication after the last transmission of the SidelinkUEInformation message:
4> the UE initiates transmission of the SidelinkUEInformation message in order to indicate an interested sidelink communication reception frequency.
2> Otherwise:
3> when the last transmission of the SidelinkUEInformation message includes a commRxInterestedFreq parameter:
4> the UE initiates transmission of the SidelinkUEInformation message in order to indicate that there is no interest in receiving the sidelink communication any longer.
2> when one-to-many sidelink communication not related to a relay is configured by the upper layer:
3> when the UE last enters the RRC_CONNECTED state and then, does not transmit the SidelinkUEInformation message: or
3> when the UE is connected to the PCell which does not broadcast SystemInformationBlockType18 from the last time when the UE transmits the SidelinkUEInformation message: or
3> when the last transmission of SidelinkUEInformation does not include a common transmission resource frequency ('commTxResourceReq') parameter or when information delivered by the commTxResourceReq is changed after the last transmission of the SidelinkUEInformation message:
4> the UE initiates transmission of the SidelinkUEInformation message in order to indicate a one-to-many sidelink communication resource not related to the relay requested by the UE;
2> Otherwise:
3> when transmission of the SidelinkUEInformation message includes the commTxResourceReq:
4> the UE initiates transmission of the SidelinkUEInformation message in order to indicate not to request the one-to-many sidelink communication transmission resource not related to the relay;
2> when the one-to-many sidelink communication related to the relay is configured to be transmitted by the upper layer:
3> when the UE enters the RRC_CONNECTED state and then, does not transmit the SidelinkUEInformation message: or
3> when the UE is connected to PCell that does not broadcast SystemInformationBlockType18, PCell that does not broadcast SystemInformationBlockType19, or PCell that broadcast SystemInformationBlockType19 not including a relay discovery configuration ('discConfigRelay') from the last time when the UE transmits the SidelinkUEInformation message: or
3> when the last transmission of the SidelinkUEInformation message does not include the common transmission resource frequency ('commTxResourceReq') parameter or when the information delivered by the commTxResourceReq is changed after the last transmission of the SidelinkUEInformation message:

One-to-Many Prose Direct Communication Transmission not Served by E-UTRAN

As described above, when the UE is not served by the E-UTRAN, a process of selecting the radio resource for the V2X communication over PC5 is as follows.

When the UE is not served by the E-UTRAN, an operation order is as follows.
1) The UE finds radio parameters mapped to a geographical area based on a configuration parameter.
2) The UE checks whether there is interference in the corresponding radio parameter.
3) When there is no interference, the V2X communication over PC5 is performed by using the corresponding radio parameter.

On the contrary, when there is the interference, the PLMN of the corresponding cell is checked and when the PLMN is a registered PLMN or a PLMN equivalent to the registered PLMN and included in an authorized PLMN list, the V2X communication over PC5 is performed by moving a corresponding cell (without a PLMN selecting operation).

In other cases, when the following conditions are satisfied, the ProSe direct communication is performed.
A. When the PLMN reported by the lower layer is not the registered PLMN or the PLMN equivalent to the registered PLMN; and
B. At least one of the PLMNs reported by the lower layer is included in the authorized PLMN list for the ProSe direct communication and provides the radio resource for the ProSe direct communication:

Procedure of Using Provisioned Radio Resources by UE

When the UE is not served by the E-UTRAN, the UE selects radio parameters to be used for the ProSe direct communication as follows.

When the UE may autonomously determine that the UE is positioned in a geographical area and when the radio parameters for the geographical area are provisioned to the UE, the UE selects the radio parameters associated with the geographical area: or In all other cases, the UE does not initiate the ProSe direct communication.

Before initiating the ProSe direct communication, the UE checks whether the radio parameter selected by the lower layer may be used at a current location without interference.

When the lower layer indicates that the usage does not cause the interference, the UE initiates the ProSe direct communication: or Otherwise, when the lower layer reports one or more PLMNs in the provisioned radio resource (i.e., carrier frequency), a) When the following conditions are satisfied:

1) when the PLMN reported by the lower layer is not the registered PLMN or the PLMN equivalent to the registered PLMN; and 2) at least one of the PLMNs reported by the lower layer is included in the authorized PLMN list for the ProSe direct communication and provides the radio resource for the ProSe direct communication.

In this case, the UE operates as follows:

1) in the EMM-IDLE mode, the UE performs PLMN selection triggered by the ProSe direct communication: or 2) otherwise, when the UE is in the EMM-CONNECTED mode:

i) the UE performs a detach procedure and performs the PLMN selection triggered by the ProSe direct communication; or ii) the UE does not initiate the ProSe direct communication.

The UE follows implementation of the UE with respect to whether to perform any operation of i) or ii) above.

b) Otherwise, the UE does not initiate the ProSe direct communication.

When the registration in the selected PLMN is successful, the UE performs the procedure for initiating the ProSe direct communication.

When the UE deviates from the geographical area while performing the ProSe direct communication by using the radio parameter associated with the geographical area, the UE stops performing the ProSe direct communication.

When the UE is not served by the E-UTRAN or when the UE intends to use the radio resources for the ProSe other than radio resources operated by the serving E-UTRAN cell, the UE selects appropriate radio parameters for a new geographical area: or when the UE is served by the E-UTRAN and intends to use the radio resources for the ProSe operated by the serving E-UTRAN cell, the UE performs the procedure for initiating the ProSe direct communication when being served by the E-UTRAN.

Sidelink Pre-Configured Parameters

The following shows contents for configured radio parameters for the UE. SL-Preconfiguration shows configured radio parameters for Rel-12 or Rel-13 ProSe (D2D) and SL-V2X-Preconfiguration shows a configured radio parameter for the V2X communication over PC5 of Rel-14. According to a highlighted part below, in the case of SL-V2X-Preconfiguration, one or more frequencies (carriers) may be configured unlike SL-Preconfiguration.

1) Specified Parameter

Table 2 below shows parameters of which values are specified in the standard.

TABLE 2

| Name | Value | Semantics description | Version |
| --- | --- | --- | --- |
| preconfigSync | 0 | | |
| >syncTxParameters | | | |
| >>alpha | | | |
| preconfigComm | | | |
| >sc-TxParameters | 0 | | |
| >>alpha | | | |
| >dataTxParameters | 0 | | |
| >>alpha | | | |

2) Pre-Configurable Parameter

Table 3 shows Abstract Syntax Notation.1 (ASN.1) indicating a start of E-UTRA definition of pre-configured sidelink parameters.

TABLE 3

```
-- ASN1START
EUTRA-Sidelink-Preconf DEFINITIONS AUTOMATIC TAGS ::=
BEGIN
IMPORTS
    AdditionalSpectrumEmission,
    ARFCN-ValueEUTRA-r9,
    FilterCoefficient,
    maxFreq,
    maxSL-TxPool-r12,
    maxSL-CommRxPoolPreconf-v1310,
    maxSL-CommTxPoolPreconf-v1310,
    maxSL-DiscRxPoolPreconf-r13,
    maxSL-DiscTxPoolPreconf-r13,
    maxSL-V2X-RxPoolPreconf-r14,
    maxSL-V2X-TxPoolPreconf-r14,
    P-Max,
    ReselectionInfoRelay-r13,
    SL-CommTxPoolSensingConfig-r14,
    SL-CP-Len-r12,
    SL-HoppingConfigComm-r12,
    SL-OffsetIndicator-r12,
    SL-OffsetIndicatorSync-r12,
    SL-PeriodComm-r12,
    RSRP-RangeSL3-r12,
    SL-PriorityList-r13,
    SL-TF-ResourceConfig-r12,
    SL-TRPT-Subset-r12,
    SL-TxParameters-r12,
    SL-ZoneConfig-r14,
    P0-SL-r12,
    TDD-ConfigSL-r12,
    SubframeBitmapSL-r14
FROM EUTRA-RRC-Definitions;
-- ASN1STOP
```

SL-Preconfiguration

An SL-Preconfiguration information element (IE) includes the sidelink pre-configured parameter.

Table 4 shows the SL-Preconfiguration IE.

TABLE 4

```
-- ASN1START
SL-Preconfiguration-r12 ::=     SEQUENCE {
    preconfigGeneral-r12                        SL-PreconfigGeneral-r12,
    preconfigSync-r12                           SL-PreconfigSync-r12,
    preconfigComm-r12                           SL-
PreconfigCommPoolList4-r12,
    ...,
    [[      preconfigComm-v1310                 SEQUENCE {
                commRxPoolList-r13              SL-
PreconfigCommRxPoolList-r13,
                commTxPoolList-r13              SL-
PreconfigCommTxPoolList-r13    OPTIONAL
            }                                                           OPTIONAL,
            preconfigDisc-r13                   SEQUENCE {
                discRxPoolList-r13              SL-
PreconfigDiscRxPoolList-r13,
                discTxPoolList-r13              SL-
PreconfigDiscTxPoolList-r13    OPTIONAL
            }                                                           OPTIONAL,
            preconfigRelay-r13                  SL-PreconfigRelay-r13
                OPTIONAL
    ]]
}
SL-PreconfigGeneral-r12 ::=     SEQUENCE {
    -- PDCP configuration
    rohc-Profiles-r12                           SEQUENCE {
        profile0x0001-r12                       BOOLEAN,
        profile0x0002-r12                       BOOLEAN,
        profile0x0004-r12                       BOOLEAN,
        profile0x0006-r12                       BOOLEAN,
        profile0x0101-r12                       BOOLEAN,
        profile0x0102-r12                       BOOLEAN,
        profile0x0104-r12                       BOOLEAN
    },
    -- Physical configuration
    carrierFreq-r12                             ARFCN-ValueEUTRA-r9,
    maxTxPower-r12                              P-Max,
    additionalSpectrumEmission-r12              AdditionalSpectrumEmission,
    sl-bandwidth-r12                            ENUMERATED {n6, n15, n25, n50, n75, n100},
    tdd-ConfigSL-r12                            TDD-ConfigSL-r12,
    reserved-r12                                BIT STRING (SIZE (19)),
    ...
}
SL-PreconfigSync-r12 ::=        SEQUENCE {
    syncCP-Len-r12                              SL-CP-Len-r12,
    syncOffsetIndicator1-r12                    SL-OffsetIndicatorSync-r12,
    syncOffsetIndicator2-r12                    SL-OffsetIndicatorSync-r12,
    syncTxParameters-r12                        P0-SL-r12,
    syncTxThreshOoC-r12                         RSRP-RangeSL3-r12,
    filterCoefficient-r12                       FilterCoefficient,
    syncRefMinHyst-r12                          ENUMERATED {dB0, dB3, dB6, dB9, dB12},
    syncRefDiffHyst-r12                         ENUMERATED {dB0, dB3, dB6, dB9, dB12, dBinf},
    ...,
    [[      syncTxPeriodic-r13  ENUMERATED {true}          OPTIONAL
    ]]
}
SL-PreconfigCommPoolList4-r12 ::=   SEQUENCE (SIZE (1..maxSL-TxPool-r12)) OF SL-PreconfigCommPool-r12
SL-PreconfigCommRxPoolList-r13 ::=  SEQUENCE    (SIZE    (1..maxSL-CommRxPoolPreconf-v1310)) OF SL-PreconfigCommPool-r12
SL-PreconfigCommTxPoolList-r13 ::=  SEQUENCE    (SIZE    (1..maxSL-
```

TABLE 4-continued

```
CommTxPoolPreconf-v1310)) OF SL-PreconfigCommPool-r12
SL-PreconfigCommPool-r12 ::=        SEQUENCE {
-- This IE is same as SL-CommResourcePool with rxParametersNCell absent
    sc-CP-Len-r12                       SL-CP-Len-r12,
    sc-Period-r12                       SL-PeriodComm-r12,
    sc-TF-ResourceConfig-r12            SL-TF-ResourceConfig-r12,
    sc-TxParameters-r12                 P0-SL-r12,
    data-CP-Len-r12                       SL-CP-Len-r12,
    data-TF-ResourceConfig-r12          SL-TF-ResourceConfig-r12,
    dataHoppingConfig-r12               SL-HoppingConfigComm-r12,
    dataTxParameters-r12                P0-SL-r12,
    trpt-Subset-r12                       SL-TRPT-Subset-r12,
    ...,
    [[          priority List-r13        SL-Priority List-r13
    OPTIONAL        -- For Tx
    ]]
}
SL-PreconfigDiscRxPoolList-r13 ::=   SEQUENCE (SIZE (1..maxSL-DiscRxPoolPreconf-
r13)) OF SL-PreconfigDiscPool-r13
SL-PreconfigDiscTxPoolList-r13 ::=   SEQUENCE (SIZE (1..maxSL-DiscTxPoolPreconf
-r13)) OF SL-PreconfigDiscPool-r13
SL-PreconfigDiscPool-r13 ::=         SEQUENCE {
-- This IE is same as SL-DiscResourcePool with rxParameters absent
    cp-Len-r13                          SL-CP-Len-r12,
    discPeriod-r13                    ENUMERATED {rf4, rf6, rf7, rf8, rf12,
rf14, rf16, rf24, rf28, rf32, rf64, rf128, rf256, rf512, rf1024, spare},
    numRetx-r13                         INTEGER (0 .. 3),
    numRepetition-r13                   INTEGER (1 .. 50),
    tf-ResourceConfig-r13               SL-TF-ResourceConfig-r12,
    txParameters-r13                    SEQUENCE {
      txParametersGeneral-r13           P0-SL-r12,
      txProbability-r13                 ENUMERATED {p25, p50, p75, p100}
                              OPTIONAL,
    }
    ...
}
SL-PreconfigRelay-r13 ::=            SEQUENCE {
    reselectionInfoOoC-r13              ReselectionInfoRelay-r13
}
-- ASN1STOP
```

Table 5 shows description of SL-Preconfiguration fields.

TABLE 5

Description of SL-Preconfiguration fields carrierFreq

This field indicates the carrier frequency when the UE is out of the sidelink communication and sidelink discovery coverage. Frequency division duplex (FDD) may correspond to an uplink carrier frequency and the corresponding downlink frequency may be determined from default TX-RX frequency separation.
commRxPoolList This field indicates a list of receiving pools for the sidelink communication
in addition to a resource pool indicated by 'preconfigComm'.
commTxPoolList This field indicates a list of the transmitting pools for the sidelink communication in addition to the resource pool indicated by 'preconfigComm'.
preconfigComm This field indicates the list of the resource pools. A first resource pool in the list is used for both reception and transmission of the sidelink TABLE 5-continued Description of SL-Preconfiguration fields communication. When other resource pools are present, the corresponding resource pool is used only for the reception of the sidelink communication.
syncRefDiffHyst This field is hysteresis when evaluating a synchronization reference (SyncRef) UE by using a relative comparison. The value dB0 corresponds to 0 dB, the value dB3 corresponds to 3 dB, and other values are also similar. A value dBinf corresponds to infinite dB.
syncRefMinHyst This field is hysteresis when evaluating a synchronization reference (SyncRef) UE by using an absolute comparison. The value dB0 corresponds to 0 dB, the value dB3 corresponds to 3 dB, and other values are also similar.

Sidelink SL-V2X-Preconfiguration

The SL-V2X-Preconfiguration IE includes the sidelink pre-configured parameters used for the V2X sidelink communication.

Table 6 shows the V2X-Preconfiguration IE.

TABLE 6

```
-- ASN1START
SL-V2X-Preconfiguration-r14 ::=      SEQUENCE (SIZE (1..maxFreq)) OF SL-V2X-PreconfigFreqInfo-r14
SL-V2X-PreconfigFreqInfo-r14 ::=      SEQUENCE {
    v2x-CommPreconfigGeneral-r14          SL-PreconfigGeneral-r12,
    v2x-CommPreconfigSync-r14             SL-PreconfigSync-r12,
```

TABLE 6-continued

```
    v2x-CommRxPoolList-r14              SL-Preconfig V2X-RxPoolList-r14,
    v2x-CommTxPoolList-r14              SL-PreconfigV2X-TxPoolList-r14,
    v2x-ResourceSelectionConfig-r14     SL-
CommTxPoolSensingConfig-r14             OPTIONAL,
zoneConfig-r14                                        SL-ZoneConfig-r14
                              OPTIONAL,
    ...
}
SL-PreconfigV2X-RxPoolList-r14 ::= SEQUENCE    (SIZE    (1..maxSL-V2X-
RxPoolPreconf-r14)) OF SL-V2X-PreconfigCommPool-r14
SL-PreconfigV2X-TxPoolList-r14 ::= SEQUENCE    (SIZE    (1..maxSL-V2X-
TxPoolPreconf-r14)) OF SL-V2X-PreconfigCommPool-r14
SL-V2X-PreconfigCommPool-r14 ::=          SEQUENCE {
-- This IE is same as SL-V2X-CommResourcePool with rxParametersNCell absent
    sl-OffsetIndicator-r14              SL-OffsetIndicator-r12
      OPTIONAL,
    sl-Subframe-r14                     SubframeBitmapSL-r14,
    adjacency PSCCH-PSSCH-r14           BOOLEAN,
    sizeSubchannel-r14                  ENUMERATED {
                                          n4, n5, n6,
n8, n9, n10, n12, n15, n16, n18, n20, n25, n30,
                                          n48, n50,
n72, n75, n96, n100, spare13, spare12, spare11,
                                          spare10,
spare9, spare8, spare7, spare6, spare5, spare4,
                                          spare3,
spare2, spare1},
    numSubchannel-r14                   ENUMERATED {n1, n3,
n5, n10, n15, n20, spare2, spare1},
    startRB-Subchannel-r14              INTEGER (0..99),
    startRB-PSCCH-Pool-r14              INTEGER (0..99)
      OPTIONAL,
    dataTxParameters-r14                SL-TxParameters-r12
      OPTIONAL,
    zoneID-r14                                      INTEGER (0..7)
                              OPTIONAL,
    ...
}
END
-- ASN1STOP
```

Table 7 shows the description of the SL-V2X-Preconfiguration fields.

TABLE 7

Description of SL-V2X-Preconfiguration fields adjacencyPSCCH-PSSCH

This field indicates whether a physical sidelink control channel (PSCCH) and a physical sidelink shared channel (PSSCH) are continuously transmitted (indicated as TRUE) in an adjacent resource block (RB) or whether the PSCCH and the PSSCH are transmitted in an non-adjacent RB (indicated as FALSE). This parameter is shown only when the pool is configured so that the UE transmits the PSCCH and the PSSCH associated therewith in the same subframe.
numSubchannel This field indicates the number of subchannels in the corresponding resource pool.
sizeSubchannel This field indicates the number of physical resource blocks (PRBs) of each subchannel in the corresponding resource pool.
sl-OffsetIndicator This field indicates an offset of a first subframe of the resource pool within a system frame number (SFN) cycle. Otherwise, the resource pool starts from the first subframe of a frame with SFN = 0.
sl-Subframe This field indicates a bitmap of the resource pool. The bitmap is repeated within the SFN cycle.

TABLE 7-continued

Description of SL-V2X-Preconfiguration fields startRB-Subchannel

This field indicates a lowest RB index of a subchannel having a lowest index.
startRB-PSCCH-Pool This field indicates a lowest RB index of a PSCCH pool.
v2x-CommRxPoolList This field indicates a list of reception pools for the V2X sidelink communication.
v2x-CommTxPoolList This field indicates a list of transmission pools for the V2X sidelink communication.
v2x-ResourceSelectionConfig This field indicates a V2X sidelink communication configuration used for an autonomous resource selection of the UE.
zoneConfig This field indicates a zone configuration for the V2X sidelink communication.
zoneID This field indicates a zone ID for the UE to use the corresponding resource pool.

Attach Procedure

The UE/user needs to be registered in the network in order to receive a service for requesting registration. The registration is referred to as network attachment. Always-on Internet protocol (IP) connectivity for the UE/user of the EPS may be enabled by establishing a default EPS bearer during the network attachment. A policy and charging control (PCC) rule applied to the default EPS bearer may be pre-defined in P-GW and activated during attachment by the P-GW. In the attach procedure, one or multiple dedicated bearer establishment procedures may be triggered in order to establish a dedicated EPS bearer(s) for the UE and the UE may request IP address allocation.

During an initial attach procedure, a mobile equipment (ME) identity is obtained from the UE. An MME operator may check the ME identity by an equipment identity register (EIR). The MME delivers the ME identity to the HSS and the P-GW.

The E-UTRAN Initial Attach procedure needs to perform the emergency service, but is used for Emergency Attach by the UE which may not acquire a general service from the network. The UE is in the limited service state. Further, the UE is attached to the general service does not have the established emergency bearer and camps on the cell (e.g., a limited tracking area or not allowed Closed Subscriber Group (CSG)) in the limited service state also initiates the attach procedure while indicating that the corresponding attach is for receiving the emergency service. In general, when the UE (i.e., the UE which is not in the limited service state) which camps on the cell is not already attached, the UE should initiate general initial attach and should initiate a UE Requested PDN Connectivity procedure in order to receive the emergency EPS bearer service.

In order to restrict the load on the network, when E-UTRAN attach is performed by new PLMN (i.e., not registered PMN or not PLMN equivalent to the registered PLMN), the UE configured to perform attach by IMSI should identify itself instead of a stored temporary identifier at the time of changing the PLMN.

This procedure is also used for establish first PDN connection through the E-UTRAN when the UE already has a PDN connection activated via the non-3GPP access network and wishes to establish a PDN connection simultaneously with different access point names (APNs) through multiple accesses.

Figure 8:
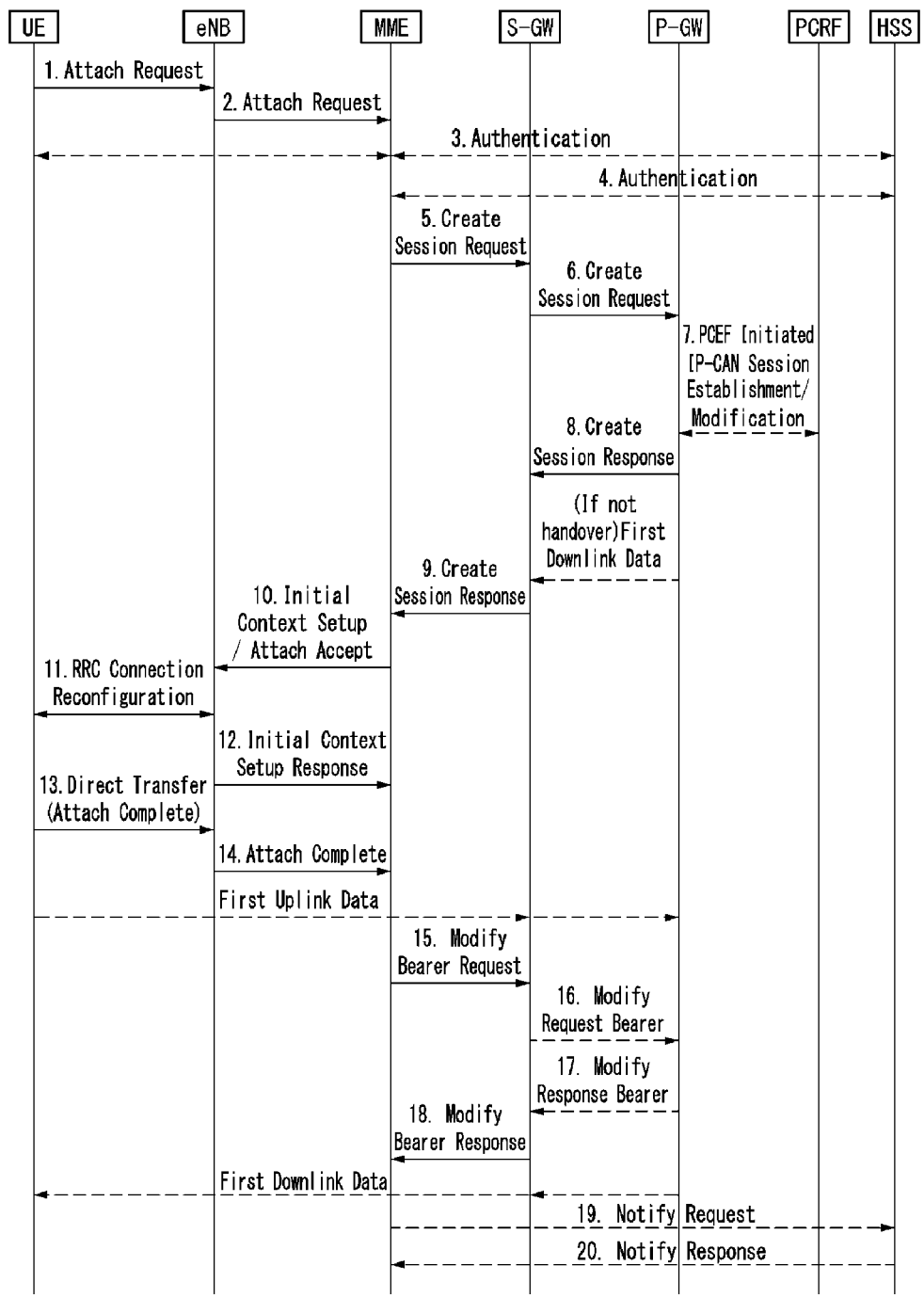
FIG. 8 is a diagram schematically exemplifying an attach procedure in a wireless communication system to which the present invention may be applied.

FIG. 8 is a diagram schematically exemplifying an attach procedure in a wireless communication system to which the present invention may be applied.

The Attach procedure is generally used for establishing connection with the network when the UE enters the E-UTRAN cell. Further, the Attach procedure may be used even when the non-3GPP network is handed over to the E-UTRAN.

1-2. The UE Initiates the Attach Procedure by Transmitting the Attach Request Message to the MME.

The Attach Request message includes an International Mobile Subscriber Identity (IMSI) of the UE, a PDN type requested by the UE, and the like. Here, the PDN type indicates an IP version (i.e., IPv4, IPv4v6, IPv6) requested by the UE.

The Attach Request message is forwarded while being included in the RRC Connection Setup Complete message in the RRC connection and forwarded while being included in the Initial UE message in the S1 signaling connection.

The UE may transmit the Attach Request message together with the PDN Connectivity Request message in order to request the PDN connectivity.

3. The MME requests information for authentication to the HSS and receives the requested information for UE authentication and performs mutual authentication with the UE.

4. The MME registers the location of the UE in the HSS and receives user subscription information (i.e., subscribed QoS Profile) from the HSS in order to generate a default bearer to the UE.

Here, in the case of dynamic IP address allocation, the subscription information does not include IP address information for the corresponding UE, but in the case of static IP address allocation, the subscription information includes static IP address information allocated to the corresponding UE.

5. The MME allocates a default EPS bearer ID and transmits a Create Session Request message to the S-GW.

The Create Session Request message includes the IMSI of the UE, the EPS bearer ID, a P-GW ID (i.e., P-GW address which the MME selects for creating the EPS bearer, a subscription QoS profile, a PDN type, an IP address (i.e., PDN address) of the UE, and the like.

Here, the PDN type similarly includes PDN type information received from the UE. In the case of the dynamic IP address allocation, the IP address of the UE may be set to 0 and in the case of the static IP address allocation, the IP address of the UE may be set to allocated static IP address information (included in the subscription information).

6. The S-GW allocates an S5 S-GW Tunnel Endpoint Identifier (TEID) to the corresponding P-GW included in the Create Session Request message received from the MME in order to generate a S5 bearer to the P-GW and transmits the Create Session Request message to the corresponding P-GW.

The Create Session Request message includes the IMSI of the UE, the EPS bearer ID, the S5 S-GW TEID, the APN, the subscription QoS profile, a PDN type (i.e., IP version), an IP address (i.e., PDN address) of the UE, and the like.

7. The P-GW allocates an Internet Protocol (IP) address to be used by the UE and performs an IP connectivity access network (IP-CAN) session establishment/modification procedure with the PCRF.

In this case, in the case of the dynamic IP address allocation, the IP address selected in the IP address pool possessed by the P-GW may be allocated to the UE and in the case of the static IP address allocation, static IP address information (included in the subscription information) allocated to the corresponding UE may be similarly allocated.

8. The P-GW allocates a P-GW Tunnel Endpoint Identifier (TEID) to the S-GW to create the S5 bearer and transmits a Create Session Response to the S-GW in response to the Create Session Request message.

The Create Session Response message includes the IMSI of the UE, the EPS bearer ID, the S5 S-GW TEID, the subscription QoS profile, the PDN type, the IP address (i.e., PDN address) allocated to the UE, and the like.

When the P-GW selects the PDN type different from the requested PDN type, the P-GW indicates to the UE a cause indicating why the PDN type is modified together with the PDN type.

When such a procedure is completed, creation of the S5 bearer between the S-GW and the P-GW is completed, and as a result, the S-GW may transmit uplink traffic to the P-GW or receive downlink traffic from the P-GW.

9. The S-GW allocates an S1 S-GW TEID P-GW to create the S1 bearer and transmits the Create Session Response to the MME in response to the Create Session Request message.

The Create Session Response message includes the IMSI of the UE, the EPS bearer ID, the S1 S-GW TEID, the PDN type, the IP address (i.e., PDN address) allocated to the UE, and the like.

10-11. The MME transmits an Attach Accept message to the UE in response to an Attach Accept message.

The Attach Accept message includes an EPS bearer ID, an APN, an IP address (i.e., a PDN address) of the UE allocated by the P-GW, a PDN type, a Tracking Area Identity (TAI) list, a TAU timer, and the like.

The Attach Accept message is included in an Initial Context Setup Request message and forwarded to the eNB in the S1 signaling connectivity.

When such a procedure is completed, creation of an uplink S1 bearer between the eNB and the S-GW may be completed and the eNB may transmit the uplink traffic to the S-GW.

In addition, the Attach Accept message is included in an RRC Connection Reconfiguration message and forwarded from the eNB to the UE in the RRC connectivity.

When such a procedure is completed, creation of DRB between the UE and the eNB is completed, and as a result, the UE may transmit the uplink traffic to the eNB or receive the downlink traffic from the eNB.

12. The eNB transmits an Initial Context Setup Response message to the MME in response to an Initial Context Setup Request message. The Initial Context Setup Response message includes an S1 eNB TEID and the like.

13-14. The UE transmits an Attach Complete message to the MME in response to the Attach Accept message.

The Attach Complete message is transferred while being included in a UL Information Transfer message in the RRC connectivity and transferred in an Uplink NAS Transport message in the S1 signaling connectivity.

When such a procedure is completed, creation of the default EPS bearer between the UE and the P-GW is completed, and as a result, the UE may transmit uplink data to the P-GW.

15. The MME transfers the S1 eNB TEID received from the eNB to the S-GW through a Modify Bearer Request message.

When such a procedure is completed, creation of a downlink S1 bearer between the eNB and the S-GW may be completed and the eNB may receive the downlink traffic from the S-GW.

16-17. As necessary, the bearer is updated between the S-GW and the P-GW.

18. The S-GW transmits a Modify Bearer Response message to the MME in response to the Modify Bearer Request message.

When such a procedure is completed, creation of the default EPS bearer between the UE and the P-GW is completed, and as a result, the P-GW may transmit downlink data to the UE. That is, the UE may establish the connection with the PDN and receive a PDN service by using the allocated IP address.

19. The MME sends a Notify Request message including the P-GW ID (i.e., P-GW address) and APN to the HSS as needed.

20. The HSS transmits a Notify Response message including the P-GW ID (i.e., P-GW address) and an associated APN to the MME.

Supporting V2X Communication Via PC5 During IMS Emergency Call (eCall)

1. Principle for Applying Parameters for V2X Communication Via PC5 Reference Point For V2X communication over PC5, the operator may pre-configure the UEs with the provisioning parameters required for V2X Communication, without the need for the UEs to connect to the V2X Control Function to obtain an initial configuration.

The following matters are applied:

Provisioning parameters for V2X communication via PC5 may be configured in the Universal Integrated Circuit Card (UICC) or in the ME or both in the UICC and the ME.

When both the UICC and the ME contain a set of the same provisioning parameters, the set of parameters takes precedence from the UICC.

The UE uses resources for the V2X communication through the PC5 reference point as follows:

When the UE has the serving cell and the UE camps on the cell and the UE intends to use a V2X service radio resource, the UE uses the radio resource description indicated by the cell which the UE camps on and ignores any radio resource description of the same radio resource provisioned in the ME or the UICC. When the cell does not provide the radio resource for the V2X service, the UE does not perform V2X message transmission and reception on the radio resource operated by the corresponding cell.

When the UE intends to the radio resource (i.e. carrier frequency) for V2X service that are not operated by the UE's serving cell or if the UE is out of coverage, the UE searches for a cell in any PLMN that operates the provisioned radio resources (i.e. carrier frequency).

When the UE finds the cell in the registered PLMN or the PLMN equivalent to the registered PLMN and is authorized for the V2X communication via the PC5 reference point by the PLMN, the UE uses the radio resource description indicated by the corresponding cell. When the cell does not provide the radio resource for the V2X service, the UE does not perform V2X message transmission and reception on the radio resource.

When the UE finds the cell in the registered PLMN or PLMN other than the PLMN equivalent to the registered PLMN, the corresponding cell belongs to PLMN authorized for the V2X communication through the PC5 reference point, and the corresponding cell provides the radio resource for the V2X service, the UE performs PLMN selection triggered by the V2X communication via the PC5 reference point. When the UE has activated emergency PDN connectivity, this does not trigger any PLMN selection due to the V2X communication through the PC5 reference point.

When the UE finds the cell the PLMN other than the PLMN authorized for the V2X communication through the PC5 reference point, the UE does not use the V2X communication through the PC5 reference point.

When the UE does not find any cell in any PLMN, it is regarded that the UE is "not served by E-UTRAN" and uses the provisioned radio resource in the ME or the UICC. If no such provisioning exists in the ME or the UICC or the provisioning is not authorized in the V2X communication over PC5 reference point, the UE is not authorized for transmission.

UE provisioning supports setting of Geographical Areas.
The V2X communication through the PC5 reference point is limited only for the E-UTRA.

2. V2X Message Transmission/Reception Via PC5 Reference Point

The PC5 reference point is used for transmission and reception of the V2X message. The V2X communication via the PC5 reference point supports roaming and an inter-PLMN operation. When the UE is served by E-UTRAN and not served by E-UTRAN, the V2X communication via the PC5 reference point is supported.

The UE is authorized to transmit and receive the V2X message by the V2X Control Function in the home PLMN of the UE.

The V2X communication via the PC5 reference point is a type of ProSe direct communication having the following features:
 The V2X communication via the PC5 reference point is connectionless and has no signaling through a PC5 control plane for connection establishment.
 The V2X message is exchanged between PC5 user planes.
 Both IP based and non-IP based messages are supported.
 In the case of the IP based V2X message, only IP version 6 (IPv6) is used and IP version 4 (IPv4) is not supported.

When the UE has the activated emergency PDN connection, the communication over the emergency PDN connection is prioritized over the V2X communication over the PC5 reference point based on regional/national regulatory requirements and operator policies.

3. Supporting V2X Communication for UE in Limited Service State

In the case of the UE in the limited service state, only the V2X communication via the PC5 reference point is allowed.

The UE that is authorized to use the V2X communication over the PC5 reference point may use the V2X communication over the PC5 reference point in accordance with the principle defined for the V2X communication over the PC5 reference point when the UE is in the limited service state. The UE enters the limited service state in the following situations:
 when the UE may not find the suitable cell in the selected PLMN: or
 when a "PLMN not allowed"/"GPRS not allowed" response is received with respect to a registration request:

The UE in the limited service state may use the V2X communication over the PC5 reference point in the ECM-IDLE mode.

The UE does not use V2X communication over PC5 reference point, if the UE has entered in the limited service state due to all other situations (e.g., when there is no SIM in the MS, when receiving an "illegal MS" or "illegal ME" response to a registration request, or when receiving an "IMSI unknown in HLR" response to a registration request). In this case, the UE may not receive a general service from the PLMN.

Clarification for V2X Communication Over PC5 in Limited Service State

1. Policy/Parameter Provisioning

The following information is provisioned to the UE for the V2X communication via the PC5 reference point:
1) Authorization Policy
 When the UE is "served by E-UTRAN": PLMNs in which the UE is authorized to perform V2X communications over PC5 reference point.
 When the UE is "not served by E-UTRAN": Indicates whether the UE is authorized to perform V2X communications over PC5 reference point when "not served by E-UTRAN".

Radio Parameters for when the UE is "not Served by E-UTRAN":
 Includes the radio parameters with Geographical Area(s) that to enable the UE to perform V2X communications over PC5 reference point when the UE is "not served by E-UTRAN". These radio parameters (e.g., frequency bands) contain an indication of whether they are "operator managed" or "non-operator managed". The UE uses the radio parameters only when the UE may reliably locate itself in the corresponding Geographical Area. Otherwise, the UE is not authorized to transmit.

3) Policy/Parameters for V2X Communication Over PC5 Reference Point:
 The mapping of Destination Layer-2 ID(s) and the V2X services.
 The mapping of ProSe Per-Packet Priority and packet delay budget for V2X communication (autonomous resources selection mode).

2. Principle for Applying Parameters for V2X Communication Via PC5 Reference Point For V2X communication over PC5, the operator may pre-configure the UEs with the provisioning parameters required for V2X Communication, without the need for the UEs to connect to the V2X Control Function to obtain an initial configuration.

The following matters are applied:
 Provisioning parameters for V2X communication via PC5 may be configured in the Universal Integrated Circuit Card (UICC) or in the ME or both in the UICC and the ME.
 The ME provisioning parameters are not be erased when a USIM is deselected or replaced.
 When both the UICC and the ME contain a set of the same provisioning parameters, the set of parameters takes precedence from the UICC.
 The UE uses resources for the V2X communication through the PC5 reference point as follows:
 When a UE has a serving cell and is camped on a cell and the UE intends to use for V2X service the radio resources, the UE uses the radio resource description indicated by the cell in which the UE is camped on and ignores any radio resource description of the same radio resource provisioned in the ME or the UICC. When the cell does not provide the radio resource for the V2X service, the UE does not perform V2X message transmission and reception on the radio resource operated by the corresponding cell.
 If the UE intends to use "operator-managed" radio resources (i.e. carrier frequency) for V2X service that are not operated by the UE's serving cell or if the UE is out of coverage, the UE searches for a cell in any PLMN that operates the provisioned radio resources (i.e. carrier frequency).
 When the UE finds the registered PLMN or such a cell in the PLMN equivalent to the registered PLMN and is authorized for the V2X communication via the PC5 reference point by the PLMN, the UE uses the radio resource description indicated by the corresponding cell. When the cell does not provide the radio resource for the V2X service, the UE does not perform V2X message transmission and reception on the radio resource.

When the UE finds the cell in the registered PLMN or PLMN other than the PLMN equivalent to the registered PLMN, the corresponding cell belongs to PLMN authorized for the V2X communication through the PC5 reference point, and the corresponding cell provides the radio resource for the V2X service, the UE performs PLMN selection triggered by the V2X communication via the PC5 reference point. When the UE has activated emergency PDN connectivity, this does not trigger any PLMN selection due to the V2X communication through the PC5 reference point.

When the UE finds the cell the PLMN other than the PLMN authorized for the V2X communication through the PC5 reference point, the UE does not use the V2X communication through the PC5 reference point.

If the UE does not find any such cell in any PLMN, the UE is "not served by E-UTRAN" and uses radio resources provisioned in the ME or the UICC. If no such provisioning exists in the ME or the UICC or the provisioning is not authorized in the V2X communication over PC5 reference point, the UE is not authorized for transmission.

If the UE intends to use "non-operator-managed" radio resources (i.e. carrier frequency) for V2X service, the UE performs V2X communication over PC5 using resources provisioned in the ME or the UICC. If no such provision exists in the ME or the UICC or the provision is not authorized in the V2X communication over PC5 reference, the UE is not authorized to transmit.

UE provisioning supports setting of Geographical Areas.
The V2X communication through the PC5 reference point is limited only for the E-UTRA.

For example, when the UE is in coverage of a 3GPP RAT, the UE may determine that the UE is located in a specific geographical area by using information derived from the serving PLMN. When the UE is not in coverage of the 3GPP RAT, the UE may determine that the UE is located in a specific geographical area by using other techniques (e.g., Global Navigation Satellite System (GNSS)).

3. Supporting V2X Communication for UE in Limited Service State

In the case of the UE in the limited service state, only the V2X communication via the PC5 reference point is allowed.

The UE that is authorized to use the V2X communication over the PC5 reference point may use the V2X communication over the PC5 reference point in accordance with the principle defined for the V2X communication over the PC5 reference point when the UE is in the limited service state. The UE enters the limited service state in the following situation:

when the UE may not find the suitable cell in the selected PLMN; or
when a "PLMN not allowed"/"GPRS not allowed" response is received with respect to a registration request:

A UE in the limited service state only use the radio resources and procedure available in the ECM-IDLE mode for V2X communication over PC5 reference point.

The UE in the limited service state does not use V2X communication over PC5 reference point in the ECM-CONNECTED mode.

UEs do not use V2X communication over PC5 reference point using "operator-managed" radio resources, if the UE has entered in the limited service state due to all other situations (e.g., when there is no SIM in the MS, when receiving an "illegal MS" or "illegal ME" response to a registration request, or when receiving an "IMSI unknown in HLR" response to a registration request). In this case, the UE may not receive a general service from the PLMN. The UEs may use V2X communication over PC5 reference point using the "non-operator-managed" radio resources.

Handling of Emergency Calls in Limited Service Mode

According to the contents to be described below, when the UE is in the limited service state, information indicating that the UE is in the limited service state is included in an S1-AP message (e.g., Initial Context Setup Request message) provided to the eNB by the MME.

1. Initial Context Setup

The purpose of the Initial Context Setup procedure is to establish the necessary overall initial UE Context, and the overall UE context includes an E-UTRAN Radio Access Bearer (E-RAB) context, a Security Key, a Handover Restriction List, a UE Radio capability, and a UE Security Capability, etc. The procedure uses UE-associated signaling.

Figure 9:
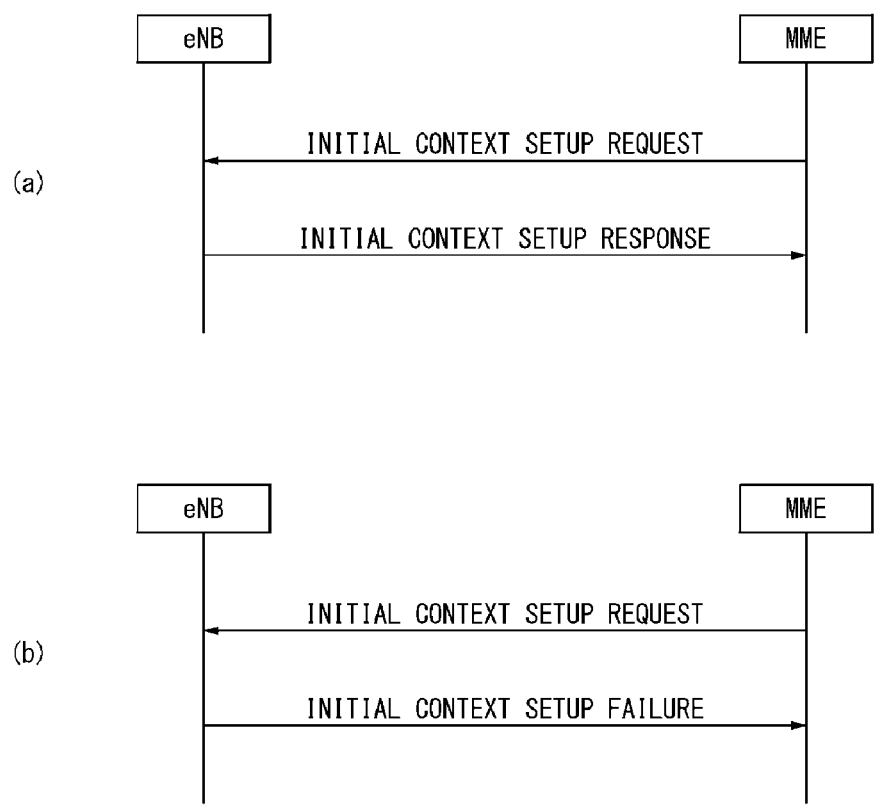
FIG. 9 illustrates an initial context setup procedure in a wireless communication system to which the present invention may be applied.

FIG. 9 illustrates an initial context setup procedure in a wireless communication system to which the present invention may be applied.

FIG. 9A illustrates a successful operation and FIG. 9B illustrates an unsuccessful operation.

1) Successful Operation

For E-RAB establishment, the MME needs to be prepared to receive user data before the INITIAL CONTEXT SETUP RESPONSE message is received.

The INITIAL CONTEXT SETUP REQUEST message includes information required by the eNB to establish a new E-RAB configuration that includes at least one additional E-RAB in an E-RAB to be Setup List IE.

The E-RAB to be Setup List IE may include the following.

NAS-PDU IE

The INITIAL CONTEXT SETUP REQUEST message may include the following:

Trace Activation IE
Handover Restriction List IE, in which IE may contain roaming, area or access restrictions.
UE Radio Capability IE
Subscriber Profile ID for RAT/Frequency priority IE
CS Fallback Indicator IE
  Single Radio Voice Call Continuity (SRVCC) Operation Possible IE The INITIAL CONTEXT SETUP REQUEST message may include a Subscriber Profile ID for RAT/Frequency priority IE if available in the MME.

When receiving the INITIAL CONTEXT SETUP REQUEST message, the eNB operates as follows:

The eNB attempts to execute the requested E-RAB configuration.
The eNB stores a UE Aggregate Maximum Bit Rate (AMBR) in the UE context, and use the received UE AMBR for a non-Guaranteed Bit Rate (non-GBR) bearer for the corresponding UE.
The eNB transfers a value contained in the E-RAB ID IE and the NAS-PDU IE received for the E-RAB for each established data radio bearer to the radio interface protocol. The eNB does not transmit an NAS PDU associated with an unsuccessful data radio bearer to the UE.

Further, the eNB stores the received Handover restriction List in the UE context.

Further, the eNB stores the received UE Radio Capability in the UE context.

The eNB stores the received Subscriber Profile ID for RAT/Frequency priority in the UE context.

The eNB stores the received SRVCC operation possible in the UE context.

The eNB stores the received UE Security Capabilities in the UE context.

The eNB stores the received Security Key in the UE context.

For the Initial Context Setup, a value for a Next Hop Chaining Count is stored in the UE context.

Allocation of resources according to values of the Allocation and Retention Priority IE follows the principles described for the E-RAB Setup procedure.

The eNB uses the information in the Handover Restriction List IE to determine a target cell for handover if the Handover Restriction List IE is present in the INITIAL CONTEXT SETUP REQUEST message. If the Handover Restriction List IE is not contained in the INITIAL CONTEXT SETUP REQUEST message, the target eNB considers that the roaming area or the access restriction is not applied to the UE.

If the Trace activation IE is included in the INITIAL CONTEXT SETUP REQUEST message, the eNB, if supported, initiates the requested trace function.

If the CS Fallback Indicator IE is included in the INITIAL CONTEXT SETUP REQUEST message, it indicates that the UE Context to be setup is subjected to CS Fallback.

If the UE Security Capabilities IE included in the INITIAL CONTEXT SETUP REQUEST message contains only an EIA0 algorithm and the EIA0 algorithm is defined in the configured list of allowed integrity protection algorithms in the eNB, the eNB uses the corresponding algorithms and ignores the keys received in the Security Key IE.

The eNB reports to the MME, in the INITIAL CONTEXT SETUP RESPONSE message, the successful establishment of the security procedures with the UE, and the result for all the requested E-RABs in the following method:

A list of E-RABs which are successfully established is included in an E-RAB Setup List IE.

A list of E-RABs which failed to be established is included in an E-RAB Failed to Setup List IE.

When the eNB reports the unsuccessful establishment of the E-RAB, the cause value needs to be precise enough to enable the MME to know the reason for the unsuccessful establishment (e.g., "Radio resources not available", "Failure in the Radio Interface Procedure", etc.).

After transmitting the INITIAL CONTEXT SETUP RESPONSE message, the procedure is terminated in the eNB.

2) Unsuccessful Operation

When the eNB may not establish the S1 UE context, or when the eNB may not also establish one non-GBR bearer, the eNB regards the procedure as failed and responds with the INITIAL CONTEXT SETUP FAILURE message.

3) Abnormal Conditions

If the eNB receives an INITIAL CONTEXT SETUP REQUEST message which contains an E-RAB Level QoS Parameters IE which contains a QoS Class Identifier (QCI) IE indicating a GBR bearer and an E-RAB Level QoS Parameters IE without containing the GBR QOS Information IE, the eNB considers the establishment of the corresponding E-RAB as failed.

If the eNB receives an INITIAL CONTEXT SETUP REQUEST message containing several E-RAB ID IEs (in the E-RAB to Be Setup List) set to the same value, the eNB considers the establishment of the corresponding E-RABs as failed.

If the algorithms supported for encryption are defined in the Encryption Algorithms IE in the UE Security Capabilities IE, but do not match any allowed algorithms defined in the configured list of allowed encryption algorithms in the eNB, the eNB rejects the procedure using the INITIAL CONTEXT SETUP FAILURE message.

If the algorithms supported for integrity are defined in the Integrity Protection Algorithms IE in the UE Security Capabilities IE, but do not match any allowed algorithms defined in the configured list of allowed integrity protection algorithms in the eNB, the eNB rejects the procedure using the INITIAL CONTEXT SETUP FAILURE message.

2. UE Context Modification

The purpose of the UE Context Modification procedure is to partially modify the established UE Context (e.g., Security Key, Subscriber Profile ID for RAT/Frequency priority, etc.). The procedure uses UE-associated signaling.

Figure 10:
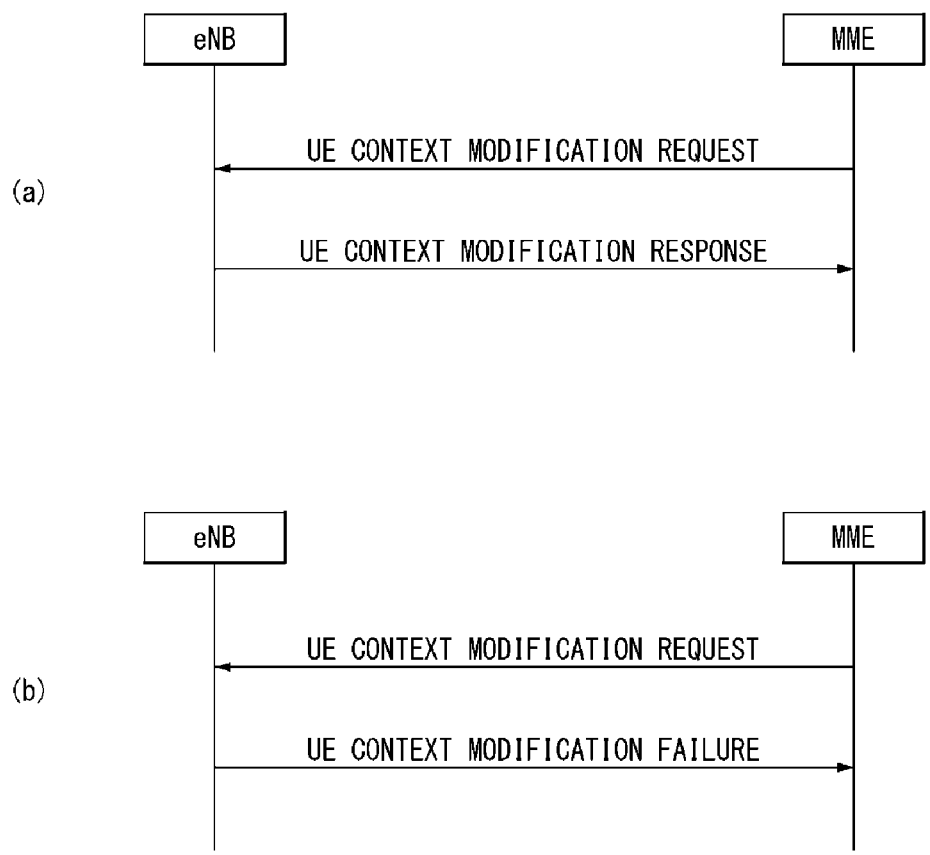
FIG. 10 illustrates a UE context modification procedure in a wireless communication system to which the present invention may be applied.

FIG. 10 illustrates a UE context modification procedure in a wireless communication system to which the present invention may be applied.

FIG. 10A illustrates a successful operation and FIG. 10B illustrates an unsuccessful operation.

1) Successful Operation

The UE CONTEXT MODIFICATION REQUEST message may contain the following:

Security Key IE

Subscriber Profile ID for RAT/Frequency priority IE

UE Aggregate Maximum Bit Rate IE

CS Fallback Indicator IE

UE Security Capabilities IE

When receiving the UE CONTEXT MODIFICATION REQUEST message, the eNB operates as follows:

The eNB stores the received Security Key IE, the Security Key IE is used as the initial value of a Next Hop Chaning Counter (NCC).

The eNB stores the received UE Security Capabilities IE and use it together with the received key when the EIA0 algorithm is used.

The eNB stores and uses the Subscriber Profile ID for RAT/Frequency priority IE.

If the UE Aggregate Maximum Bit Rate IE is included in the UE CONTEXT MODIFICATION REQUEST, the eNB operates as follows:

UE Aggregate Maximum Bit Rate provided previously replace the previously provided UE Aggregate Maximum Bit Rate by the UE AMBR receiving the previously provided UE AMBR in the UE context: the eNB uses the received UE AMBR for non-GBR Bearers for the corresponding UE.

If the UE Aggregate Maximum Bit Rate IE is not contained in the UE CONTEXT MODIFICATION REQUEST message, the eNB uses the previously provided UE AMBR which is stored in the UE context.

If the CS Fallback Indicator IE is included in the INITIAL CONTEXT SETUP REQUEST message, it indicates that the corresponding UE Context is subjected to CS Fallback.

The eNB reports, in the UE CONTEXT MODIFICATION RESPONSE message, to the MME, the successful update of the UE context as follows:

After transmitting the UE CONTEXT MODIFICATION RESPONSE message, the procedure is terminated in the eNB.

2) Unsuccessful Operation

When the UE context update cannot be performed successfully, the eNB transmits the UE CONTEXT MODIFICATION FAILURE message to the MME with an appropriate cause value in the Cause IE.

3. Handover Resource Allocation

The purpose of the Handover Resource Allocation procedure is to reserve resources at the target eNB for the handover of a UE.

FIG. 11 illustrates a handover resource allocation procedure in a wireless communication system to which the present invention may be applied.

FIG. 11A illustrates a successful operation and FIG. 11B illustrates an unsuccessful operation.

1) Successful Operation

The MME initiates the procedure by transmitting a HANDOVER REQUEST message to the target eNB. The HANDOVER REQUEST message may contain a Handover Restriction List IE, which contains a roaming area or access restrictions.

If the Handover Restriction List IE is contained in the HANDOVER REQUEST message, the target eNB stores this information in the UE context.

The eNB uses the information in the Handover Restriction List IE to determine a target cell for handover if the Handover Restriction List IE is present in the HANDOVER REQUEST message. If the Handover Restriction List IE is not contained in the HANDOVER REQUEST message, the target eNB considers that the access restriction is not applies to the UE.

When receiving the HANDOVER REQUEST message, the eNB stores the received UE Security Capabilities IE in the UE context and uses the stored UE Security Capabilities IE to prepare the configuration of the AS security related with the UE.

If a SRVCC Operation Possible IE is included in the HANDOVER REQUEST message, the target eNB stores the received SRVCC operation possible IE in the UE context and uses the stored SRVCC operation possible IE.

When receiving the HANDOVER REQUEST message, the eNB stores the received Security Context IE in the UE context and uses the stored Security Context IE to derive the security configuration.

If the Trace activation IE is included in the HANDOVER REQUEST message, the target eNB initiates the requested trace function.

If the Subscriber Profile ID for RAT/Frequency priority IE is contained in a Source eNB to Target eNB Transparent Container IE, the target eNB stores the received Subscriber Profile ID for RAT/Frequency priority in the UE context.

When receiving a UE History Information IE, which is included in the Source eNB to Target eNB Transparent Container IE in the HANDOVER REQUEST message, the target eNB collects the information in the UE History Information IE while the UE stays in one of its cells, and uses the collected information for future handover preparations.

After all required resources for the admitted E-RABs have been allocated, the target eNB generates a HANDOVER REQUEST ACKNOWLEDGE message. The target eNB includes an E-RABs Admitted List IE in which resources have been prepared at the target cell. The E-RABs that have not been admitted in the target cell are included in an E-RABs Failed to Setup List IE.

For each bearer that target eNB has decided to admit and for which DL forwarding IE is set to "DL forwarding proposed", the target eNB may include a DL GPRS Tunnelling Protocol (GTP)-Tunnel endpoint identifier (TEID) IE indicating that it accepts the proposed forwarding of downlink data for this bearer and a DL Transport Layer Address IE in the E-RABs Admitted List IE in the HANDOVER REQUEST ACKNOWLEDGE.

If the HANDOVER REQUEST ACKNOWLEDGE message contains UL GTP-TEID IE and UL Transport Layer Address IE for a bearer in the E-RABs Admitted List IE, the target eNB requests forwarding of uplink data for this bearer.

If the Request Type IE is included in the HANDOVER REQUEST message, the target eNB performs the requested location reporting function for the UE.

If the UE Security Capabilities IE including only the EIA0 algorithm is included in the HANDOVER REQUEST message and if the EIA0 algorithm is defined in the configured list of allowed integrity protection algorithms in the eNB, the eNB uses the corresponding algorithm and ignores the keys received in the Security Context IE.

2) Unsuccessful Operation

If the target eNB does not admit at least one non-GBR E-RAB, or a failure occurs during the Handover Preparation, the target eNB transmits the HANDOVER FAILURE message to the MME with an appropriate cause value.

If the target eNB receives a HANDOVER REQUEST message containing an RRC Container IE that does not include required information, the target eNB transmits the HANDOVER FAILURE message to the MME.

3) Abnormal Conditions

If the eNB receives a HANDOVER REQUEST message containing a E-RAB Level QoS Parameters IE which contains a QCI IE indicating a GBR bearer and does not contain the GBR QOS Information IE, the eNB does not accept the corresponding E-RAB.

If the eNB receives a HANDOVER REQUEST message containing several E-RAB ID IEs (in the E-RAB to Be Setup List) set to the same value, the eNB does not accept the corresponding E-RAB.

If the Subscriber Profile ID for RAT/Frequency priority IE is not contained in the Source eNB to Target eNB Transparent Container IE, the target eNB shall trigger a local error handling.

If the supported algorithms for encryption defined in the Encryption Algorithms IE in the UE Security Capabilities IE are not matched with any allowed algorithms defined in the configured list of allowed encryption algorithms in the eNB, the eNB rejects the procedure using the HANDOVER FAILURE message.

If the supported algorithms for integrity defined in the Integrity Protection Algorithms IE in the UE Security Capabilities IE are not matched with any allowed algorithms defined in the configured list of allowed integrity protection algorithms in the eNB, the eNB rejects the procedure using the HANDOVER FAILURE message.

Table 8 shows the UE CONTEXT MODIFICATION REQUEST message.

This message is transmitted by the MME to provide changes in UE Context information to the eNB.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A new KeNB is provided after a key change procedure in the MME is performed. | YES | reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |

Referring to Table 8, the IE/Group Name represents the name of an IE or an information element group (IE group). 'M' in a Presence field as a mandatory IE represents an IE/IE group always included in the message, and 'O' as an optional IE represents an IE/IE group that may be included in the message or not included in the message, and 'C' represents as a conditional IE represents an IE/IE group included in the message only when a specific condition is satisfied. A Range field represents the number of repetitive IEs/IE groups which may be repeated.

An IE type and reference field represents a type (e.g., ENUMERATED data, INTEGER, OCTET STRING, etc.) of the corresponding IE and represents a range of a value when the range of a value which the corresponding IE may have exists.

A Criticality field represents criticality information applied to the IE/IE group. The criticality information refers to information indicating how a receiver should operate in the case where the receiver does not understand the entirety or a part of the IE/IE group. '-' represents that the criticality information is not applied and 'YES' represents that the criticality information is applied. 'GLOBAL' indicates that there is one criticality information common to the IE and repetition of the corresponding IE. 'EACH' indicates that there is unique criticality information for each repetition of the IE. An Assigned Criticality field indicates actual criticality information.

The detailed description of the information element (IE) or the IE group included in the UE CONTEXT MODIFICATION REQUEST message has been described above and thus will be omitted.

Table 9 shows the UE Security Capabilities IE.

This IE defines the supported algorithms for encryption and integrity protection in the UE.

TABLE 9

| IE/Group Name | Presence | Range | IE type and reference | Semantics description |
|---|---|---|---|---|
| UE Security Capabilities | | | | |
| >Encryption Algorithms | M | | Bit string (16, . . . ) | Each position in the bitmap represents an encryption algorithm: "all bits equal to 0" — UE supports no other algorithm than EEA0 "first bit" — 128-EEA1, "second bit" — 128-EEA2, other bits are reserved. Value '1' indicates support of the algorithm and value '0' indicates no support of the algorithm. |
| >Integrity Protection Algorithms | M | | Bit string (16, ...) | Each position in the bitmap represents an integrity protection algorithm: "all bits equal to 0" — UE supports no other algorithm than EIA0 "first bit" — 128-EIA1, "second bit" — 128-EIA2, other bits are reserved. Value '1' indicates support of the algorithm and value '0' indicates no support of the algorithm. |

Method for Performing V2X Communication Via PC5 (i.e., UE-to-UE Radio Interface) by UE in Limited Service State 1) Problem 1

According to the operation in the related art, the UE in the limited service state may perform attach for the emergency bearer service. When the attach for the emergency bearer service is successfully performed, the UE may use the emergency bearer service in the EMM-CONNECTED state.

However, in the attach for emergency bearer service, the process of delivering the UE context related to the V2X service of the UE to the eNB by the MME is not performed. Accordingly, even though the attach for emergency bearer service is performed, the eNB does not have the context related to the V2X service of the UE.

In this case, when the UE desires to perform the V2X communication over PC5, the UE needs to request a radio resource for the V2X communication over PC5 to the eNB because the UE is in the EMM-CONNECTED state. To this end, the UE (AS layer) transmits the sidelink UE information message to the eNB (base station).

However, since the eNB receiving the sidelink UE information message does not have the V2X service related UE context for the corresponding UE, the eNB may not confirm the V2X related authorization/capability for the UE. Therefore, the eNB may not accept the response to the sidelink UE information message. That is, the eNB may provide the radio resource for the V2X communication to the UE.

As a result, the UE may not perform the V2X communication over PC5 because the UE is not allocated the radio resource for the V2X communication over PC5.

In general, in the V2X service, the vehicle (i.e., vehicle UE) transmits a periodic V2X message (e.g., generally transmits the periodic V2X message every 10 times per second in order to announce a position, a speed, and existence of the vehicle) and transmits the V2X message (e.g., announcement of brake failure, accident announcement, etc.) to nearby vehicles by using the PC5 even when an event occurs. However, when an accident occurs in any vehicle, if the emergency call is initiated in the limited service state, the V2X message may not be transmitted to the surrounding vehicles while the emergency call is ongoing.

2) Problem 2

According to the operation in the related art, when a cell on which the UE in the limited service state and the EMM-IDLE state camps sends V2X related information to broadcasting information, but does not broadcast a resource pool for V2X message transmission (i.e., when the UE establishes the RRC connection with the eNB and the corresponding UE has to transmit the V2X message through a dedicated resource for itself), the UE needs to switch to EMM-CONNECTED and request the V2X communication to the eNB in order to perform the V2X communication.

However, since the UE in the limited service state may not perform location registration (LR) other than the attach for the emergency bearer service, the UE may switch to EMM-CONNECTED. Accordingly, the UE may not request the radio resource for the V2X communication to the eNB, and as a result, the UE may not perform the V2X communication.

3) Problem 3

In a scenario of Problem 1 described above, according to the operation in the related art, the UE in the limited service state may successfully perform the attach for the emergency bearer service and switch to EMM-CONNECTED for the emergency bearer service.

In this case, the UE should satisfy a precondition described in 3GPP TS 24.386 in order to perform the V2X communication via the PC5 (see the V2X communication and the limited service state described above).

However, the PLMN in which the UE is registered may not be included in an authorized PLMN list (i.e., the list of PLMNs in which the UE is authorized to use the V2X communication over PC5 when the UE is "served by E-UTRAN"). In this case, the UE may not perform the V2X communication over PC5. As a result, the V2X message may not be generated in the V2X layer of the UE or the sidelink UE information message may not be transmitted in the RRC layer.

4) Problem 4

According to the related art, the operation of performing the V2X communication over PC5 when the UE is "Not served by E-UTRAN" is described (see one-to-many Prose direct communication transmission not served by the E-UTRAN above).

In this case, the UE may perform PLMN selection triggered by ProSe direct communication specified by 3GPP TS 23.122 when interference exists through an interference check for a configured radio parameter.

In the ProSe direct communication, only one frequency (carrier) for the ProSe direct communication exists.

On the contrary, in the case of the V2X communication over PC5, one or more frequencies may be configured. In this case, when interference exists at a specific frequency, if the UE performs PLMN selection, unnecessary signaling overhead and service support occur.

5) Problem 5

When the UE performs both the V2X communication over PC5 and a normal service (e.g., IMS call) over LTE-Uu, which service of two services is performed first is discussed and the following operation is proposed.

When the uplink transmission (UL TX) in the time domain overlaps with sidelink transmission (SL TX) within the shared (or the same) carrier frequency, if a ProSe priority per packet (PPPP) for each packet of an SL packet exceeds a (pre)configured PPPP threshold value, the UE drops the UL TX and otherwise, the UE drops the SL TX.

The above contents may be interpreted as the PPPP threshold value being configured and if a PPPP is higher than the PPPP threshold value, the sidelink is first transmitted and otherwise, the uplink is first transmitted.

When it is assumed that the service for the corresponding LTE-Uu (UL TX) is the emergency call, if a packet for the LTE-Uu (UL TX) is dropped according to the above proposal, the emergency call may not be performed.

As an alternative thereto, when the emergency call occurs, an operation of processing prior to the V2X communication over PC5 is proposed. That is, when the UE has an active emergency PDN connection, the communication over the LTE-Uu takes precedence over the V2X communication over PC5.

In order to perform such an operation, the eNB needs to know that the corresponding UE is in an emergency service.

However, when the emergency PDN connection is generated in the EMM-CONNECTED mode, the eNB may not recognize that the UE is in the emergency service, and as a result, an operation is proposed in which the MME announces that the UE is in the emergency service to the eNB when the PDN connection is an emergency PDN type. That is, when the UE is authorized for the V2X communication and begins to establish the emergency PDN connection, the MME announces to the eNB that the emergency connection for the UE is established. In such a procedure, an operation in the network (eNB) is proposed.

However, in such a proposal, an additional S1-AP signaling operation occurs as compared with the related art. In addition, in this case, signaling of a radio interval for requesting the resource for the V2X message may not be reduced. Even when a cooperative awareness message (CAM) is generated in the UE which is in the emergency bearer service, the UE needs to transmit a sidelink buffer status report (BSR) for requesting the resource for the CAM to the eNB. Accordingly, unnecessary signaling and radio resources are wasted due to the sidelink BSR for the CAM which is not particularly sent in the emergency situation.

6) Problem 6

According to the related art, the following points are agreed in 3GPP SA.

"When the UE has an active emergency PDN connection, the communication over the emergency PDN connection is prioritized over the V2X communication over a PC5 reference point based on regional/national regulatory requirements and operator policies." (see V2X communication support over PC5 during IMS emergency call (eCall) described above).

In 3GPP RAN2, a discussion related to prioritization of LTE-Uu and PCT transmissions is in progress. For prioritization between the emergency PDN connection and the V2X communication over PC5, the following information is required in the RRC layer of the UE.
 1) Whether the UE has the emergency PDN connection
 2) whether the communication over the emergency PDN connection needs to be prioritized over the V2X communication over the PC5 reference point based on regional/national regulatory requirements and operator policies Referring to 1) above, when the UE performs the attach for the emergency PDN connection in the EMM-IDLE mode, the NAS layer of the UE delivers an RRC establishment cause to the RRC layer of the UE together with an attach request message. In this case, since the 'emergency call' is displayed in the RRC establishment cause, the RRC layer of the UE may recognize that there is the emergency PDN connection. However, when the UE establishes the emergency PDN connection in the EMM-CONNECTED mode, since the NAS layer of the UE does not deliver the RRC establishment cause to the RRC layer of the UE, the RRC layer of the UE does not recognize the RRC establishment cause.

Referring to 2) described above, the corresponding information may be (pre)configured in the UE. However, the RRC layer of the UE may not know the set value.

In order to solve such a problem, the present invention intends to propose a method for performing the V2X communication over PC5 by the UE in the limited service state.

Hereinafter, in the description of the present invention, with respect to a resource allocation mode, Mode 3 means a mode in which the eNB (base station) providing the V2X service (e.g., V2X communication) dynamically allocates a specific resource to be used by the UE and the UE confirms the physical channel, confirms a resource to be used thereby, and then, performs transmission by using the corresponding resource.

Mode 4 refers to a mode in which the UE autonomously transmit the message by selecting the resource for transmission after receiving one or multiple transmission resource pools from the network.

As a result, Mode 4 is referred to as a UE autonomous resource selection mode and Mode 3 is referred to as a scheduled resource allocation mode.

Further, hereinafter, in the description of the present invention, a V2X communication capability refers to a capability to perform the V2X communication over PC5. The V2X communication over PC5 may refer to performing the V2X communication over PC5 interface and may be referred to as V2X sidelink communication.

Embodiment 1

In an embodiment of the present invention, proposed is a method for performing the V2X communication over PC5 by the UE which is in the limited service state and the EMM-CONNECTED mode in order to solve the problems described in Problems 1 and 3 above.

Embodiment 1-1

In Embodiment 1-1, when the UE transmits a sidelink UE information message to the eNB, the eNB may allocate the resource for the V2X communication for a UE (i.e., a UE which is the EMM-CONNECTED mode and using an emergency service) which is in the emergency service.

Figure 12:
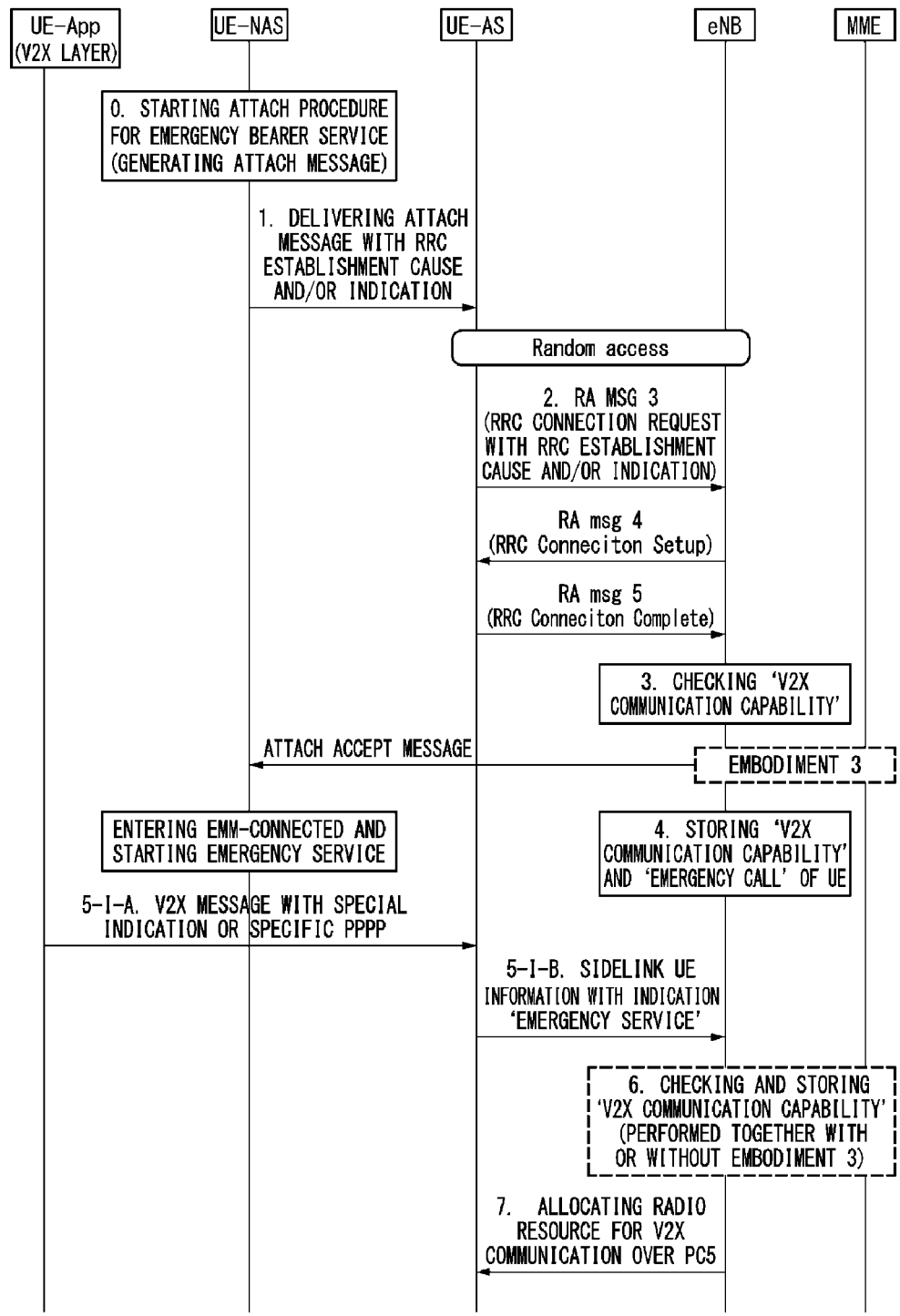
FIGS. 12 to 21 are diagrams illustrating a method for performing V2X communication over PC5 according to an embodiment of the present invention.

FIG. 12 is a diagram illustrating a method for performing V2X communication over PC5 according to an embodiment of the present invention.
 0. The UE in the limited service state starts the attach procedure for the emergency bearer service. That is, the attach message is generated.
 1. When the UE in the limited service state performs the attach for the emergency bearer service, the NAS layer of the UE generates the RRC establishment cause and/or indication and delivers the generated RRC establishment cause and/or indication to the AS layer of the UE together with the attach message as follows.

The AS layer of the UE uses the received RRC establishment cause and/or indication at the time of transmitting the RRC connection request message.
 I. The NAS layer of the UE may deliver the emergency call as the RRC establishment cause to the AS layer of the UE.
 II. In this case, the NAS layer of the UE may deliver a 'V2X communication' indication indicating that there is the V2X communication capability.
 III. The RRC establishment cause or indication may be implemented by individual values such as the 'emergency call' and the 'V2X communication' and may be implemented by a third value (i.e., a single value) including meanings of the two values. In the latter case, as an example, the RRC establishment cause or indication may be implemented by an 'emergency call with V2X communication capability'.

The AS layer of the UE performs a random access (RA) procedure.
 2. The AS layer of the UE includes the corresponding RRC establishment cause and/or indication in the RRC Connection Request message (i.e., the RA message (msg) 3) and transmits the RRC establishment cause and/or indication to the eNB.

Thereafter, the AS layer of the UE receives an RRC Connection Setup message (i.e., RA msg 4) from the eNB. In addition, the AS layer of the UE transmits an RRC Connection Complete message to the eNB, thereby completing the random access procedure.
 3. The eNB receiving the RRC establishment cause and/or indication in the RRC Connection Request message may confirm (check) that the UE has the V2X communication capability in the following method. In addition, the eNB confirms (checks) the V2X communication capability and stores the confirmed (checked) V2X communication capability.
 I. When information indicating that there is the V2X communication capability is included in the indication (e.g., 'V2X communication') and/or the RRC establishment cause in the corresponding RRC connection request message, the eNB may confirm (check) the V2X communication capability of the corresponding UE through the corresponding indication and/or RRC establishment cause.

In this case, the eNB may perform a method of Embodiment 3 described later to verify (i.e., double check) the V2X communication capability of the corresponding UE.

II. When the information indicating that there is the V2X communication capability is not included in the indication (e.g., 'V2X communication') and/or the RRC establishment cause in the corresponding RRC connection request message, the eNB may confirm the V2X communication capability of the corresponding UE through Embodiment 3 described later.

As illustrated in FIG. 12, the MME accepts the attach of the UE to transmit an Attach Accept message to the NAS layer of the corresponding UE. By receiving the Attach Accept message, the UE enters the EMM-CONNECTED mode and starts the emergency service. In FIG. 12, a detailed Attach procedure is omitted.

4. In the case where the corresponding RRC connection request is accepted, when the UE indicates an 'emergency call' as the RRC establishment cause in step 1 above, the eNB may store that the corresponding UE is using the 'emergency service'.

Further, when it is confirmed in step 3 that there is the V2X communication capability for the corresponding UE, the eNB may store that the corresponding UE has the V2X communication capability.

On the contrary, when the eNB rejects the RRC connection Request of the UE, the eNB may not store information on the corresponding UE.

Further, when the emergency bearer service ends later (i.e., when the UE switches to EMM-IDLE or RRC-IDLE), the eNB may delete memory information (i.e., information indicating that the 'emergency service' is using and/or the information indicating that there is the V2X communication capability) for the corresponding UE.

5. When the UE in the limited service state and the EMM-CONNECTED mode intends to perform the V2X communication over PC5, the UE transmits the Sidelink UE information message to the eNB.

I. Triggering conditions for the Sidelink UE information message transmission of UE may be as follows.

A. When an application (APP) layer (i.e., V2X layer) of the UE transmits the V2X message to a lower layer (e.g., the NAS layer or the AS layer), information on the corresponding V2X message may be delivered. As an example of the information on the corresponding message, a special indication (or a V2X service indication) (e.g., 'Decentralized Environmental Notification Message (DENM)' or 'emergency' or 'public safety') or a specific PPPP value may be transferred.

For operation A described above, in the case where the NAS layer or the RRC layer of the UE is using the emergency bearer service in the limited service state and has a capability for the V2X communication, the NAS layer or the RRC layer of the UE may inform the application layer of the case where the NAS layer or the RRC layer of the UE is using the emergency bearer service in the limited service state and has the capability for the V2X communication. As an example, when the attach accept message is received, such an announcement operation may be performed.

The application layer receiving such an operation may perform operation A described above. That is, the application layer may provide to the lower layer information (a special indication or service indication) on the V2X message or provide the specific PPPP value while performing operation A.

B. Even though the AS layer receiving the information or the specific PPPP value is currently in the limited service state, the AS layer transmits the Sidelink UE information message to the eNB.

For example, as an additional condition, only when the sidelink UE information message corresponds to a specific V2X message type (e.g., 'DENM' or 'emergency' or 'public safety') which the network configures to the UE, the AS layer may transmit the Sidelink UE information message to the eNB. In other words, only when the AS layer has a (pre)configured or provisioned PPPP value and receives the corresponding PPPP value from the application layer, the AS layer may transmit the Sidelink UE information message to the eNB. In this case, a specific value may be (pre)configured or provisioned to a range (e.g., the specific PPPP value or more).

C. In A above, when the corresponding V2X message is not the special message or not the message corresponding to the specified PPPP value, the application layer may not provide but discard the corresponding V2X message to the lower layer (e.g., the NAS layer or the AS layer). In this case, operations A and B described above are not performed.

II. In step 3 above, when I or II is not implemented (i.e., when the 'method for confirming the V2X communication capability of the UE' is not implemented), the following additional operation may be performed.

The UE may encapsulate in the corresponding Sidelink UE information message the indication (i.e., the indication indicating that the UE has the emergency PDN connection) indicating that the 'emergency service' is using and/or the special indication (or service indication) (e.g., 'DENM' or 'emergency' or 'public safety'). Further, the indication may be an indication for announcing that the corresponding UE is in the limited service state.

6. The eNB may confirm the V2X communication capability of the UE or an interest of the UE in the V2X communication through the received Sidelink UE information message.

Further, in this case, the eNB may perform Embodiment 3 in order to verify (double check) the V2X communication capability.

7. The eNB receiving the Sidelink UE information message may provide a V2X communication radio resource for the corresponding UE in the following cases.

I. Case of confirming that the corresponding UE is in the 'emergency service',

II. Case of confirming that the corresponding UE is in the 'emergency service' and has the V2X communication capability, III. Case of confirming that the corresponding UE is in the 'emergency service' and V2X service authorization, or IV. Case of confirming that the corresponding UE is in the 'limited service state'.

As the method described in the method of Embodiment 3 described later, the MME may explicitly announce that the UE is in the limited service state to the eNB or as in the related art, the eNB may implicitly recognize that the UE is in the limited service state (see 'processing the emergency call in the limited service mode').

Embodiment 1-1 described above may operate without step 5-I-A. That is, even though the application layer does not deliver the special indication or the specific PPPP value to the lower layer, the AS layer of the UE may transmit the Sidelink UE information message to the eNB even with a transmission condition of the Sidelink UE Information message in the related art.

Meanwhile, in the description of the present invention, a meaning that 'the eNB confirms the V2X communication capability' includes a case where the MME provides V2X service authorization information to the eNB and the eNB checks whether the V2X service is authorized in the process of confirming the V2X communication capability when Embodiment 3 to be described below is used.

Embodiment 1-2

In Embodiment 1-2, the UE may perform the V2X communication by using the Tx resource pool for the V2X communication provided by the eNB without transmitting the Sidelink UE information.

Figure 13:
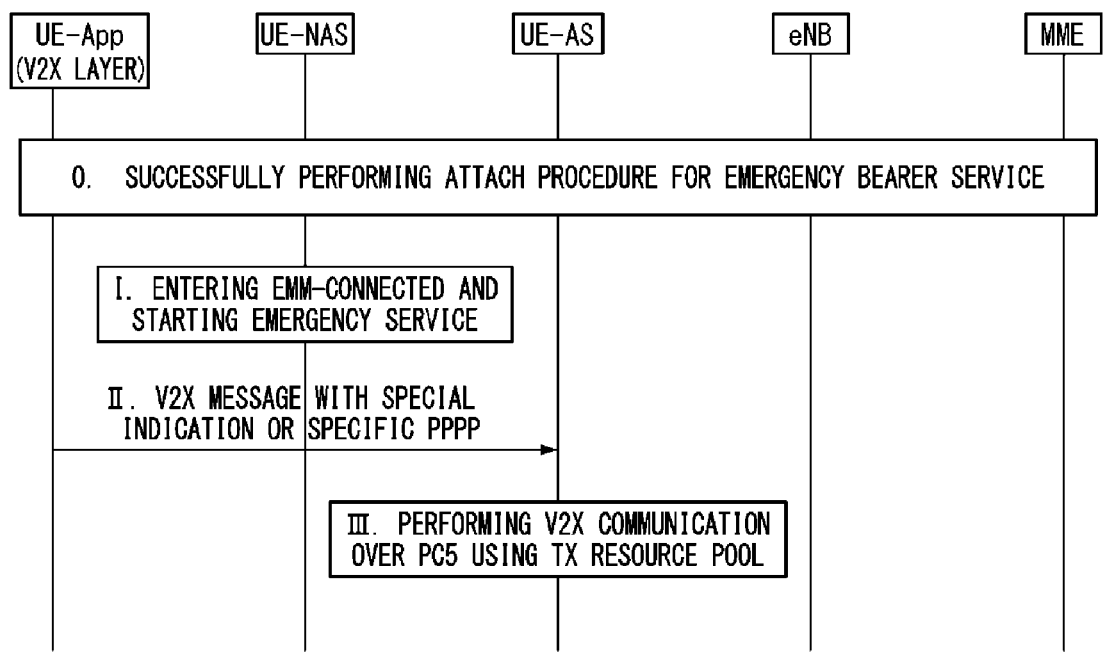

FIG. 13 is a diagram illustrating a method for performing V2X communication over PC5 according to an embodiment of the present invention.

I. The UE in the limited service state successfully performs the Attach procedure for the emergency bearer service, and as a result, the UE switches to the EMM-CONNECTED.

II. When the application layer of the UE transmits the V2X message to the lower layer (i.e., NAS layer or V2X layer), information on the corresponding V2X message may be delivered. As an example of the information on the corresponding message, a special indication (or a V2X service indication) (e.g., DENM or 'emergency' or 'public safety') or a specific PPPP value may be delivered.

For the aforementioned operation, in the case where the NAS layer or the RRC layer of the UE is using the emergency bearer service in the limited service state and has a capability for the V2X communication, the NAS layer or the RRC layer of the UE may inform the application layer of the case where the NAS layer or the RRC layer of the UE is using the emergency bearer service in the limited service state and has the capability for the V2X communication. As an example, when the attach accept message is received, such an announcement operation may be performed.

The application layer receiving the attach accept message may perform operation II. That is, the application layer may provide to the lower layer information (a special indication or service indication) on the V2X message or provide the specific PPPP value while performing operation II.

III. When the AS layer receiving the V2X message intends to perform the V2X communication over PC5, in the case where the eNB (base station) provides a next Tx resource pool, the AS layer may perform the V2X communication over PC5 by using the Tx resource pool provided without a separate process of requesting the Tx resource pool to the eNB.

A. For example, as an additional condition, only when the sidelink UE information message corresponds to a specific V2X message type (e.g., 'DENM' or 'emergency' or 'public safety') which the network configures to the UE, the AS layer may transmit the Sidelink UE information message to the eNB. In other words, only when the AS layer has a (pre)configured or provisioned PPPP value and receives the corresponding PPPP value from the application layer, the AS layer may transmit the Sidelink UE information message to the eNB. In this case, a specific value may be (pre)configured or provisioned to a range (e.g., the specific PPPP value or more).

B. The Tx resource pool may correspond to a resource pool (e.g., commTxPoolNormalCommon or commTxPoolExceptional) broadcasted by the eNB.

In this case, the aforementioned resource pool may be used regardless of a resource allocation mode (i.e., Mode 3 or Mode 4) of the UE.

Alternatively, the available resource pools may vary depending on the resource allocation mode as follows. For example, when the eNB sends V2X related information as broadcast information, but does not broadcast a resource pool for transmission (i.e., when the UE establishes the RRC connection with the eNB and cannot but transmit the V2X message for a resource dedicated for the UE) (i.e., in the case of Mode 3), the commTxPoolExceptional may be used. On the contrary, in the case of Mode 4, the commTxPoolExceptional or commTxPoolNormalCommon may be used.

IV. When the corresponding V2X message is not the special message or not the message corresponding to the specified PPPP value, the application layer may not provide but discard the corresponding V2X message to the lower layer (e.g., the NAS layer or the AS layer). In this case, operations II and III are not performed.

Embodiment 1-2 described above may operate without step II. That is, even though the application layer does not deliver the special indication or the specific PPPP value to the lower layer, when the AS layer satisfies an execution condition of the V2X communication over PC5, the AS layer may perform the V2X communication over PC5 by using the Tx resource pool.

Embodiment 2

An embodiment of the present invention proposes a method in which when the cell on which the UE camps sends the V2X related information as the broadcast information, but does not broadcast the resource pool for transmission (i.e., when the UE establishes the RRC connection with the eNB and cannot but transmit the V2X message through the resource dedicated for the UE), the UE in the limited service state and EMM-IDLE (or RRC-IDLE) performs the V2X communication over PC5, in order to solve the problems described in Problem 2 above.

[Embodiment 2-1] The UE switches to the EMM-CONNECTED (or RRC-CONNECTED) state and requests the radio resource for the V2X communication to the eNB. A detailed method is as follows.

When the UE in the limited service state and EMM-IDLE intends to perform the V2X communication over PC5, in the case where the cell on which the UE camps sends the V2X related information as the broadcast information, but does not broadcast the resource pool for transmission (that is, in the case where the RRC connection is established and the V2X message cannot but be transmitted through the dedicated resource for the UE), the UE switches to the EMM-CONNECTED or switches to RRC-CONNECTED & EMM-IDLE to perform the V2X communication over PC5. A specific description of each case is as follows.

(Case I) Operation when UE Switches to EMM-CONNECTED

When the UE switches to the EMM-CONNECTED, the UE may operate as one of two following methods.

Method A) The UE performs the Attach for the emergency bearer service. In this case, the method described in [Embodiment 1-1] is followed.

Method B) The UE performs not the Attach for the emergency bearer service but the NAS procedure.

When Method A is performed, Method A may have the following difference from the method described in [Embodiment 1-1] described above.

Figure 14:
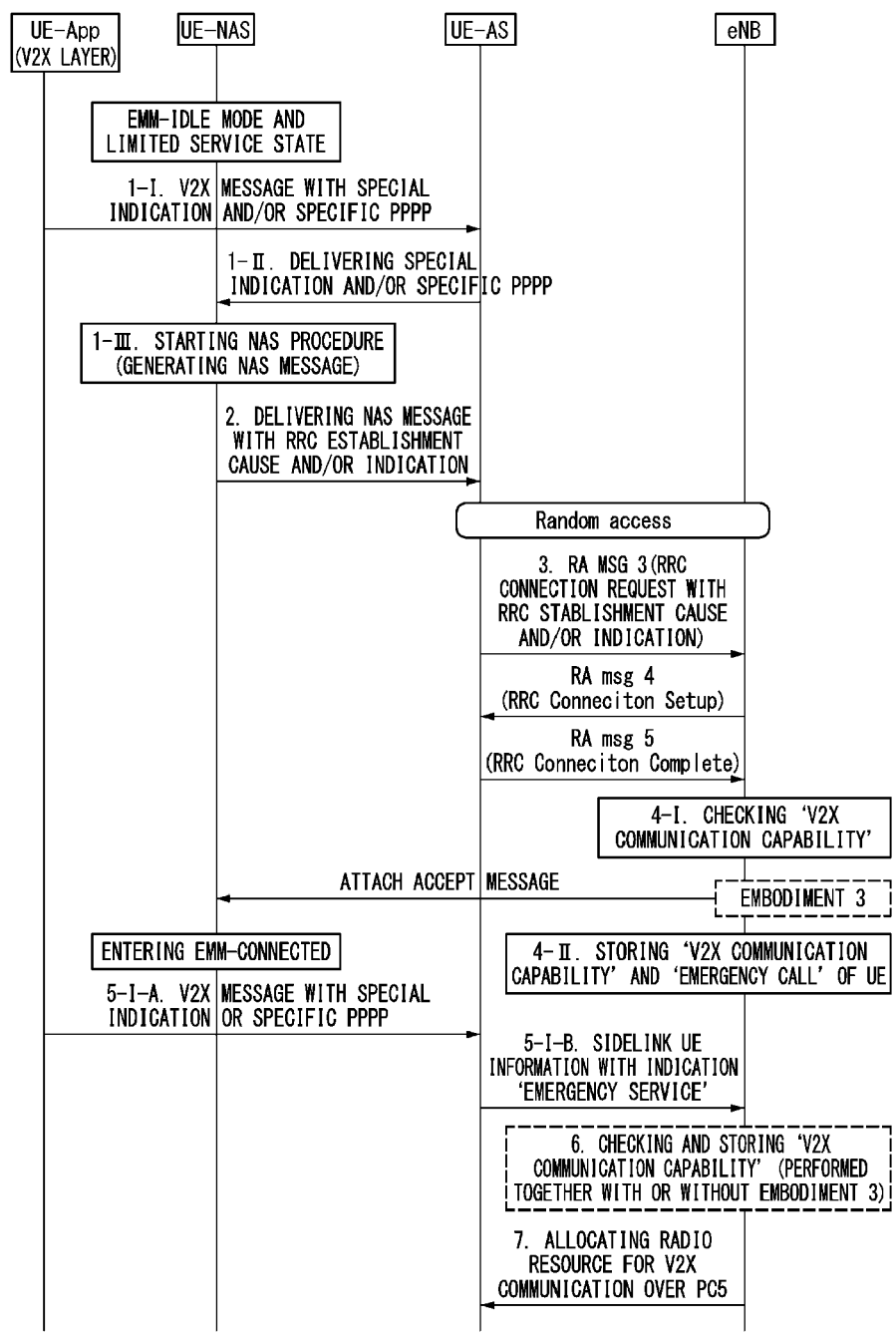

1. When the UE intends to perform the V2X communication over PC5, in the case where the cell on which the UE camps transmits the V2X related information as the broadcast information, but does not broadcast the resource pool for transmitting the V2X message (i.e., in the case where the UE establishes the RRC connection with the eNB and cannot but transmit the V2X message through the dedicated resource for the UE), the UE initiates the Attach procedure for the emergency bearer service in order to switch to the EMM-CONNECTED mode. In this case, conditions for triggering the Attach procedure for the emergency bearer service may be as follows.
  I. When the application layer (e.g., V2X layer) of the UE transmits the V2X message to the lower layer (i.e., NAS layer or AS layer), the information on the V2X message may be delivered. As an example of the information on the corresponding message, a special indication (or a V2X service indication) (e.g., 'DENM' or 'emergency' or 'public safety') or a specific PPPP value may be delivered.
  For the aforementioned operation, in the case where the NAS layer or the RRC layer of the UE is using the emergency bearer service in the limited service state and has a capability for the V2X communication, the NAS layer or the RRC layer of the UE may inform the application layer of the case where the NAS layer or the RRC layer of the UE is using the emergency bearer service in the limited service state and has the capability for the V2X communication. As an example, when the attach accept message is received, such an announcement operation may be performed.
  The application layer receiving such an operation may perform operation I described above. That is, the application layer may provide to the lower layer the information (a special indication or service indication) on the V2X message or provide the specific PPPP value while performing operation I.
  II. The NAS layer receiving the V2X message performs the above-described NAS procedure.
  For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, only when the NAS layer has a (pre)configured or provisioned PPPP value and receives the corresponding PPPP value from the application layer, the NAS procedure of the NAS layer may be triggered. In this case, a specific value may be (pre)configured or provisioned to a range (e.g., the specific PPPP value or more).
  In this case, the interaction between the AS layer and the NAS layer may occur. For example, when the AS layer receives the special indication or PPPP value, the AS layer delivers the received special indication or PPPP value to the NAS layer to allow the NAS layer to trigger the corresponding NAS procedure. Alternatively, the AS layer may deliver an indication that the V2X communication is required to the NAS layer instead of delivering the received special indication or PPPP value as it is.
  For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, when the NAS layer has a (pre)configured or provisioned PPPP value and receives the corresponding PPPP value from the application layer, the AS layer may trigger the NAS procedure of the NAS layer. In this case, a specific value may be (pre)configured or provisioned to a range (e.g., the specific PPPP value or more).
  III. In operation I described above, when the corresponding V2X message is not the special message or not the message corresponding to the specified PPPP value, the application layer may not provide but discard the corresponding V2X message to the lower layer (e.g., the NAS layer or the AS layer). In this case, operations I and II are not performed.
  Method A) of Case I of Embodiment 2-1 described above may operate without operation I or II. That is, the NAS procedure may be performed only by a triggering condition of the NAS procedure in the related art without delivering the special indication or specific PPPP value in the application layer.
  A case in which Method B) described above (i.e., a case where the UE performs not the Attach for the emergency bearer service but the NAS procedure) is performed will be described.
  FIG. 14 is a diagram illustrating a method for performing V2X communication over PC5 according to an embodiment of the present invention.
  1. When the UE intends to perform the V2X communication over PC5, in the case where the cell on which the UE camps transmits the V2X related information as the broadcast information, but does not broadcast the resource pool for transmitting the V2X message (i.e., in the case where the UE establishes the RRC connection with the eNB and cannot but transmit the V2X message through the dedicated resource for the UE), the UE initiates not the Attach procedure for the emergency bearer service but the NAS procedure in order to switch to the EMM-CONNECTED mode. In this case, conditions for triggering the NAS procedure may be as follows.
    I. When the application layer (e.g., V2X layer) of the UE transmits the V2X message to the lower layer (i.e., NAS layer or AS layer), the information on the V2X message may be delivered. As an example of the information on the corresponding message, a special indication (or a V2X service indication) (e.g., 'DENM' or 'emergency' or 'public safety') or a specific PPPP value may be delivered.
  For the aforementioned operation, in the case where the NAS layer or the RRC layer of the UE is using the emergency bearer service in the limited service state and has a capability for the V2X communication, the NAS layer or the RRC layer of the UE may inform the application layer of the case where the NAS layer or the RRC layer of the UE is using the emergency bearer service in the limited service state and has the capability for the V2X communication. As an example, when an NAS accept message is received, such an announcement operation may be performed.
  The application layer receiving such an operation may perform operation I described above. That is, the application layer may provide to the lower layer the information (a special indication or service indication) on the V2X message or provide the specific PPPP value while performing operation I.
    II. The NAS layer receiving the V2X message performs the above-described NAS procedure.
  For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, only when the NAS layer has a (pre)configured or provisioned PPPP value and receives the corresponding PPPP value from the application layer, the NAS procedure of the NAS layer may be triggered. In this case, a specific value may be (pre)configured or provisioned to a range (e.g., the specific PPPP value or more).

In this case, the interaction between the AS layer and the NAS layer may occur. For example, when the AS layer receives the special indication or PPPP value, the AS layer delivers the received special indication or PPPP value to the NAS layer to allow the NAS layer to trigger the corresponding NAS procedure. Alternatively, the AS layer may deliver an indication that the V2X communication is required to the NAS layer instead of delivering the received special indication or PPPP value as it is.

For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, when the NAS layer has a (pre)configured or provisioned PPPP value and receives the corresponding PPPP value from the application layer, the AS layer may trigger the NAS procedure of the NAS layer. In this case, a specific value may be (pre)configured or provisioned to a range (e.g., the specific PPPP value or more).

III. The UE performs not the Attach procedure for the emergency bearer service but the NAS procedure. The NAS procedure may be defined as a service request procedure in the related art or a new NAS procedure. Further, even as the NAS message, the service request message may be used or the new NAS message may be used.
  IV. In operation I described above, when the corresponding V2X message is not the special message or not the message corresponding to the specified PPPP value, the application layer may not provide but discard the corresponding V2X message to the lower layer (e.g., the NAS layer or the AS layer). In this case, operations I and II are not performed.
  2. When the UE in the limited service state performs the NAS procedure, the NAS layer of the UE generates the RRC establishment cause and/or indication and delivers the generated RRC establishment cause and/or indication to the AS layer of the UE together with the service request message.

The AS layer of the UE uses the received RRC establishment cause and/or indication at the time of transmitting the RRC connection request message.
  I. The NAS layer of the UE may deliver the emergency call or a new cause (e.g., 'public safety') as the RRC establishment cause to the AS layer of the UE.
  II. In this case, the NAS layer of the UE may deliver a 'V2X communication' indication indicating that there is the V2X communication capability.
  III. The RRC establishment cause or indication may be implemented as individual values such as the 'emergency call' (or 'public safety service') and the 'V2X communication' and may be implemented as a third value (i.e., a single value) including meanings of the two values. In the latter case, as an example, the RRC establishment cause or indication may be implemented by an RRC establishment cause and/or indication such as an 'emergency call with V2X communication capability' or a 'public safety service with V2X communication capability'.
  3. The AS layer of the UE includes the corresponding RRC establishment cause and/or indication in the RRC Connection Request message (i.e., the RA message (msg) 3) and transmits the RRC establishment cause and/or indication to the eNB.

Thereafter, the AS layer of the UE receives an RRC Connection Setup message (i.e., RA msg 4) from the eNB. In addition, the AS layer of the UE transmits an RRC Connection Complete message to the eNB, thereby completing the random access procedure.
  4. The eNB receiving the RRC establishment cause and/or indication in the RRC Connection Request message may confirm (check) that the UE has the V2X communication capability in the following method. In addition, the eNB confirms (checks) the V2X communication capability and stores the confirmed (checked) V2X communication capability.
  I. A method for confirming the V2X communication capability may be implemented as follows.
    A. When information indicating that there is the V2X communication capability is included in the indication (e.g., 'V2X communication') and/or the RRC establishment cause in the corresponding RRC connection request message, the eNB may confirm (check) the V2X communication capability of the corresponding UE through the corresponding indication and/or RRC establishment cause.

In this case, the eNB may perform a method of Embodiment 3 described later to verify (i.e., double check) the V2X communication capability of the corresponding UE.
    B. When the information indicating that there is the V2X communication capability is not included in the indication (e.g., 'V2X communication') and/or the RRC establishment cause in the corresponding RRC connection request message, the eNB may confirm the V2X communication capability of the corresponding UE through Embodiment 3 described later.

As illustrated in FIG. 14, the MME accepts the attach of the UE to transmit an Attach Accept message to the NAS layer of the corresponding UE. By receiving the Attach Accept message, the UE enters the EMM-CONNECTED mode and starts the emergency service. In FIG. 14, a detailed Attach procedure is omitted.
    II. In the case where the corresponding RRC connection request is accepted, when the UE indicates an 'emergency call' or 'public safety' as the RRC establishment cause in step A above, the eNB may store that the corresponding UE is using the 'emergency service' or 'public safety'.

Further, when it is confirmed in step B above that there is the V2X communication capability for the corresponding UE, the eNB may store that the corresponding UE has the V2X communication capability.

On the contrary, when the eNB rejects the RRC connection Request of the UE, the eNB may not store information on the corresponding UE.

Further, when the UE later switches to the EMM-IDLE or RRC-IDLE, the eNB may delete memory information for the corresponding UE.
  5. When the UE in the limited service state and the EMM-CONNECTED mode intends to perform the V2X communication over PC5, the UE transmits the Sidelink UE information message to the eNB.
    I. Triggering conditions for the Sidelink UE information message transmission of UE may be as follows.
      A. When an application layer (i.e., V2X layer) of the UE transmits the V2X message to a lower layer (e.g., the NAS layer or the AS layer), information on the corresponding V2X message may be delivered. As an example of the information on the corresponding message, a special indication (or a V2X service indication) (e.g., 'DENM' or 'emergency' or 'public safety') or a specific PPPP value may be delivered.

For operation A described above, in the case where the NAS layer or the RRC layer of the UE is using the emergency bearer service in the limited service state and has a capability for the V2X communication, the NAS layer or the RRC layer of the UE may inform the application layer of the case where the NAS layer or the RRC layer of the UE is using the emergency bearer service in the limited service state and has the capability for the V2X communication. As an example, when the attach accept message is received, such an announcement operation may be performed.

The application layer receiving such an operation may perform operation A described above. That is, the application layer may provide to the lower layer information (a special indication or service indication) on the V2X message or provide the specific PPPP value while performing operation A.

B. Even though the AS layer receiving the information or the specific PPPP value is currently in the limited service state, the AS layer transmits the Sidelink UE information message to the eNB.

For example, as an additional condition, only when the sidelink UE information message corresponds to a specific V2X message type (e.g., 'DENM' or 'emergency' or 'public safety') which the network configures to the UE, the AS layer may transmit the Sidelink UE information message to the eNB. In other words, only when the AS layer has a (pre)configured or provisioned PPPP value and receives the corresponding PPPP value from the application layer, the AS layer may transmit the Sidelink UE information message to the eNB. In this case, a specific value may be (pre)configured or provisioned to a range (e.g., the specific PPPP value or more).

C. In A above, when the corresponding V2X message is not the special message or not the message corresponding to the specified PPPP value, the application layer may not provide but discard the corresponding V2X message to the lower layer (e.g., the NAS layer or the AS layer). In this case, operations A and B described above are not performed.

II. In step 4 above, when I or II is not implemented (i.e., when the 'method for confirming the V2X communication capability of the UE' is not implemented), the following additional operation may be performed.

The UE may encapsulate in the corresponding Sidelink UE information message the indication indicating that the 'emergency service' is using and/or the special indication (or service indication) (e.g., 'DENM' or 'emergency' or 'public safety').

6. The eNB may confirm the V2X communication capability of the UE or an interest of the UE in the V2X communication through the received Sidelink UE information message. In addition, when the V2X communication capability for the corresponding UE is confirmed, the eNB stores the confirmed V2X communication capability.

Further, in this case, the eNB may perform Embodiment 3 in order to verify (double check) the V2X communication capability.

7. The eNB receiving the Sidelink UE information message may provide a V2X communication radio resource for the corresponding UE in the following cases.

I. Case of confirming that the corresponding UE is in the 'emergency call' or 'public safety service', or II. Case of confirming that the corresponding UE is in the 'emergency call' or 'public safety service' and confirms the V2X communication capability, or III. Case of confirming that the corresponding UE is in the 'emergency call' or 'public safety service' and confirms the V2X service authorization. In this case, the V2X capability information may be additionally provided from the MME to the eNB and the eNB may confirm the V2X capability information.

Method B of Case 1 of Embodiment 2-1 described above may operate without step 1-I or 1-II. That is, even though the application layer does not deliver the special indication or the specific PPPP value to the lower layer, the NAS procedure may be performed only by the triggering condition of the NAS procedure in the related art.

Alternatively, Method B of Case I of Embodiment 2-1 described above may operate without step 5-I. That is, even though the application layer does not deliver the special indication or the specific PPPP value to the lower layer, the Sidelink UE Information message may be transmitted only by the transmission condition of the Sidelink UE Information message in the related art.

Meanwhile, in the description of the present invention, a meaning that 'the eNB confirms the V2X communication capability' includes a case where the MME provides V2X service authorization information to the eNB and the eNB checks whether the V2X service is authorized in the process of confirming the V2X communication capability when Embodiment 3 to be described below is used.

(Case II) Operation when UE Switches to RRC-CONNECTED and EMM-IDLE

Figure 15:
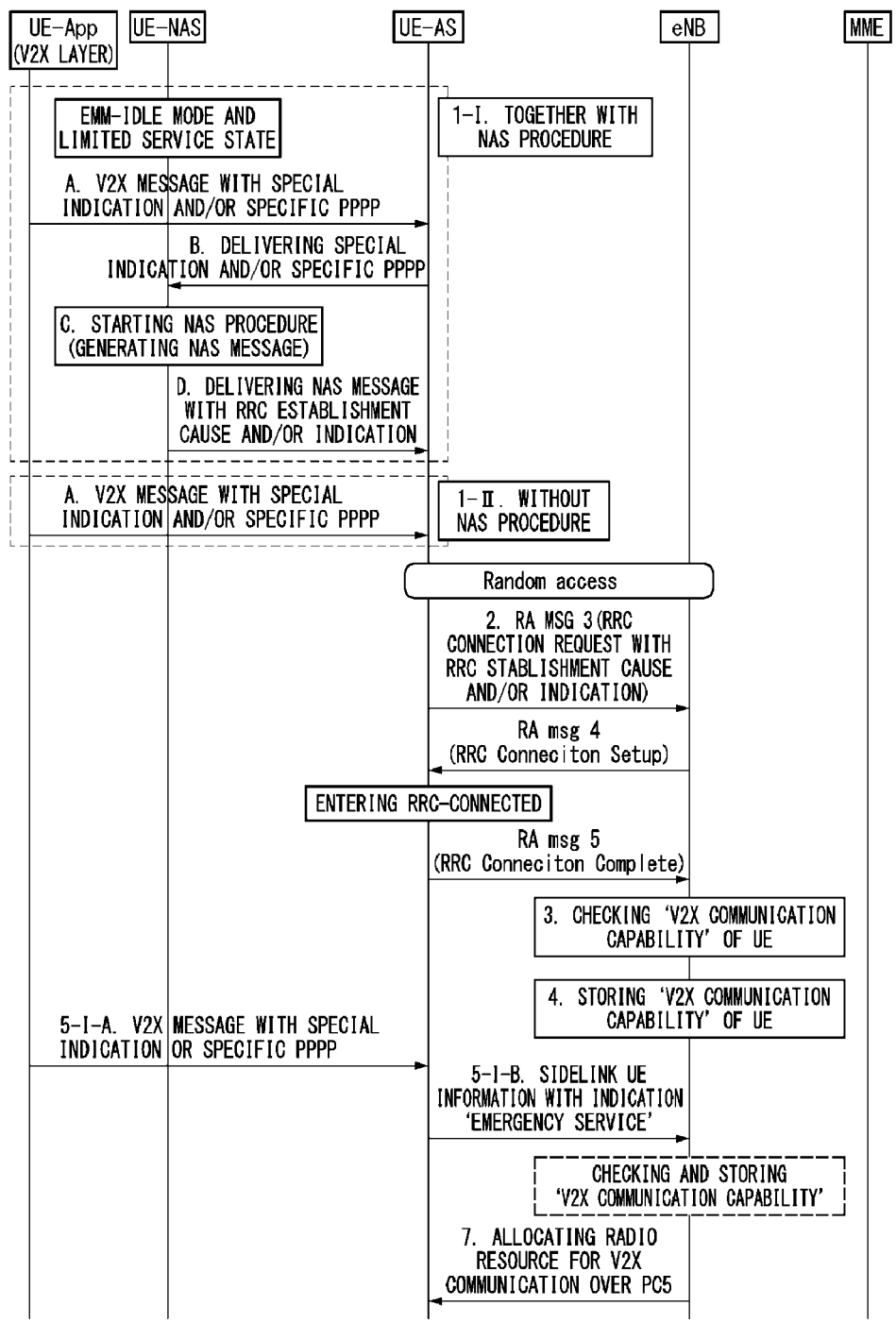

FIG. 15 is a diagram illustrating a method for performing V2X communication over PC5 according to an embodiment of the present invention.

1. When the UE intends to perform the V2X communication over PC5, in the case where the cell on which the UE camps transmits the V2X related information as the broadcast information, but does not broadcast the resource pool for transmitting the V2X message (i.e., in the case where the UE establishes the RRC connection with the eNB and cannot but transmit the V2X message through the dedicated resource for the UE), the UE initiates the RRC establishment procedure in order to switch to the RRC-CONNECTED state (and EMM-CONNECTED mode). In this case, conditions for triggering the RRC establishment procedure may be as follows.

I. Method of using the NAS procedure: Conditions for triggering the NAS procedure may be as follows.

A. When the application layer (e.g., V2X layer) of the UE transmits the V2X message to the lower layer (i.e., NAS layer or AS layer), the information on the V2X message may be delivered. As an example of the information on the corresponding message, a special indication (or a V2X service indication) (e.g., 'DENM' or 'emergency' or 'public safety') or a specific PPPP value may be delivered.

For the aforementioned operation, in the case where the NAS layer or the RRC layer of the UE has the capability for the V2X communication in the limited service state, the NAS layer or the RRC layer of the UE may announce to the application layer the case where the NAS layer or the RRC layer of the UE has the capability for the V2X communication in the limited service state. Such an operation may be performed when switching to the limited service state.

The application layer receiving such an operation may perform operation A described above. That is, the application layer may provide to the lower layer the information (a special indication or service indication) on the V2X message or provide the specific PPPP value while performing operation A.

B. The NAS layer receiving the V2X message performs the above-described NAS procedure.

For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, only when the NAS layer has a (pre)configured or provisioned PPPP value and receives the corresponding PPPP value from the application layer, the NAS procedure of the NAS layer may be triggered. In this case, a specific value may be (pre)configured or provisioned to a range (e.g., the specific PPPP value or more).

In this case, the interaction between the AS layer and the NAS layer may occur. For example, when the AS layer receives the special indication or PPPP value, the AS layer delivers the received special indication or PPPP value to the NAS layer to allow the NAS layer to trigger the corresponding NAS procedure. Alternatively, the AS layer may deliver an indication that the V2X communication is required to the NAS layer instead of delivering the received special indication or PPPP value as it is.

For example, as an additional condition, only when the sidelink UE information message corresponds to a specific V2X message type (e.g., 'DENM' or 'emergency' or 'public safety') which the network configures to the UE, the NAS procedure of the NAS layer may be triggered. In other words, when the NAS layer has a (pre)configured or provisioned PPPP value and receives the corresponding PPPP value from the application layer, the AS layer may trigger the NAS procedure of the NAS layer. In this case, a specific value may be (pre)configured or provisioned to a range (e.g., the specific PPPP value or more).

C. When the corresponding V2X message is not the special message or not the message corresponding to the specified PPPP value, the application layer may not provide but discard the corresponding V2X message to the lower layer (e.g., the NAS layer or the AS layer). In this case, operations A and B described above are not performed.

D. The UE performs the NAS procedure. The NAS procedure may be defined as a service request procedure in the related art or a new NAS procedure. Further, even as the NAS message, the service request message may be used or the new NAS message may be used.

E. When the UE in the limited service state performs the NAS procedure, the NAS layer of the UE generates the RRC establishment cause and/or indication and delivers the generated RRC establishment cause and/or indication to the AS layer of the UE.

The AS layer of the UE uses the received RRC establishment cause and/or indication at the time of transmitting the RRC connection request message.

The NAS layer of the UE may deliver the emergency call or a new cause (e.g., 'public safety service') as the RRC establishment cause to the AS layer of the UE.

In this case, the NAS layer of the UE may deliver a 'V2X communication' indication indicating that there is the V2X communication capability.

The RRC establishment cause or indication may be implemented as individual values such as the 'emergency call' (or 'public safety service') and the 'V2X communication' and may be implemented as a third value (i.e., a single value) including meanings of the two values. In the latter case, as an example, the RRC establishment cause or indication may be implemented by an RRC establishment cause and/or indication such as an 'emergency call with V2X communication capability' or a 'public safety service with V2X communication capability'.

The AS layer of the UE includes the corresponding RRC establishment cause and/or indication in the RRC Connection Request message (i.e., the RA message (msg) 3) and transmits the RRC establishment cause and/or indication to the eNB.

Thereafter, the AS layer of the UE receives an RRC Connection Setup message (i.e., RA msg 4) from the eNB. In addition, the AS layer of the UE transmits an RRC Connection Complete message to the eNB, thereby completing the random access procedure.

F. In this case, the NAS message (e.g., the Service Request message or the new NAS message) may not be delivered to the network (e.g., eNB or MME). In an implementation method, the NAS layer of the UE does not generate the NAS message or the NAS layer of the UE generates the NAS message, but may not deliver the NAS message to the AS layer.

II. Method for performing an RRC connection establishment procedure without triggering the NAS procedure by the AS layer: The AS layer may perform the RRC connection establishment procedure including the random access procedure. The triggering conditions thereof may be as follows.

A. When the application layer (e.g., V2X layer) of the UE transmits the V2X message to the lower layer (i.e., NAS layer or AS layer), the information on the V2X message may be delivered. As an example of the information on the corresponding message, a special indication (or a V2X service indication) (e.g., 'DENM' or 'emergency' or 'public safety') or a specific PPPP value may be delivered.

For the aforementioned operation, in the case where the NAS layer or the RRC layer of the UE has the capability for the V2X communication in the limited service state, the NAS layer or the RRC layer of the UE may announce to the application layer the case where the NAS layer or the RRC layer of the UE has the capability for the V2X communication in the limited service state. Such an operation may be performed when switching to the limited service state.

The application layer receiving such an operation may perform operation A described above. That is, the application layer may provide to the lower layer the information (a special indication or service indication) on the V2X message or provide the specific PPPP value while performing operation A.

B. The AS layer performs the RRC connection establishment procedure.

For example, as an additional condition, only when the sidelink UE information message corresponds to a specific V2X message type (e.g., 'DENM' or 'emergency' or 'public safety') which the network configures to the UE, the AS layer may perform the RRC connection establishment procedure. In other words, only when the AS layer has a (pre)configured or provisioned PPPP value and receives the corresponding PPPP value, the RRC connection establishment may be performed. In this case, a specific value may be (pre)configured or provisioned to a range (e.g., the specific PPPP value or more).

C. When the corresponding V2X message is not the special message or not the message corresponding to the specified PPPP value, the application layer may not provide but discard the corresponding V2X message to the lower layer (e.g., the NAS layer or the AS layer). In this case, operations A and B described above are not performed.

2. The AS layer receiving the RRC establishment cause and/or indication performs the RRC connection establishment procedure. The AS layer encapsulates the aforementioned value (i.e., the RRC establishment cause and/or indication) in the RRC Connection Request message (i.e., the RA message (msg) 3) and transmits the RRC establishment cause and/or indication.

Thereafter, the AS layer of the UE receives an RRC Connection Setup message (i.e., RA msg 4) from the eNB. In addition, the AS layer of the UE transmits an RRC Connection Complete message to the eNB, thereby completing the random access procedure.

3. The eNB receiving the RRC establishment cause and/or indication in the RRC Connection Request message may confirm (check) that the UE has the V2X communication capability in the following method. In addition, the eNB confirms (checks) the V2X communication capability and stores the confirmed (checked) V2X communication capability.

When information indicating that there is the V2X communication capability is included in the indication (e.g., 'V2X communication') and/or the RRC establishment cause in the corresponding RRC connection request message, the eNB may confirm (check) the V2X communication capability of the corresponding UE through the corresponding indication and/or RRC establishment cause.

4. In the case where the corresponding RRC connection request is accepted, when the UE indicates an 'emergency call' or 'public safety service' as the RRC establishment cause in step 3 above, the eNB may store that the corresponding UE is using the 'emergency service' or 'public safety service'.

On the contrary, when the eNB rejects the RRC connection Request of the UE, the eNB may not store information on the corresponding UE.

Further, when the UE later switches to the EMM-IDLE or RRC-IDLE, the eNB may delete memory information for the corresponding UE.

5. When the UE in the limited service state and the EMM-CONNECTED mode intends to perform the V2X communication over PC5, the UE transmits the Sidelink UE information message to the eNB.

I. Triggering conditions for the Sidelink UE information message transmission of UE may be as follows.

A. When an application layer (i.e., V2X layer) of the UE transmits the V2X message to a lower layer (e.g., the NAS layer or the AS layer), information on the corresponding V2X message may be delivered. As an example of the information on the corresponding message, a special indication (or a V2X service indication) (e.g., 'DENM' or 'emergency' or 'public safety') or a specific PPPP value may be delivered.

For operation A described above, in the case where the NAS layer or the RRC layer of the UE has the capability for the V2X communication in the limited service state, the NAS layer or the RRC layer of the UE may announce to the application layer the case where the NAS layer or the RRC layer of the UE has the capability for the V2X communication in the limited service state. As an example, such an announcement operation may be performed when switching to the limited service state.

The application layer receiving such an operation may perform operation A described above. That is, the application layer may provide to the lower layer information (a special indication or service indication) on the V2X message or provide the specific PPPP value while performing operation A.

B. Even though the AS layer receiving the information or the specific PPPP value is currently in the limited service state, the AS layer transmits the Sidelink UE information message to the eNB.

For example, as an additional condition, only when the sidelink UE information message corresponds to a specific V2X message type (e.g., 'DENM' or 'emergency' or 'public safety') which the network configures to the UE, the AS layer may transmit the Sidelink UE information message to the eNB. In other words, only when the AS layer has a (pre)configured or provisioned PPPP value and receives the corresponding PPPP value from the application layer, the AS layer may transmit the Sidelink UE information message to the eNB. In this case, a specific value may be (pre)configured or provisioned to a range (e.g., the specific PPPP value or more).

C. In A above, when the corresponding V2X message is not the special message or not the message corresponding to the specified PPPP value, the application layer may not provide but discard the corresponding V2X message to the lower layer (e.g., the NAS layer or the AS layer). In this case, operations A and B described above are not performed.

II. In step 3 above, when I is not implemented (i.e., when the 'method for confirming the V2X communication capability of the UE' is not implemented), the following additional operation may be performed.

The UE may encapsulate in the corresponding Sidelink UE information message the special indication (or service indication) (e.g., 'DENM' or 'emergency' or 'public safety').

6. The eNB may confirm the V2X communication capability of the UE or an interest of the UE in the V2X communication through the received Sidelink UE information message. In addition, when the V2X communication capability for the corresponding UE is confirmed, the eNB stores the confirmed V2X communication capability.

7. The eNB receiving the Sidelink UE information message may provide a V2X communication radio resource for the corresponding UE in the following cases.

I. Case of confirming that the corresponding UE is in the 'emergency call' or 'public safety service', or II. Case of confirming that the corresponding UE is in the 'emergency call' or 'public safety service' and has the V2X communication capability.

The method of Case II of Embodiment 2-1 described above may operate without step 1-I-A or 1-I-B. That is, even though the application layer does not deliver the special indication or the specific PPPP value to the lower layer, the NAS procedure may be performed only by the triggering condition of the NAS procedure in the related art.

Alternatively, the method of Case II of Embodiment 2-1 described above may operate without step 1-II-A or 1-II-B. That is, even though the application layer does not deliver the special indication or the specific PPPP value to the lower layer, the AS layer may perform the RRC connection establishment procedure alone.

Embodiment 2-2

Figure 16:
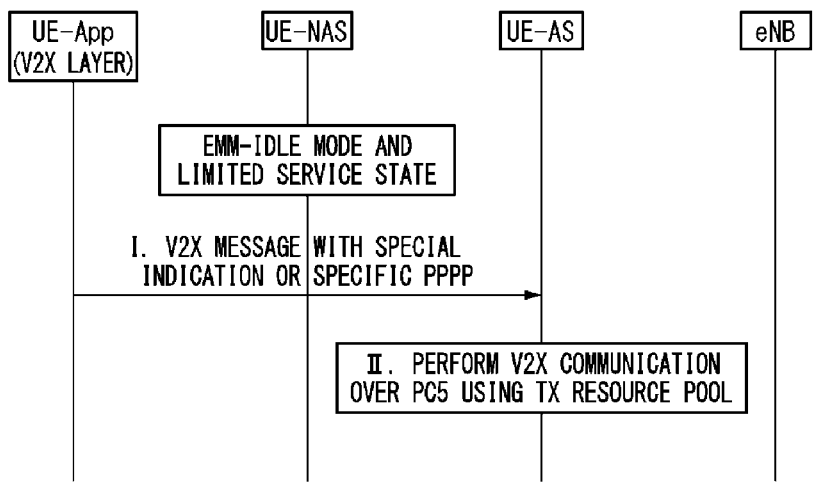

FIG. 16 is a diagram illustrating a method for performing V2X communication over PC5 according to an embodiment of the present invention.

When a cell on which the UE camps sends V2X related information to broadcasting information, but does not broadcast a resource pool for V2X message transmission (i.e., when the UE establishes the RRC connection with the eNB and the corresponding UE has to transmit the V2X message through a dedicated resource for itself), in the case where the UE in the limited service state is in the EMM-IDLE, the corresponding UE may operate as follows.

I. When the application layer of the UE transmits the V2X message to the lower layer (i.e., NAS layer or V2X layer), information on the corresponding V2X message may be delivered. As an example of the information on the corresponding message, a special indication (or a V2X service indication) (e.g., DENM or 'emergency' or 'public safety') or a specific PPPP value may be delivered.

For the aforementioned operation, in the case where the NAS layer or the RRC layer of the UE has the capability for the V2X communication in the limited service state, the NAS layer or the RRC layer of the UE may announce to the application layer the case where the NAS layer or the RRC layer of the UE has the capability for the V2X communication in the limited service state. As an example, such an announcement operation may be performed when switching to the limited service state.

The application layer receiving the announcement may perform operation I. That is, the application layer may provide to the lower layer information (a special indication or service indication) on the V2X message or provide the specific PPPP value while performing operation I.

II. When the AS layer receiving the V2X message intends to perform the V2X communication over PC5, in the case where the eNB (base station) provides a next Tx resource pool, the AS layer may perform the V2X communication over PC5 by using the Tx resource pool provided without a separate process of requesting the Tx resource pool to the eNB in the EMM-IDLE (RRC-IDLE) state.

In this case, the Tx resource pool may be commTxPoolExceptional broadcasted by the eNB.

For example, as an additional condition, only when the sidelink UE information message corresponds to a specific V2X message type (e.g., 'DENM' or 'emergency' or 'public safety') which the network configures to the UE, the AS layer may use the Tx resource pool. In other words, only when the AS layer has a (pre)configured or provisioned PPPP value and receives the corresponding PPPP value, the AS layer may use the Tx resource pool. In this case, a specific value may be (pre)configured or provisioned to a range (e.g., the specific PPPP value or more).

III. When the corresponding V2X message is not the special message or not the message corresponding to the specified PPPP value, the application layer may not provide but discard the corresponding V2X message to the lower layer (e.g., the NAS layer or the AS layer) in operation I. In this case, operations I and II are not performed.

Embodiment 2-2 described above may operate without step I or II. That is, even though the application layer does not deliver the special indication or the specific PPPP value to the lower layer, when the AS layer satisfies an execution condition of the V2X communication over PC5, the AS layer may perform the V2X communication over PC5.

According to the related art, when the UE is in the RRC-IDLE state, the UE may not use the commTxPoolExceptional. When the UE is in the RRC-IDLE state, the UE may use the commTxPoolExceptional with some exceptions while performing an operation for switching to the RRC-CONNECTED state. However, in the limited service state, the UE may not perform location registration other than the Attach for the emergency bearer service. As a result, the NAS procedure other than the Attach for the emergency bearer service is not triggered. Accordingly, a condition under which the commTxPoolExceptional may be used is not generated. In order to solve such a problem, Embodiment 2-2 proposes such that even when the UE is in the RRC-IDLE state, the UE uses the commTxPoolExceptional in the limited service state without performing the operation for switching to the RRC-CONNECTED.

Embodiment 3

Figure 17:
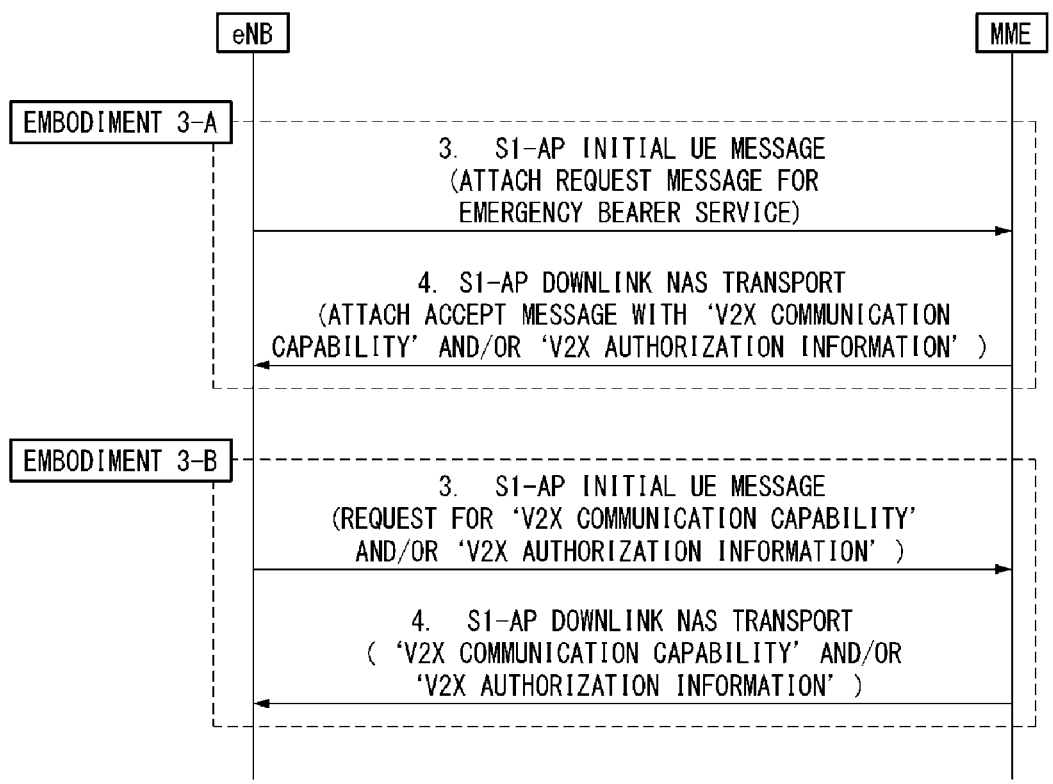

FIG. 17 is a diagram illustrating a method for performing V2X communication over PC5 according to an embodiment of the present invention.

The MME may deliver to the eNB V2X communication related capability and/or authorization information of the UE.

In other words, the MME confirms only the capability of the UE to deliver the V2X capability of the UE to the eNB. Alternatively, the MME may confirm the capability of the UE and confirm whether the corresponding service (i.e., V2X service) is authorized and then, deliver the authorization information to the eNB. For example, when the UE indicates the V2X capability and the UE is authorized to use the V2X communication over PC5 based on subscription data, etc., the MME may deliver to the eNB an indication "V2X services authorized".

Embodiment 3-A

3. When the UE transmits to the eNB an RRC message including the Attach Request message in order to initiate the Attach procedure for the emergency bearer service, the eNB may encapsulate the Attach Request message for the emergency bearer service in an S1-AP initial UE message and transmit the Attach Request message to the MME.

4. When the MME accepts an Attach request, the MME may transmit to the eNB as the Attach Accept message an S1-AP message (e.g., an S1-AP Downlink NAS Transport message or an S1-AP Initial Context Setup Request message). In this case, the following operation may be performed at the same time.

When the UE has the capability or authorization for the V2X communication, the V2X capability and/or authorization information may be included in the S1-AP message and delivered to the eNB. That is, the MME may encapsulate the Attach Accept message with V2X capability and/or authorization in the S1-AP message and transmit the Attach Accept message to the eNB.

Further, when the MME recognizes that the UE is in the limited service state, the MME may encapsulate an indication for announcing that the UE is in the limited service state in the S1-AP message and transmit the indication to the eNB. That is, the MME may encapsulate the Attach Accept message with the indication for announcing that the UE is in the limited service state in the S1-AP message and transmit the Attach Accept message to the eNB. Alternatively, the eNB may implicitly recognize the Attach Accept message through the method described in the "processing of emergency call in limited service mode" above.

Embodiment 3-B

3. When the UE sends the Sidelink UE information message to the eNB in order to request the radio resource for the V2X communication (or when the eNB recognizes that 'the UE is in a specific state' at the same time), the eNB may request to the MME the V2X communication related capability and/or authorization information for the UE through the S1-AP Initial UE message.

In this case, a case of recognizing 'the corresponding UE is in the specific state' may correspond to a case where the corresponding UE uses the emergency bearer service or a case of recognizing that the UE is in the limited service state.

Alternatively, the case of recognizing 'the corresponding UE is in the specific state' may correspond to a case where the corresponding UE is the UE which is a UE specified thereby or indicates a specific situation to the eNB (i.e., a case of providing a capability or cause related thereto). An example of information that the corresponding UE is the UE which is a UE specified thereby or indicates the specific situation to the eNB is as follows.

V2X communication

In the limited service state, the V2X communication is available

Emergency V2X message or public safety V2X message

Emergency call with V2X communication capability

4. When the MME receives a request for the V2X communication related capability and/or authorization information, the MME may transmit to the eNB communication related capability and/or authorization information through the S1-AP message (e.g., Downlink NAS Transport message or S1-AP Initial Context Setup Request message).

When the UE has the capability or authorization for the V2X communication, the V2X capability and/or authorization information may be included in the S1-AP message and delivered to the eNB.

Further, when the MME recognizes that the UE is in the limited service state, the MME may encapsulate an indication for announcing that the UE is in the limited service state in the S1-AP message and transmit the indication to the eNB. Alternatively, the eNB may implicitly recognize the Attach Accept message through the method described in the "processing of emergency call in limited service mode" above.

In Embodiment 3 described above, the S1-AP message which the eNB transmits to the MME may be an initial UE message or a new S1-AP message.

Further, the S1-AP message through which the MME transmits the V2X capability and/or authorization information to the eNB may be the Initial Context Setup Request message, the Downlink NAS Transport message, or the new S1-AP message. In this case, the S1-AP message may not include UE context information for the V2 communication authorization.

Embodiment 4

The embodiment proposes the solution for Problem 3 described above.

Next, according to 3GPP TS 24.334, when the UE described in 3GPP TS 24.386 is served by E-UTRAN, a precondition for the UE to perform the V2X communication over PC5 will be described.

When the UE receives the request from the upper layer to transmit the V2X message of the V2X service identified by the V2X service identifier by using the V2X communication over PC5, the UE performs the following procedure:

a) When the following condition is satisfied:
1) The UE is served by E-UTRAN;
2) The UE intends to use a radio resource (i.e., carrier frequency) provided by an E-UTRAN cell;
3) When the UE is served by the E-UTRAN, a registered PLMN belongs to a PLMN list authorized to use the V2X communication over PC5;
4) The V2X service identifier of the V2X service is included in the PLMN list authorized for the V2X communication over PC5 or the UE is configured as a default destination Layer-2 identifier (ID) for the V2X communication over PC5:

In this case, the UE operates as follows:
1) Requesting the radio resource for the V2 communication over PC5: and
2) performing transmission of the V2X communication over PC5

As described above, four conditions 1) to 4) are described. In this case, in the following cases, even though the UE served by E-UTRAN satisfies conditions 1), 2), and 4) above and does not satisfy condition 3), the UE served by E-UTRAN may transmit the V2X communication over PC5.

A. Case in which the UE is in the limited service state,
B. Case in which the UE is performing the emergency call (service),
C. Case in which the UE is performing the emergency call (service) in the initiated service state That is, in any one case of the cases described in A to C above, even though the UE satisfies conditions 1), 2), and 4) above and does not satisfy condition 3), the UE may transmit the V2X communication over PC5.

Embodiment 5

The embodiment proposes a solution for Problem 1.

In the scenario of Problem 1 above, proposed is a method in which the MME provides to the eNB the V2X service related context (i.e., authorization information) of the corresponding UE.

As compared with Embodiment 3 described above, Embodiment 3 is a method in which the eNB initiates the procedure, whereas Embodiment 5 proposes a method in which the MME initiates the procedure. The method in which the MME initiates the procedure may be divided into two following methods according to a case in which the MME makes a determination alone or a case in which the MME interacts with the HSS.

When the eNB acquires the V2X service related context (i.e., authorization information) of the corresponding UE by the method of Embodiment 5 to be described later, the eNB may allocate the resource for the V2X communication over PC5 for the corresponding UE.

Here, allocating the resource for the PC5 may be interpreted as various meanings. For example, in the case of a Mode 3 PC5 operation (i.e., network scheduling resource allocation), a PC5 resource for transmitting the V2X message may be allocated to the UE or the UE may be instructed to perform a Mode 4 PC5 operation (i.e., UE autonomous resource selection).

Hereinafter, the embodiment may be implemented in the Attach procedure defined in section 5.3.2.1 of 3GPP TS 23.401. In describing the embodiment, a detailed description of the Attach procedure is omitted and document 3GPP TS 23.401 V14.1.0 may be merged with this specification as a reference with respect to contents regarding a detailed Attach procedure.

Figure 18:
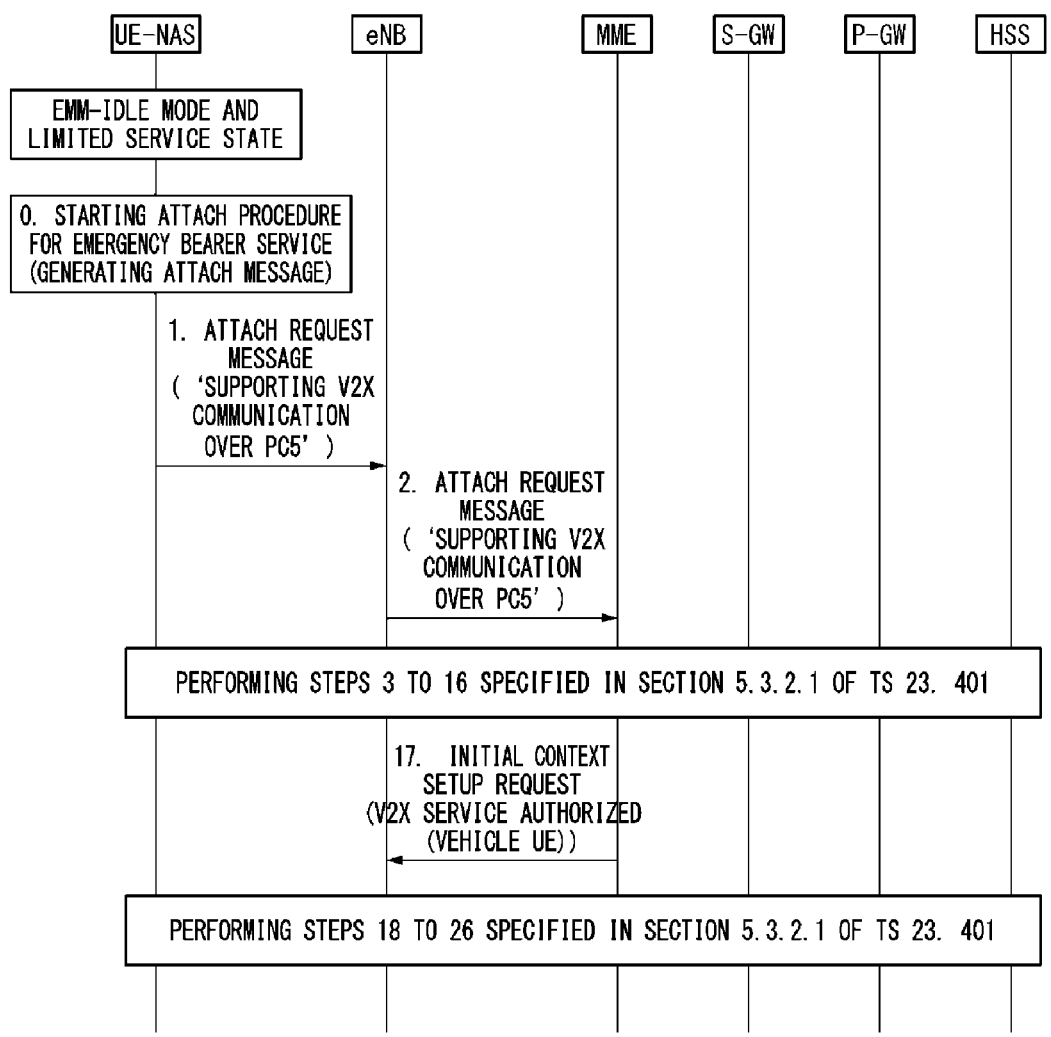

[Embodiment 5-1] Method in which the MME Makes a Decision Singly and Transmits the V2X Authorization Information to the eNB FIG. 18 is a diagram illustrating a method for performing V2X communication over PC5 according to an embodiment of the present invention.

1~2. The UE transmits the Attach Request message in order to perform the Attach procedure for the emergency bearer service. In this case, the UE may include the following information in the Attach Request message.

A. The Attach Request message may include a UE network capability IE. In this case, since the UE has the capability for the V2X communication over PC5, a V2X PC5 bit of the UE network capability IE may be set to "V2X communication over PC5 supported". The information may indicate that the UE is V2X communicable.

B. The Attach Request message may include an EPS attach type IE. The EPS attach type IE may be set to "EPS emergency attach".

C. The Attach Request message (for the emergency bearer service) may include a PDN Connectivity Request message. In this case, a request type IE of the PDN Connectivity Request message may be set to "emergency".

17. When the MME receiving the Attach Request message satisfies the following conditions, the MME delivers to the ENB information that the V2X communication over PC5 is authorized through the S1-AP message. For example, the information that the V2X communication is authorized may be delivered by setting a Vehicle UE bit of a V2X Service Authorized IE. Further, the MME may deliver through a new IE information indicating that the UE may perform the V2X communication over PC5 and/or the UE performs emergency attach and/or the UE has an emergency PDN connectivity. As the S1-AP message for delivering the information, the Initial Context Setup Request message may be used and other (or new) S1-AP message may be used.

A. Case where the V2X PC5 bit of the UE network capability IE of the Attach Request message is set to "V2X communication over PC5 supported" (i.e., case where the MME recognizes that the UE is V2X enable), and/or B. Case where the EPS attach type IE of the Attach Request message is set to "EPS emergency attach" or the request type IE of the PDN Connectivity Request message in the Attach Request message (for the emergency bearer service) is set to "emergency"

Figure 19:
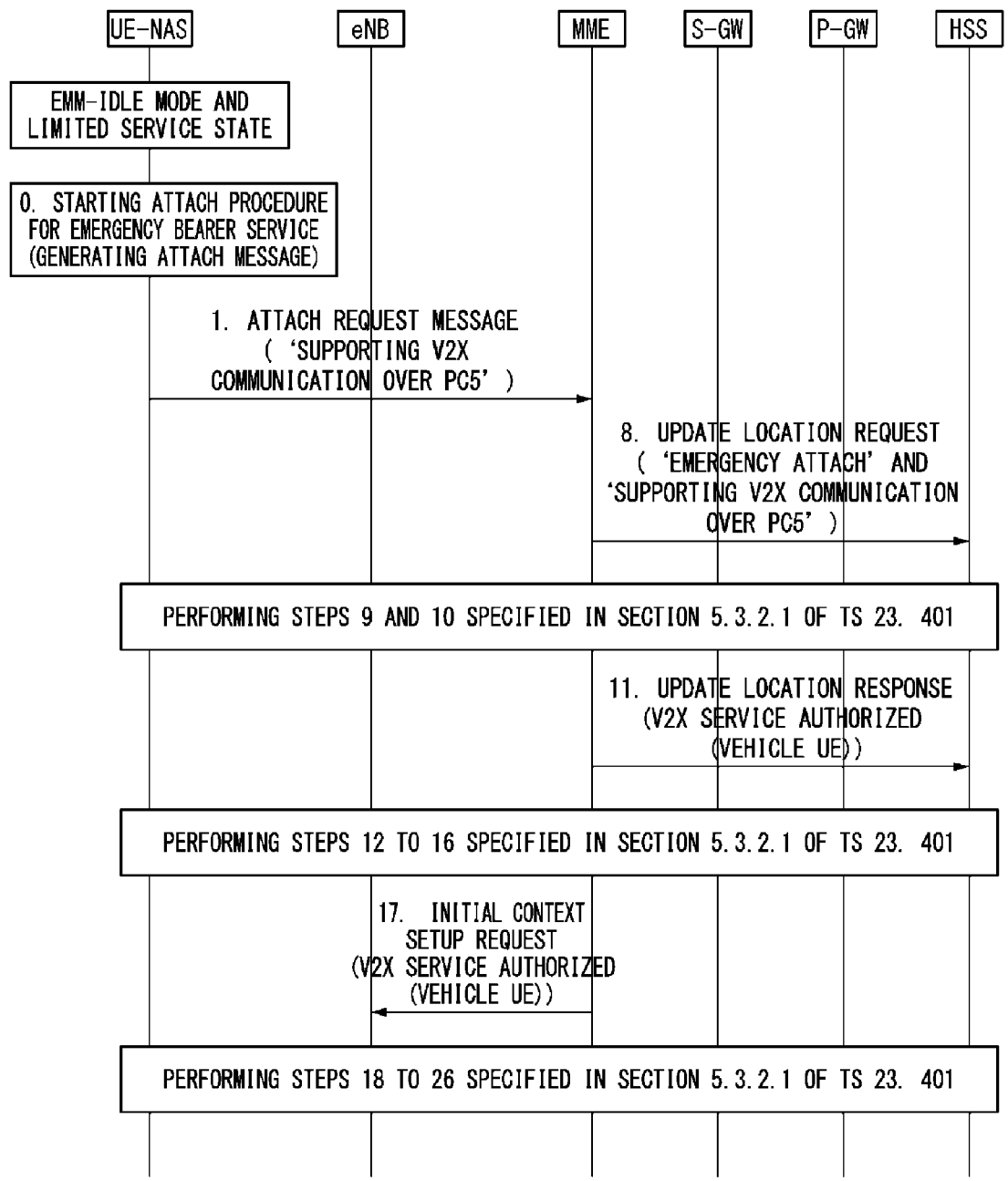

[Embodiment 5-2] Method in which the MME Interacts with the HSS to Transmit the V2X Authorization Information to the eNB FIG. 19 is a diagram illustrating a method for performing V2X communication over PC5 according to an embodiment of the present invention.

1. The UE transmits the Attach Request message in order to perform the Attach procedure for the emergency bearer service. In this case, the UE may include the following information in the Attach Request message.

A. The Attach Request message may include a UE network capability IE. In this case, since the UE has the capability for the V2X communication over PC5, a V2X PC5 bit of the UE network capability IE may be set to "V2X communication over PC5 supported". The information may indicate that the UE is V2X communicable.

B. The Attach Request message may include an EPS attach type IE. The EPS attach type IE may be set to "EPS emergency attach".

C. The Attach Request message (for the emergency bearer service) may include a PDN Connectivity Request message. In this case, a request type IE of the PDN Connectivity Request message may be set to "emergency".

8. When the Attach Request message includes (A and B) or (A and C) of step 1 above, the MME may transmit to the HSS an update location request message including the following information.

I. The update location request message may include "emergency attach" and "V2X communication over PC5 supported".

Alternatively, a new IE (i.e., single IE) may be defined and included, which includes two meanings of emergency attach and V2X communication over PC5 supported. For example, the update location request message may include emergency with V2X communication over PC5.

II. Only emergency information may be included. For example, "emergency attach" may be applicable.

III. Only the V2X communication over PC5 information may be included. For example, the "V2X communication over PC5 information" may be applicable.

11. The HSS receiving the update location request message may transmit an update location response message to the MME by setting the vehicle UE IE of the "V2X Services Authorized IE" based on the information included in step 8.

Alternatively, a new IE may be defined and transmitted, which indicates information (i.e., information indicating that the UE may perform the V2X communication over PC5) indicating that the UE is authorized for the V2X service.

In the aforementioned operation, the HSS confirms whether the corresponding UE has the capability for the vehicle UE and only when there is the capability for the corresponding vehicle UE, a "V2X Services Authorized IE" may be included and transmitted. When the corresponding UE has no capability for the vehicle UE, the "V2X Services Authorized IE" may not be delivered to the MME in step 11.

Even though the current PLMN of the UE is not included in the PLMN list in which the UE in the subscriber information may use the V2X communication over PC5, the HSS may provide to the MME the information indicating that the UE is authorized for the V2X service as described above.

17. When the MME that confirms the vehicle UE IE of the "V2X Services Authorized IE" received from the HSS delivers to the eNB the information that the V2X communication over PC5 is authorized through the S1-AP message. For example, the information that the V2X communication is authorized may be delivered by setting a Vehicle UE bit of a V2X Service Authorized IE. Further, the MME may deliver through a new IE information indicating that the UE may perform the V2X communication over PC5 and/or the UE performs emergency attach and/or the UE has an emergency PDN connectivity. As the S1-AP message for delivering the information, the Initial Context Setup Request message may be used and other (or new) S1-AP message may be used.

Figure 20:
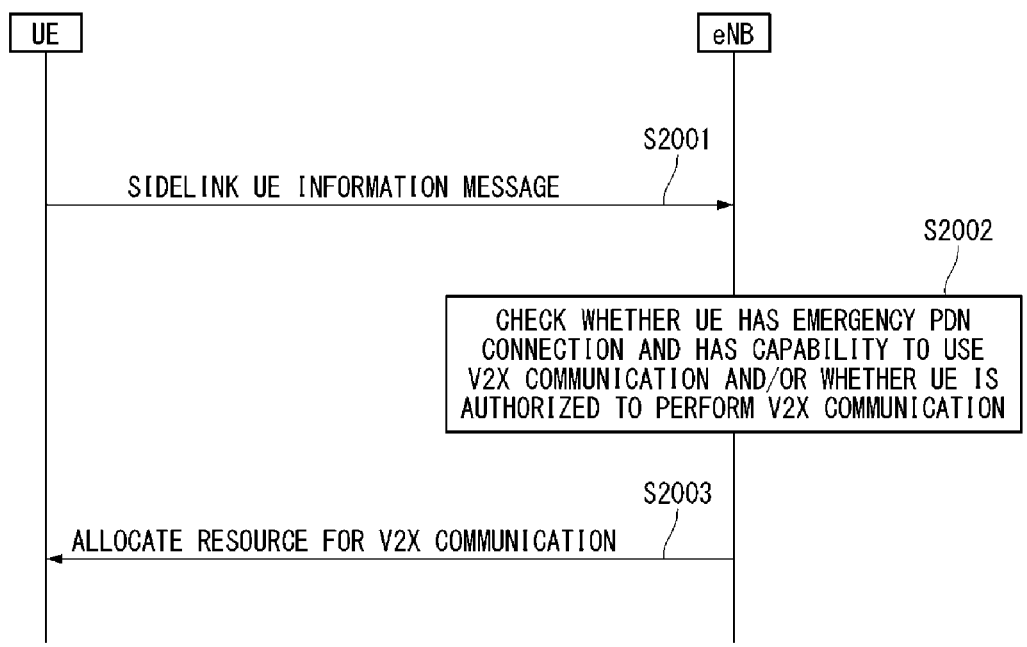

FIG. 20 is a diagram illustrating a method for performing V2X communication over PC5 according to an embodiment of the present invention.

Referring to FIG. 20, the base station (eNB) receives the Sidelink UE Information message for requesting resource allocation for the V2X communication over PC5 interface from the UE which is in the limited service state (S2001).

This step may correspond to step 5-II-B of Embodiment 1-1 above (see FIG. 12), step 5-II-A of Case I of Embodiment 2-1 (see FIG. 14), or step 5-I-B of Case II of Embodiment 2-1 (see FIG. 15).

The eNB checks whether the UE has the emergency PDN connection and has a capability to use the V2X communication and/or whether the UE is authorized to perform the V2X communication (S2002).

This step may correspond to step 6 of Embodiment 1-1 (see FIG. 12), step 6 of Case I of Embodiment 2-1 (see FIG. 14), or step 2 of Case II of Embodiment 6-1 (see FIG. 15).

The eNB may receive the RRC Connection Request message from the UE before step S2001 above. This step may correspond to step 2 of Embodiment 1-1 (see FIG. 12), step 3 of Case I of Embodiment 2-1 (see FIG. 14), or step 2 of Case II of Embodiment 2-1 (see FIG. 15). In addition, when the RRC establishment cause set to the emergency call and/or V2X communication is included in the RRC connection request message, the eNB may determine that the UE has the emergency PDN connection. In this case, the emergency call and the V2X communication may be included as individual values or included as a single value including meanings of both values.

In this case, when the eNB determines that the UE has the emergency PDN connection (i.e., when the eNB receives the RRC establishment cause, etc.), the eNB may store information that the UE has the emergency PDN connection. In addition, the information that the UE has the emergency PDN connection may be deleted when the UE switches to the RRC-IDLE state.

Further, when an indication indicating that the UE in the Sidelink UE Information message uses the emergency service is received, the eNB may determine that the UE has the emergency PDN connection.

Further, as in Embodiment 3 above (see FIG. 17), the eNB may request to the MME the V2X communication related authorization information for the UE. Upon receiving the information that the UE is authorized to perform the V2X communication from the MME in response thereto, the eNB may determine that the UE is authorized to perform the V2X communication.

In this case, when the eNB determines that the UE has the capability to use the V2X communication and the UE has the emergency PDN connection, the eNB may request the V2X communication related authorization information for the UE to the MME. Further, upon receiving the Sidelink UE Information message from the UE, it may be implicitly regarded that the UE has the capability to use the V2X communication.

Further, as in Embodiment 5 above (see FIGS. 18 and 19), when the eNB receives the S1-AP message including the information that the UE is authorized to perform the V2X communication from the MME, the eNB may determine that the UE is authorized to perform the V2X communication.

In this case, as in Embodiment 5-1 (see FIG. 18), when the indication that the UE has the capability to use the V2X communication is included in the Attach Request message for the emergency service transmitted from the UE, the MME may encapsulate the information that the UE is authorized to perform the V2X communication in the S1-AP message alone and transmit the information to the eNB.

Alternatively, as in Embodiment 5-2 (see FIG. 19), when the indication that the UE has the capability to use the V2X communication is included in the Attach Request message for the emergency service transmitted from the UE, the MME requests the indication to the HSS to receive the information that the UE is authorized to perform the V2X communication from the HSS and include the information that the UE is authorized to perform the V2X communication in the S1-AP message and transmit the information to the eNB.

When the UE has the emergency PDN connection and has the capability to use the V2X communication and/or the UE is authorized to perform the V2X communication, the eNB allocates the resource for the V2X communication to the UE (S2003).

This step may correspond to step 7 of Embodiment 1-1 (see FIG. 12), step 7 of Case I of Embodiment 2-1 (see FIG. 14), or step 2 of Case II of Embodiment 7-1 (see FIG. 15).

Embodiment 6

The embodiment proposes a solution for Problem 4.

According to the related art, unlike ProSe, in the case of the V2X communication over PC5, one or more frequencies may be configured. In this case, an operation performing method of the UE which is not served by E-UTRAN is intended to be proposed.

In the embodiment, it is assumed that the UE performs up to the following step according to the operation in the related art.

When the UE is not served by the E-UTRAN, the UE selects radio parameters to be used for the ProSe direct communication as follows.

When the UE may autonomously determine that the UE is positioned in a geographical area and when the radio parameters for the geographical area are provisioned to the UE, the UE selects the radio parameters associated with the geographical area: or In all other cases, the UE does not initiate the ProSe direct communication.

Before initiating the ProSe direct communication, the UE checks whether the radio parameter selected by the lower layer may be used at a current location without interference.

In the aforementioned description, when the UE uses the V2X service, the ProSe is replaced with V2X and the ProSe direct communication is replaced with the V2X communication over PC5 and adopted.

In this case, a result of checking interference by the lower layer of the UE which intends to perform the V2X communication over PC5 may be classified into three following cases.

A. Case where the interference is not confirmed in all frequencies

B. Case where the interference is confirmed in all frequencies

C. Case where the interference is confirmed in some frequencies, but the interference is not confirmed in the remaining some frequencies In the case of A above, the UE may select one of the confirmed frequencies and perform the following operation.

When the lower layer indicates that the usage does not cause the interference, the UE may perform the ProSe direct communication (or V2X communication over PC5).

In the case of B above, the UE may perform the following operation.

When the lower layer indicates that there is a cell that operates a provisioned radio resource (i.e., carrier frequency) and the corresponding cell belongs to a registered PLMN or a PLMN equivalent to the registered PLMN and when the UE is authorized for the ProSe direct communication (or V2X communication over PC5) in the corresponding PLMN, the UE may use the radio parameters indicated by the corresponding cell.

Otherwise, when the lower layer reports one or more PLMNs in the provisioned radio resource (i.e., carrier frequency), a) When the following conditions are satisfied:

1) when the PLMN reported by the lower layer is not the registered PLMN or the PLMN equivalent to the registered PLMN; and 2) at least one of the PLMNs reported by the lower layer is included in the authorized PLMN list for the ProSe direct communication and provides the radio resource for the ProSe direct communication.

In this case, the UE operates as follows:

1) in the EMM-IDLE mode, the UE performs PLMN selection triggered by the ProSe direct communication: or 2) otherwise, when the UE is in the EMM-CONNECTED mode:

i) the UE performs a detach procedure and performs the PLMN selection triggered by the ProSe direct communication; or ii) the UE does not initiate the ProSe direct communication.

The UE follows implementation of the UE with respect to whether to perform any operation of i) or ii) above.

b) Otherwise, the UE does not initiate the ProSe direct communication.

In the case of C above, the UE may perform the following operation.

The UE may select one of frequencies in which the interference is not confirmed and perform the operation as in case A.

The operations of the UE for cases A, B, and C above are summarized as follows.

1. When the V2X layer of the UE is "not served by E-UTRAN", the V2X layer of the UE provides information on a radio parameter mapped to a geographical location to the lower layer (i.e., AS layer or RRC layer).

2. The lower layer (AS or RRC layer) that receives the information checks the interference in the corresponding radio parameter. As a result, the lower layer operates as follows.

a. When the interference is not confirmed in all frequencies, the lower layer (AS or RRC layer) announces that there is no interference to the upper layer (i.e., V2X layer or NAS layer). When the upper layer (i.e., V2X layer or NAS layer) receiving the information transmits the V2X message to the lower layer (i.e., AS layer or RRC layer), the lower layer (i.e., AS layer or RRC layer) receiving the V2X message selects one of frequencies without interference and transmits the corresponding V2X message.

b. When the interference is confirmed in all frequencies, the lower layer (AS or RRC layer) announces the PLMN list searched in the corresponding frequency to the upper layer (i.e., V2X layer or NAS layer). The upper layer (i.e., V2X layer or NAS layer) performs operation B above.

c. Case where the interference is confirmed in some frequencies, but the interference is not confirmed in the remaining some frequencies i. The lower layer (i.e., AS or RRC layer) announces that there is no interference to the upper layer (i.e., V2X layer or NAS layer).

ii. When the upper layer (i.e., V2X layer or NAS layer) receiving the information transmits the V2X message to the lower layer (i.e., AS layer or RRC layer), the lower layer (i.e., AS layer or RRC layer) receiving the V2X message selects one of frequencies without interference and transmits the corresponding V2X message.

Embodiment 7

The embodiment proposes the solution for Problem 5 described above.

[Embodiment 7-1] Method for Filtering V2X Message in UE

A method for filtering the V2X message may be performed by the application layer (i.e., V2X layer) or the lower layer (i.e., AS layer or RRC layer). Hereinafter, in describing the embodiment, it is assumed that the PPPP value is larger, the priority is higher.

Option 1) Method for Filtering by Application Layer

1. In the case where the UE has the capability for the V2X communication over PC5, when the NAS layer of the UE requests the PDN connection for the emergency service, it is notified to the application layer (i.e., V2X layer) responsible for the V2X communication over PC5 that the emergency service starts.

For example, an indication "emergency active" may be transmitted to the application layer (i.e., V2X layer). At the same time, the PPPP threshold value is together delivered. The corresponding PPPP threshold value may mean a value used in the emergency service operation and may be a value provisioned to the UE.

A. Here, a case where the NAS layer of the UE requests the PDN connection for the emergency service means a time of transmitting the PDN connectivity request message through the emergency PDN connection or a case of receiving the accept message to the PDN connectivity request message through the emergency PDN connection.

B. In the aforementioned operation, the UE is in the EMM-CONNECTED mode.

C. The PPPP threshold value is a value configured in the network. In this case, the PPPP threshold value may be a PPPP threshold value used only when the emergency service occurs. That is, the network may configure a PPPP threshold value used when the UE is not in an emergency service situation and a PPPP threshold value which may be used only when the UE is in the emergency service situation to the UE. In addition, it may be determined whether the UE is in the emergency service situation and the PPPP threshold value suitable for each situation may be applied.

D. The network (e.g., eNB) may configure to the UE an indication of protecting the emergency service over the Uu (i.e., the radio interface between the UE and the eNB). The lower layers (i.e., AS layer or RRC layer) receiving the indication delivers the indication to the application layer.

2. The application layer (i.e., V2X layer) receiving the indication performs the following operation whenever the V2X message is generated.

A. In the case where the PPPP threshold value is delivered in step 1 above, when the PPPP value of the corresponding V2X message is larger than the PPPP threshold value delivered in step 1, the corresponding V2X message may be delivered to the lower layer (i.e., AS layer or RRC layer).

Otherwise, the corresponding V2X message may be discarded or kept. In this case, when the corresponding V2X message is kept, the corresponding V2X message may be discarded in the case where the corresponding V2X message exceeds the delay budget of the corresponding V2X message.

B. In the case where the PPPP threshold value is not delivered in step 1 above, only when the V2X message is a special message (e.g., 'DENM', 'emergency', or 'public safety'), the V2X message may be delivered to the lower layer (i.e., AS layer or RRC layer).

Otherwise, the corresponding V2X message may be discarded or kept. In this case, when the corresponding V2X message is kept, the corresponding V2X message may be discarded in the case where the corresponding V2X message exceeds the delay budget of the corresponding V2X message.

C. In the case where the indication for protecting the emergency service over the Uu is configured, when the emergency service is active regardless of the PPPP value of the V2X message, the UE may discard or keep the V2X message. In this case, when the corresponding V2X message is kept, the corresponding V2X message may be discarded in the case where the corresponding V2X message exceeds the delay budget of the corresponding V2X message.

C operation may be may be performed alone and performed together with A or B above. In this case, when operation C operates together with A or B, the corresponding indication may indicate whether to apply A or B. That is, when the indication is configured, A or B may be applied.

When the emergency service is terminated, the NAS layer of the UE announces that the emergency service is terminated to the application layer (i.e., V2X layer). For example, an indication "emergency deactive" may be transmitted to the application layer (i.e., V2X layer). The application layer (i.e., V2X layer) receiving the indication may perform the operation in the related art.

Option 2) Method for Filtering by Lower Layer

1. In the case where the UE has the capability for the V2X communication over PC5, when the NAS layer of the UE requests the PDN connection for the emergency service, it is notified to the lower layer (i.e., AS layer or RRC layer) that the emergency service starts.

For example, the indication "emergency active" may be transmitted to the lower layer (i.e., AS layer or RRC layer). At the same time, the PPPP threshold value is together delivered. The corresponding PPPP threshold value may mean a value used in the emergency service operation and may be a value provisioned to the UE.

In this case, a bearer identifier for an emergency bearer may also be included.

A. Here, a case where the NAS layer of the UE requests the PDN connection for the emergency service means a time of transmitting the PDN connectivity request message through the emergency PDN connection or a case of receiving the accept message to the PDN connectivity request message through the emergency PDN connection.

B. In the aforementioned operation, the UE is in the EMM-CONNECTED mode.

C. The PPPP threshold value is a value configured in the network. In this case, the PPPP threshold value may be a PPPP threshold value used only when the emergency service occurs. That is, the network may configure a PPPP threshold value used when the UE is not in an emergency service situation and a PPPP threshold value which may be used only when the UE is in the emergency service situation to the UE. In addition, it may be determined whether the UE is in the emergency service situation and the PPPP threshold value suitable for each situation may be applied.

D. The network (e.g., eNB) may configure to the UE an indication of protecting the emergency service over the Uu.

2. The lower layer (i.e., AS layer or RRC layer) receiving the indication performs the following operation whenever the V2X message is generated.

A. In the case where the PPPP threshold value is delivered in step 1 above, if the PPPP value of the corresponding V2X message is larger than the PPPP threshold value delivered in step 1, only when both transmission of the V2X message through the sidelink and transmission of a protocol data unit (PDU) of the bearer corresponding to the emergency service over the Uu are transmitted at the same time, transmission of the corresponding V2X message is attempted.

Otherwise, the corresponding V2X message may be discarded or kept. In this case, when the corresponding V2X message is kept, the corresponding V2X message may be discarded in the case where the corresponding V2X message exceeds the delay budget of the corresponding V2X message.

B. In the case where the PPPP threshold value is not delivered in step 1 above, only when the V2X message is a special message (e.g., 'DENM', 'emergency', or 'public safety'), the V2X message may be delivered to the lower layer (i.e., AS layer or RRC layer).

Otherwise, the corresponding V2X message may be discarded or kept. In this case, when the corresponding V2X message is kept, the corresponding V2X message may be discarded in the case where the corresponding V2X message exceeds the delay budget of the corresponding V2X message.

i) For the above operation, the NAS layer may announce that the emergency service starts to the application layer in step 1. The application layer (i.e., V2X layer) receiving the announcement may transmit the information (e.g., 'DENM', 'emergency', or 'public safety') on the V2X message to the lower layer (i.e., AS layer or RRC layer) together with the V2X message.

C. In the case where the indication for protecting the emergency service over the Uu is configured, only when the emergency service is active regardless of the PPPP value of the V2X message and both transmission of the V2X message through the sidelink and transmission of the PDU of the bearer corresponding to the emergency service over the Uu are transmitted at the same time, the V2X message may be discarded or kept.

In this case, when the corresponding V2X message is kept, the corresponding V2X message may be discarded in the case where the corresponding V2X message exceeds the delay budget of the corresponding V2X message.

Alternatively, the power of the UE may be preferentially allocated to transmission of the PDU of the bearer corresponding to the emergency service over the Uu. Such an operation may be used alone and may be performed together with operation A or B. In this case, when such an operation is performed together with operation A or B, the corresponding indication may indicate whether to apply A or B. That is, when the indication is configured, A or B may be applied.

D. The following operations may be commonly performed with respect to operations A, B, and C described above.
  i) The lower layers (i.e., AS layer or RRC layer) receive the indication that the emergency service starts and the bearer identifier for the emergency bearer in step 1 above.
  ii) When the lower layer (i.e., AS layer or RRC layer) receives the V2X message, the PPPP value of the corresponding V2X message and the priority of the emergency bearer are compared with each other, a service having a high priority may be preferentially selected and transmitted. In this case, priority information mapped to each service (e.g., emergency bearer service) or PPPP or information for determining which service is to be preferentially selected for each priority may be received from the network (e.g., eNB) or provisioned to the UE.

3. When the emergency service is terminated, the NAS layer of the UE announces that the emergency service is terminated to the lower layer. For example, the indication "emergency deactive" may be transmitted to the lower layer (i.e., AS layer or RRC layer). The lower layer (i.e., AS layer or RRC layer) receiving the indication may perform the operation in the related art.

A. When i) of 2-B) above is implemented by the NAS layer operation, the operation may be performed even in the application layer (i.e., V2X layer).

B. When the bearer identity for the emergency bearer is included in step 1 above, the AS layer may know that the emergency service is terminated through a fact that the corresponding emergency bearer is deactivated/released. In this case, the operation of section 3 above may not be performed.

[Embodiment 7-2] Method for Indicating in RRC Message by RRC Layer of UE

1. In the case where the UE has the capability for the V2X communication over PC5, when the NAS layer of the UE requests the PDN connection for the emergency service, it is notified to the lower layer (i.e., AS layer or RRC layer) that the emergency service starts.

For example, the indication "emergency active" may be transmitted to the lower layer (i.e., AS layer or RRC layer). In this case, the bearer identity for the emergency bearer may also be included.

A. Here, a case where the NAS layer of the UE requests the PDN connection for the emergency service means a time of transmitting the PDN connectivity request message through the emergency PDN connection or a case of receiving the accept message to the PDN connectivity request message through the emergency PDN connection.

B. In the aforementioned operation, the UE is in the EMM-CONNECTED mode.

2. The lower layer (i.e., AS layer or RRC layer) receiving the indication performs the following operation.

A. The RRC message (e.g., Sidelink UE information message or sidelink BSR) includes the indication for announcing that the emergency service starts.

For example, the indication "emergency active" may be included. In this case, the bearer identity for the emergency bearer or a logical channel identifier (ID) may also be included.

B. The eNB receiving the RRC message performs the resource allocation based on the bearer identity for the emergency bearer or logical channel identifier (ID).
  i. Here, in a resource allocating operation, LTE-Uu for the corresponding emergency bearer may be processed preferentially over the V2X communication over PC5 or the resource allocating operation may be performed by considering the PPPP value of the V2X message and the information on the emergency bearer.
  ii. When the lower layer (i.e., AS layer or RRC layer) receives the V2X message, the PPPP value of the corresponding V2X message and the priority of the emergency bearer are compared with each other, a service having a high priority may be preferentially selected and transmitted. In this case, priority information mapped to each service (e.g., emergency bearer service) or PPPP or information for determining which service is to be preferentially selected for each priority may be received from the network (e.g., eNB) or provisioned to the UE.

3. When the emergency service is terminated, the NAS layer of the UE announces that the emergency service is terminated to the lower layer. For example, the indication "emergency deactive" may be transmitted to the lower layer (i.e., AS layer or RRC layer).

4. The lower layer (i.e., AS layer or RRC layer) receiving the indication may encapsulate the indication that the emergency service is terminated in the RRC message (e.g., Sidelink UE information message or Sidelink BSR). For example, the indication "emergency deactive" may be included. In this case, the bearer identity for the emergency bearer or the logical channel ID may also be included. Thereafter, the lower layer (i.e., AS layer or RRC layer) may perform the operation in the related art.

A. When the bearer identity for the emergency bearer is included in step 1 above, the AS layers of the UE and the eNB may know that the emergency service is terminated through a fact that the corresponding emergency bearer is deactivated/released. In this case, the operations 3 and 4 above may not be performed.

Embodiment 8

The embodiment proposes the solution for Problem 6 described above.

As mentioned in Problem 6) above, the RRC layer of the UE needs to know the following information in order to perform prioritization of the emergency PDN connection and the V2X communication over PC5.

1) whether the UE has the emergency PDN connection
2) whether the communication over the emergency PDN connection needs to be prioritized over the V2X communication over the PC5 reference point based on regional/national regulatory requirements and operator policies The embodiment intends to propose the following operations.

Option 1) Method in which the Upper Layer (i.e., the NAS Layer of the UE or the V2X Layer of the UE) of the UE Informs the Lower Layers (i.e., the AS Layer of the UE (e.g., the RRC Layer of the UE and/or the MAC Layer of the UE))

1. The UE has the active emergency PDN connection. In addition,
2. The communication over the emergency PDN connection needs to be prioritized over the V2X communication over the PC5 reference point based on regional/national regulatory requirements and operator policies.

When Conditions 1 and 2 above are satisfied, the upper layer (i.e., the NAS layer of the UE or the V2X layer of the UE) delivers the following information to the lower layers (i.e., the AS layer of the UE (e.g., the RRC layer of the UE and/or the MAC layer of the UE)).

I. 'Emergency Call' Indication and/or Bearer Identity for Emergency Bearer Service Here, the 'emergency call' indication is an indication for announcing that the emergency PDN connection is established.

II. 'Emergency Prioritized Over PC5' Indication

Here, the 'emergency prioritized over PC5' indication is an indication for announcing the following configuration.

The communication over the emergency PDN connection needs to be prioritized over the V2X communication over the PC5 reference point based on regional/national regulatory requirements and operator policies.

When the upper layer delivers such an indication to the lower layers, the lower layer may operate as follows.

When an operation of establishing the emergency PDN connection is performed, in the case where the upper layer announces such an indication to the lower layers, the upper layer may deliver the corresponding indication together with the corresponding NAS message (e.g., NAS message used in Attach for the emergency PDN connection or the PDN connection for the emergency bearer services, e.g., Attach Request message or PDN Connectivity Request message).

When such an indication is delivered after the emergency PDN connection is established, a separate indication may be delivered after the emergency PDN connection is established.

Indications I) and II) described above may be together delivered or only any one of indications I) and II) may be delivered.

When the aforementioned indication is delivered, the UE may be in the EMM-CONNECTED mode. That is, only when the UE is in the EMM-CONNECTED mode, the aforementioned indication may be transmitted. Further, when generally applied, the UE may be in the EMM-IDLE mode.

Option 2) Method in which the eNB Informs the Lower Layers (i.e., AS Layer (e.g., RRC Layer of the UE and/or MAC Layer of the UE) of the UE 1. The UE has the active emergency PDN connection. In addition,
2. The communication over the emergency PDN connection needs to be prioritized over the V2X communication over the PC5 reference point based on regional/national regulatory requirements and operator policies.

When Conditions 1 and 2 above are satisfied, the eNB delivers the following information to the UE.

I. 'Emergency Call' Indication and/or Bearer Identity for Emergency Bearer Service (or Logical Channel ID (LCID))

Here, the 'emergency call' indication is an indication for announcing that the emergency PDN connection is established.

II. 'Emergency Prioritized Over PC5' Indication

Here, the 'emergency prioritized over PC5' indication is an indication for announcing the following configuration.

The communication over the emergency PDN connection needs to be prioritized over the V2X communication over the PC5 reference point based on regional/national regulatory requirements and operator policies.

When the eNB delivers such an indication to the UE, the eNB may operate as follows.

Indications I) and II) described above may be together delivered or only any one of indications I) and II) may be delivered.

Indication I) described above may be delivered to the UE as a dedicated message.

Commonly to option 1 and option 2 described above, the lower layers (i.e., AS layer (e.g., RRC layer of the UE and/or MAC layer of the UE)) receiving the indication may recognize a bearer corresponding to the emergency PDN connection and a message (i.e., uplink transmission over a Uu interface) generated in the corresponding bearer may be prioritized (or scheduled) over the message generated for the V2X communication over PC5.

More specifically, when the uplink transmission (i.e., transmission over the Un interface) overlaps with V2X sidelink transmission (i.e., transmission of the V2X communication over PC5) in the time domain within the same frequency, if a PPPP value of a sidelink MAC PDU is lower than a (pre)configured PPPP threshold value, the UE prioritizes the sidelink transmission over the uplink transmission.

However, when the uplink transmission is prioritized by the upper layer (i.e., NAS layer of the UE or V2X layer of the UE) (i.e., when indications I) and/or II) are transmitted from the upper layer as described above), the UE prioritizes the uplink transmission over any V2X sidelink transmission (i.e., regardless of the PPPP value of the sidelink MAC PDU).

Figure 21:
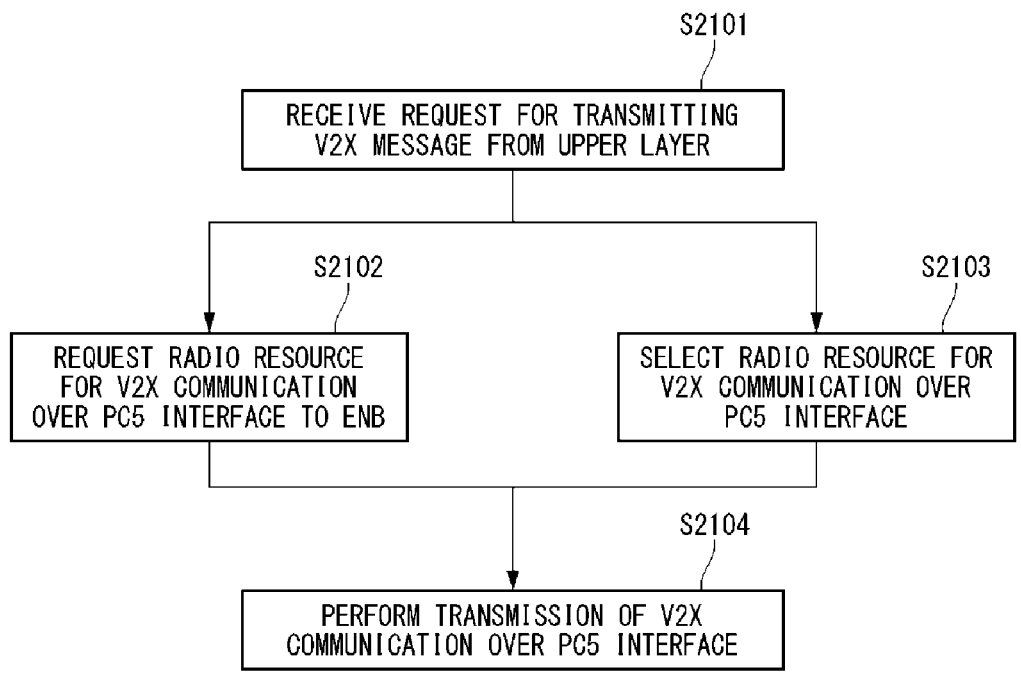

FIG. 21 is a diagram illustrating a method for performing V2X communication over PC5 according to an embodiment of the present invention.

Referring to FIG. 21, the UE (in particular, the lower layer of the UE) receives a request for transmission of the V2X message from the upper layer (S2101).

That is, the upper layer may request the UE to transmit the V2X message of a V2X service identified by a V2X service identifier by using the V2X communication over PC5.

In this case, the request from the upper layer may include:
a) V2X message;
b) V2X service identifier of the V2X service for the V2X message;
c) Data type in the V2X message (Internet protocol (IP) or non-IP);

d) When the V2X message includes non-IP data, an indication for setting a non-IP type field of a non-IP type PDU to a value corresponding to a V2X message family: and e) V2X message priority When receiving the request for transmitting the V2X message from the upper layer in S2101, the UE may request the radio resource for the V2X communication over the PC5 interface to the eNB (S2102).

Here, step S2012 may be performed when the following conditions are satisfied.

1) The UE is "served by E-UTRAN"
2) The UE intends to use a radio resource (i.e., carrier frequency) provided by an E-UTRAN cell
3) When the UE is served by the E-UTRAN, a registered PLMN belongs to a PLMN list authorized to use the V2X communication over PC5
4) The V2X service identifier of the V2X service is included in the PLMN list authorized for the V2X communication over PC5 or the UE is configured as a default destination Layer-2 identifier (ID) for the V2X communication over PC5

Alternatively, when receiving the request for transmitting the V2X message from the upper layer in S2101, the UE may select the radio resource for the V2X communication over PC5 interface (S2103).

Here, step S2013 may be performed when the following conditions are satisfied.

1) The UE:
A) "not served by E-UTRAN": or
B) is in the EMM-IDLE mode and the limited service state, when the UE is in the limited service state, the UE corresponds to any one of the followings cases;
  i) when the UE may not find the suitable cell in the selected PLMN;
  ii) a case where the UE receives an ATTACH REJECT message, a TRACKING AREA UPDATE REJECT message, or a SERVICE REJECT message including EMM cause #11 "PLMN not allowed" or the UE receives a LOCATION UPDATING REJECT message, a GPRS ATTACH REJECT message, or a ROUTING AREA UPDATE REJECT message including EMM cause #11 "PLMN not allowed": or
  iii) a case where the UE receives the ATTACH REJECT message or TRACKING AREA UPDATE REJECT message or SERVICE REJECT message including EMM cause #7 "EPS services not allowed" or a case where the UE receives the LOCATION UPDATING REJECT message or GPRS ATTACH REJECT message or ROUTING AREA UPDATE REJECT message or SERVICE REJECT message including EMM cause #7 "EPS services not allowed";
2) When the UE is not served by the E-UTRAN, the UE is authorized to use the V2X communication over PC5
3) The V2X service identifier of the V2X service is included in a list of the V2X services authorized for the V2X communication over PC5 or the UE is configured as a default destination Layer-2 identifier (ID) for the V2X communication over PC5

The UE performs the transmission for the V2X communication over the PC5 interface (S2102).

That is, the UE may perform the transmission of the V2X communication over the PC5 interface on the radio resource allocated from the eNB in step S2102 or perform the transmission of the V2X communication over the PC5 interface on the radio resource selected in step S2103.

In this case, when receiving indication I) and/or indication II) described above from the upper layer, the message (i.e., uplink transmission over the Uu interface) generated in the bearer corresponding to the emergency PDN connection may be prioritized (or scheduled) over the message generated for the V2X communication over PC5 by the lower layer.

In other words, when the uplink transmission is prioritized by the upper layer (i.e., NAS layer of the UE or V2X layer of the UE) (i.e., when indications I) and/or II) are transmitted from the upper layer as described above), the UE prioritizes the uplink transmission over any V2X sidelink transmission (i.e., regardless of the PPPP value of the sidelink MAC PDU).

As described above, indication I) and/or indication II) may be delivered together with the non-access stratum (NAS) message for establishing the emergency PDN connection or delivered separately from the non-access stratum (NAS) message for establishing the emergency PDN connection.

Meanwhile, when the conditions exemplified in steps S2102 and S2103 above are not satisfied, the UE may not perform the V2X communication over PC5.

Meanwhile, in the description of the present invention, for convenience of description, the V2X communication among the V2X services is primarily described, but the operation of the present invention may be similarly applied even to all V2X services including the V2X discovery.

Further, in the description of the present invention, for convenience of description, the V2X communication is primarily described, but the present invention may be applied to all of data transmission and reception over PC5 interface (i.e., sidelink).

Further, combinations of one or more embodiments described above may be together implemented and used. In addition, in the procedure described in each embodiment, all of respective steps may not be performed and only some steps may be performed. That is, performing each step may be performed independently from performing a previous or subsequent step. In other words, the next step may be performed without performing the previous step.

The 'limited service state' used in the present invention may mean only a state of satisfying the following conditions described in 3GPP TS 24.386 and 3GPP TS 23.122.

i) when the UE may not find the suitable cell in the selected PLMN;
ii) a case where the UE receives an ATTACH REJECT message, a TRACKING AREA UPDATE REJECT message, or a SERVICE REJECT message including EMM cause #11 "PLMN not allowed" or the UE receives a LOCATION UPDATING REJECT message, a GPRS ATTACH REJECT message, or a ROUTING AREA UPDATE REJECT message including EMM cause #11 "PLMN not allowed": or
iii) a case where the UE receives the ATTACH REJECT message or TRACKING AREA UPDATE REJECT message or SERVICE REJECT message including EMM cause #7 "EPS services not allowed" or a case where the UE receives the LOCATION UPDATING REJECT message or GPRS ATTACH REJECT message or ROUTING AREA UPDATE REJECT message or SERVICE REJECT message including EMM cause #7 "EPS services not allowed":

That is, the operation of the present invention may not be applied to a case where the UE is in the limited service state due to other reasons other than the aforementioned conditions.

In the description of the present invention, in the step of delivering the 'emergency' related indication, an indication for announcing that the UE is in the limited service state may be delivered together with the 'emergency' related indication or the indication for announcing that the UE is in the limited service state may be delivered instead of the 'emergency' related indication.

Here, as an example of the 'emergency' related indication, the 'emergency call' may be applicable.

Further, the delivery may be a delivery between the layers (i.e., application layer, V2X layer, NAS layer, and AS layer (e.g., RRC layer)) in the UE or a delivery between network entities (i.e., UE, eNB, and MME).

According to the present invention, even when the UE is in the limited service state, the UE may perform the V2X communication. As a result, it is possible to cope with a load safety situation or a public safety related situation.

According to the related art, it is impossible for the UE in the limited service state and the EMM-CONNECTED state to perform the V2X communication over PC5.

Specifically, even though the UE in the limited service state and the EMM-CONNECTED state requests the resource for the V2X communication through the sidelink UE information, since the eNB does not have authorization information for the UE, the eNB may not accept the request.

However, according to Embodiment 1-1 of the present invention, a procedure in which the UE requests the resource for the V2X communication over PC5 and the eNB determines and decides the requested resource is proposed, and as a result, it is possible to perform the V2X communication over PC5 of the UE.

Further, according to Embodiment 1-2 of the present invention, the UE may perform the V2X communication over PC5 by using the Tx resource pool without request to the eNB.

According to the related art, when the cell on which the UE in the limited service state and the EMM-IDLE state camps sends the V2X related information as the broadcast information, but does not broadcast the resource pool for transmission (i.e., when the UE establishes the RRC connection with the eNB and cannot but transmit the V2X message through the dedicated resource for the UE), it is impossible to perform the V2X communication over PC5.

However, according to Embodiment 2-1 of the present invention, when the cell on which the UE in the limited service state and the EMM-IDLE state camps sends the V2X related information as the broadcast information, but does not broadcast the resource pool for transmission (i.e., when the UE establishes the RRC connection with the eNB and cannot but transmit the V2X message through the dedicated resource for the UE), in the case where it is necessary to perform the V2X communication over PC5, it is possible to perform the V2X communication over PC5 through the following methods.

I. Method for Switching to EMM-CONNECTED
   A. Performing attach for emergency bearer service [Embodiment 2-1-Case I-A]
   B. Performing NAS procedure other than attach for emergency bearer service [Embodiment 2-1-Case I-B]
II. Method for Switching to RRC-CONNECTED (and EMM-IDLE)
   A. Together with NAS procedure (through step 2-I)
   B. Without NAS procedure (through step 2-II)

In the case of the corresponding procedure, the RRC procedure (i.e., RRC connection establishment procedure) is performed without triggering the NAS procedure to reduce an unnecessary signaling or interaction.

Further, according to Embodiment 2-2 of the present invention, the UE may perform the V2X communication over PC5 by using the Tx resource pool without request to the eNB.

Further, Embodiment 7 of the present invention may be applied even to a case where a radio channel is congested. For example, when the radio channel is congested and it is thus necessary to limit a PC5 resource, the network may encapsulate and transmit the PPPP threshold value to a system information block (SIB). The UE that receives the PPPP threshold value may operate by the method proposed Embodiment 7 above. When the application layer performs filtering in Embodiment 7, the AS layer of the UE receiving the PPPP threshold value may inform the application layer. When the lower layer performs filtering in Embodiment 7, the AS layer of the UE receiving the PPPP threshold value may directly apply and operate. The AS layer of the UE may exchange the received PPPP threshold value with the NAS layer.

Overview of Devices to which Present Invention is Applicable

Figure 22:
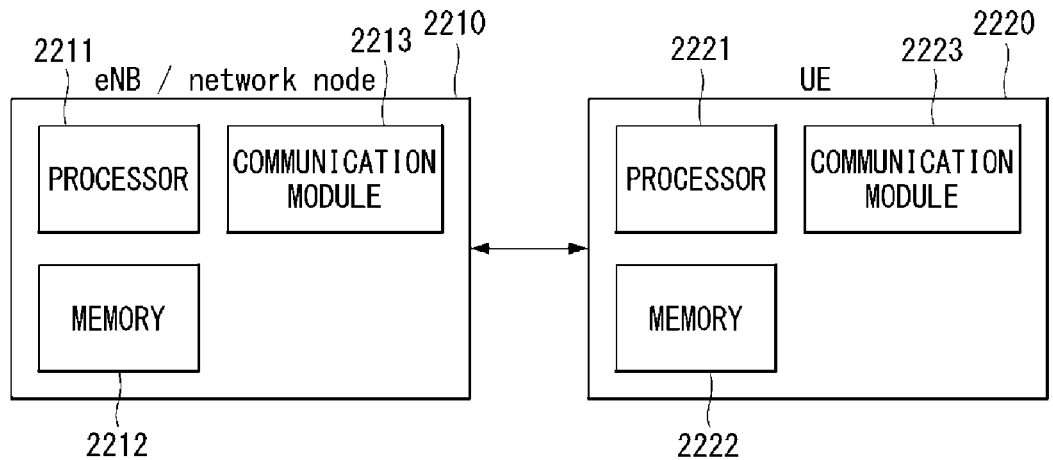
FIG. 22 illustrates a block diagram of a communication apparatus according to an embodiment of the present invention.

FIG. 22 illustrates a block diagram of a communication apparatus according to an embodiment of the present invention.

Figure 23:
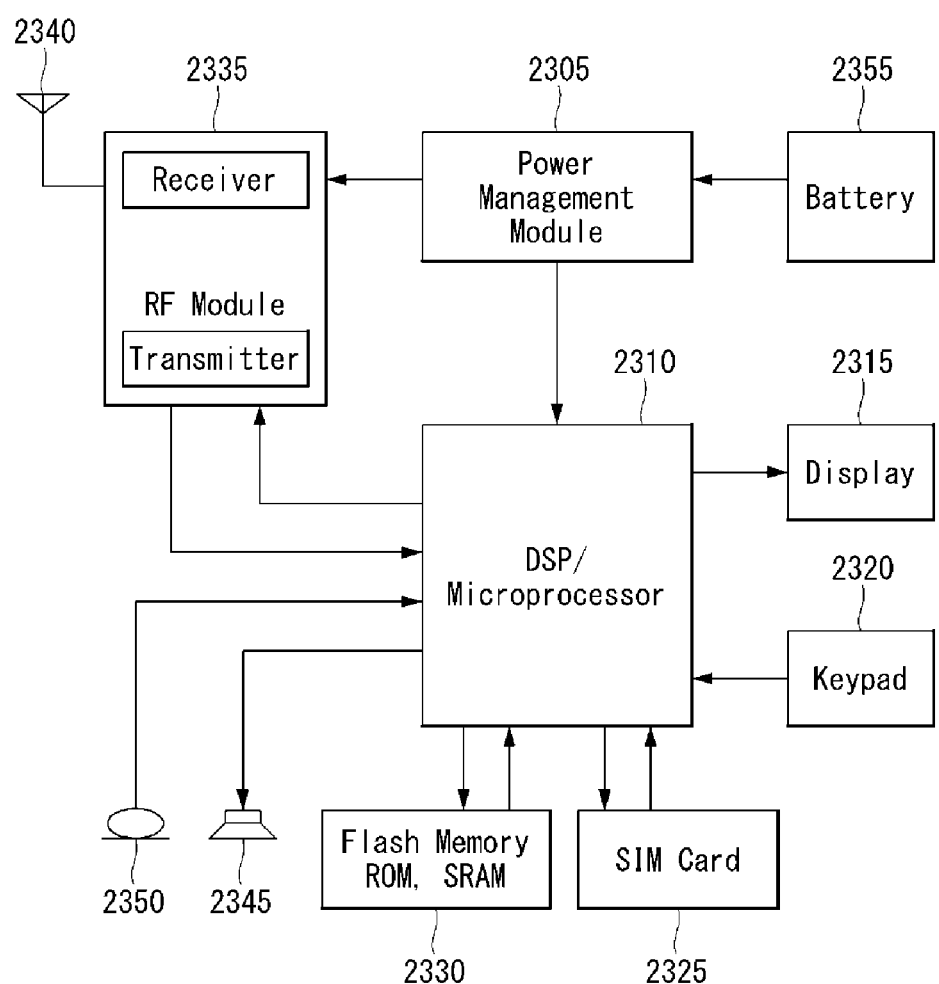
FIG. 23 illustrates a block diagram of a communication apparatus according to an embodiment of the present invention.

Referring to FIG. 23, a wireless communication system includes a network node 2210 and multiple user equipments 2220.

The network node 2210 includes a processor 2211, a memory 2212, and a communication module 2213. The processor 2211 implements a function, a process, and/or a method which are proposed in FIGS. 1 to 21 above. Layers of a wired/wireless interface protocol may be implemented by the processor 2211.

The memory 2212 is connected with the processor 2211 to store various pieces of information for driving the processor 2211. The communication module 2213 is connected with the processor 2211 to transmit and/or receive a wired/wireless signal. An example of the network node 2210 may correspond to a base station, MME, HSS, SGW, PGW, SCEF, SCS/AS, etc. In particular when the network node 2210 is the base station, the communication module 2213 may include a radio frequency (RF) unit for transmitting/receiving the wireless signal.

The UE 2220 includes a processor 2221, a memory 2222, and a communication module (or RF unit) 2223. The processor 2221 implements a function, a process, and/or a method which are proposed in FIGS. 1 to 21 above. The layers of the wireless interface protocol may be implemented by the processor 2221. In particular, the processor may include an NAS layer and an AS layer. The memory 2222 is connected with the processor 2221 to store various pieces of information for driving the processor 2221. The communication module 2223 is connected with the processor 2221 to transmit and/or receive the wireless signal.

The memories 2212 and 2222 may be positioned inside or outside the processors 2211 and 2221 and connected with the processors 2211 and 2221 by various well-known means. Further, the network node 2210 (when the network node 2220 is the base station) and/or the UE 2220 may have a single antenna or multiple antennas.

FIG. 23 illustrates a block diagram of a communication apparatus according to an embodiment of the present invention.

In particular, FIG. 23 is a diagram more specifically illustrating the UE of FIG. 22 above.

Referring to FIG. 23, the UE may be configured to include a processor (or a digital signal processor (DSP) 2310, an RF module (or RF unit) 2335, a power management module 2305, an antenna 2340, a battery 2355, a display 2315, a keypad 2320, a memory 2330, a subscriber identification module (SIM) card 2325 (this component is optional), a speaker 2345, and a microphone 2350. The UE may also include a single antenna or multiple antennas.

The processor 2310 implements a function, a process, and/or a method which are proposed in FIGS. 1 to 21 above. Layers of a wireless interface protocol may be implemented by the processor 2310.

The memory 2330 is connected with the processor 2310 to store information related to an operation of the processor 2310. The memory 2330 may be positioned inside or outside the processor 2310 and connected with the processor 2310 by various well-known means.

A user inputs command information such as a telephone number or the like by, for example, pressing (or touching) a button on the keypad 2320 or by voice activation using the microphone 2350. The processor 2310 receives such command information and processes to perform appropriate functions including dialing a telephone number. Operational data may be extracted from the SIM card 2325 or the memory 2330. In addition, the processor 2310 may display command information or drive information on the display 2315 for the user to recognize and for convenience.

The RF module 2335 is connected with the processor 2310 to transmit and/or receive an RF signal. The processor 2310 transfers the command information to the RF module 2335 to initiate communication, for example, to transmit wireless signals constituting voice communication data. The RF module 2335 is constituted by a receiver and a transmitter for receiving and transmitting the wireless signals. The antenna 2340 functions to transmit and receive the wireless signals. Upon receiving the wireless signals, the RF module 2335 may transfer the signal for processing by the processor 2310 and convert the signal to a baseband. The processed signal may be converted into to audible or readable information output via the speaker 2345.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems, in particular, a 5 generation (G) system in addition to the 3GPP LTE/LTE-A system.

What is claimed is:

1. A method for performing, by a user equipment (UE) in a wireless communication system, the method comprising:
    performing an attach procedure to establish an emergency packet data network (PDN) connection in a limited service state;
    receiving, from an upper layer, a request for transmitting a vehicle-to-everything (V2X) message, wherein the request includes the V2X message and a V2X service identifier of a V2X service for the V2X message;
    passing, to lower layers, the V2X message for transmission of V2X communication over PC5;
    sending, to the lower layers, an indication to prioritize transmission over the PDN connection as compared to the transmission of the V2X communication over PC5, based on the UE having the emergency PDN connection, during the limited service state; and
    performing the transmission of the V2X communication over PC5.

2. The method of claim 1, wherein the performing the transmission of the V2X communication over PC5 comprises:
    requesting, to a base station, radio resources for V2X communication over PC5; and
    performing the transmission of the V2X communication over PC5.

3. The method of claim 2, wherein, based on the UE being serviced by an Evolved Universal Terrestrial Radio Access Network (E-UTRAN), the UE intends to use the radio resources provided by a cell of the E-UTRAN, and a Public Land Mobile Network (PLMN) in which the UE is registered belongs to a PLMN list authorized to use the V2X communication via the PC5, the radio resources for the V2X communication via the PC5 interface is requested to the base station.

4. The method of claim 1, wherein the performing the transmission of the V2X communication over PC5 comprises:
    selecting radio resources for the V2X communication over PC5; and
    performing the transmission of the V2X communication over PC5.

5. The method of claim 4, wherein, based on the UE not being serviced by an Evolved Universal Terrestrial Radio Access Network (E-UTRAN) and the UE is authorized to use the V2X communication over PC5, the radio resources for the V2X communication over PC5 is selected.

6. The method of claim 1, wherein the transmission over the emergency PDN connection is prioritized over the transmission of the V2X communication over PC5 based on the indication.

7. The method of claim 6, wherein the transmission over the emergency PDN connection is prioritized over the transmission of the V2X communication over PC5 irrespectively of a PPPP of a media access control (MAC) packet data unit (PDU) for the V2X communication.

8. The method of claim 1, wherein the request further includes at least one of a data type in the V2X message, or a V2X message priority.

9. The method of claim 1, wherein an identifier of a bearer corresponding to the emergency PDN connection is transmitted together with the indication.

10. The method of claim 1, wherein only when the UE is in an EPS Mobility Management-CONNECTED (EMM) mode, the indication is transmitted.

11. The method of claim 1, wherein whether the transmission of the V2X communication over PC5 is prioritized is determined based on proximity-based services (ProSe) priority per packet (PPPP), and
wherein the transmission over the emergency PDN connection is prioritized higher than the the transmission of the V2X communication over PC5, regardless of the PPPP, in case that the indication is sent.

12. The method of claim 1, further comprising:
transmitting, to a base station, a radio resource control (RRC) connection request message including information related to establishment cause for at least one of emergency or vehicle-to-everything (V2X) communication; and
receiving, from the base station, a RRC connection setup massage.

13. A user equipment (UE) in a wireless communication system, the UE comprising:
a transceiver; and
at least one processor coupled to the transceiver and configured to:
perform an attach procedure to establish an emergency packet data network (PDN) connection in a limited service state;
receive, from an upper layer, a request for transmitting a vehicle-to-everything (V2X) message, wherein the request includes the V2X message and a V2X service identifier of a V2X service for the V2X message,
passing, to lower layers, the V2X message for transmission of V2X communication over PC5;
sending, to the lower layers, an indication to prioritize transmission over the emergency PDN connection as compared to the transmission of the V2X communication over PC5, based on the UE having the emergency PDN connection, during the limited service state; and
performing the transmission of the V2X communication over PC5.

* * * * *